US012677338B2

(12) United States Patent
Rice et al.

(10) Patent No.:  US 12,677,338 B2
(45) Date of Patent:      Jul. 7, 2026

(54) MULTIPLE ACTIVE NETWORK WIRELESS DEVICE

(71) Applicant: InterMetro Communications, Inc., Simi Valley, CA (US)

(72) Inventors: Charles Rice, Simi Valley, CA (US); Christopher Fogel, Simi Valley, CA (US)

(73) Assignee: InterMetro Communications, Inc., Simi Valley, CA (US)

( * ) Notice: Subject to any disclaimer, the term of this patent is extended or adjusted under 35 U.S.C. 154(b) by 0 days.

(21) Appl. No.: 19/336,086

(22) Filed: Sep. 22, 2025

(65) Prior Publication Data

US 2026/0129699 A1      May 7, 2026

Related U.S. Application Data

(60) Provisional application No. 63/698,267, filed on Sep. 24, 2024.

(51) Int. Cl.
H04W 76/15          (2018.01)
H04W 4/16            (2009.01)
(Continued)

(52) U.S. Cl.
CPC ............. H04W 76/15 (2018.02); H04W 4/16 (2013.01); H04W 48/18 (2013.01); H04W 88/06 (2013.01)

(58) Field of Classification Search
CPC ........ H04W 4/16; H04W 48/18; H04W 76/15
(Continued)

(56) References Cited

U.S. PATENT DOCUMENTS 5,915,214  A       6/1999   Reece et al.
6,615,044  B2      9/2003   Tigerstedt et al.
(Continued)

FOREIGN PATENT DOCUMENTS

AU        2019263145       3/2022
CA        3098896         11/2019
(Continued)

OTHER PUBLICATIONS

Brunner et al., "Inter-System Handover Parameter Optimization," IEEE Vehicular Technology Conference, 2006, pp. 1-6. doi: 10.1109/VTCF.2006.232.
(Continued)

*Primary Examiner* — Joel Ajayi
(74) *Attorney, Agent, or Firm* — Knobbe, Martens, Olson & Bear, LLP

(57)                    ABSTRACT

A wireless device capable of using embedded subscriber identity modules (SIM) to communicate with multiple active cellular networks is presented. The wireless device is configured to maintain a first communication connection with a first wide area network of the plurality of wide area networks; access second network metadata associated with a second wide area network of the plurality of wide area networks and the second eSIM; access third network metadata associated with a third wide area network of the plurality of wide area networks and the second eSIM; select the second wide area network based at least in part on a comparison between the second network metadata and the third network metadata; and establish a second communication connection with the second wide area network.

23 Claims, 28 Drawing Sheets

Routing Based on Source and Destination Network Characteristics

(51) Int. Cl.
 *H04W 48/18* (2009.01)
 *H04W 88/06* (2009.01)
(58) Field of Classification Search
 USPC ...................................................... 455/414.1
 See application file for complete search history.

(56) References Cited

U.S. PATENT DOCUMENTS

| | | |
|---|---|---|
| 6,778,830 B1 | 8/2004 | Oizumi et al. |
| 6,836,471 B2 | 12/2004 | Holma et al. |
| 6,845,238 B1 | 1/2005 | Muller |
| 7,319,871 B2 | 1/2008 | Sliva |
| 7,346,351 B2 | 3/2008 | Shin |
| 7,515,909 B2 | 4/2009 | Jain et al. |
| 8,089,934 B2 | 1/2012 | Long et al. |
| 8,170,564 B2 | 5/2012 | Sugiura et al. |
| 8,744,445 B2 | 6/2014 | Wu |
| 8,811,991 B2 | 8/2014 | Jain et al. |
| 8,897,265 B2 | 11/2014 | Kashimba et al. |
| 9,124,957 B1 | 9/2015 | Fogel et al. |
| 9,212,920 B1 | 12/2015 | Mannepalli et al. |
| 9,432,929 B1 | 8/2016 | Ross et al. |
| 10,506,666 B2 | 12/2019 | Rice et al. |
| 10,609,515 B1 | 3/2020 | Bender et al. |
| 11,013,064 B2 | 5/2021 | Rice et al. |
| 11,812,515 B2 | 11/2023 | Rice et al. |
| 2004/0192294 A1 | 9/2004 | Pan et al. |
| 2008/0242320 A1 | 10/2008 | Dennert et al. |
| 2009/0103597 A1 | 4/2009 | Choi et al. |
| 2009/0186651 A1 | 7/2009 | You et al. |
| 2010/0020793 A1 | 1/2010 | Croak et al. |
| 2011/0055434 A1 | 3/2011 | Pyers et al. |
| 2011/0201336 A1 | 8/2011 | Garrett et al. |
| 2011/0310865 A1 | 12/2011 | Kennedy et al. |
| 2013/0210421 A1 | 8/2013 | Mohseni et al. |
| 2013/0295986 A1 | 11/2013 | Mueck |
| 2013/0329639 A1 | 12/2013 | Wietfeldt |
| 2013/0345961 A1 | 12/2013 | Leader et al. |
| 2014/0200807 A1 | 7/2014 | Geisberger |
| 2015/0017962 A1 | 1/2015 | Howard et al. |
| 2015/0094071 A1 | 4/2015 | Hang et al. |
| 2015/0282057 A1 | 10/2015 | Li et al. |
| 2015/0289221 A1 | 10/2015 | Nayak et al. |
| 2015/0351073 A1 | 12/2015 | Ball et al. |
| 2016/0029274 A1 | 1/2016 | Ng et al. |
| 2016/0119469 A1 | 4/2016 | Schei et al. |
| 2016/0219421 A1 | 7/2016 | Shi et al. |
| 2016/0226539 A1 | 8/2016 | Batchu |
| 2016/0349059 A1 | 12/2016 | McGuire et al. |
| 2016/0353316 A1 | 12/2016 | Boettger et al. |
| 2016/0373948 A1 | 12/2016 | Sanka et al. |
| 2017/0048773 A1 | 2/2017 | Miao et al. |
| 2017/0223313 A1 | 8/2017 | Chong et al. |
| 2017/0314940 A1 | 11/2017 | Dave et al. |
| 2017/0366955 A1 | 12/2017 | William |
| 2018/0184309 A1 | 6/2018 | Bhardwaj |
| 2019/0012636 A1 | 1/2019 | Simon et al. |
| 2019/0043251 A1 | 2/2019 | Winkle et al. |
| 2019/0043372 A1 | 2/2019 | Winkle et al. |
| 2019/0234750 A1 | 8/2019 | Muldoon et al. |
| 2020/0370908 A1 | 11/2020 | Cajias et al. |
| 2020/0383152 A1 | 12/2020 | Walia et al. |
| 2021/0029612 A1 | 1/2021 | Hassan et al. |
| 2021/0124426 A1 | 4/2021 | Iwanami |
| 2021/0312818 A1 | 10/2021 | Kadavil et al. |
| 2022/0053607 A1 | 2/2022 | Rice et al. |
| 2022/0240213 A1 | 7/2022 | Ly et al. |
| 2023/0362978 A1 | 11/2023 | Xie et al. |

FOREIGN PATENT DOCUMENTS

| | | |
|---|---|---|
| CN | 101867979 A | 10/2010 |
| CN | 104883673 A | 9/2015 |
| CN | 104982050 A | 10/2015 |
| CN | 205071326 U | 3/2016 |
| CN | 107911856 A | 4/2018 |
| CN | 112314049 A | 2/2021 |
| EP | 1182900 B1 | 4/2004 |
| EP | 0676907 B1 | 6/2004 |
| EP | 1762105 A2 | 3/2007 |
| EP | 1363472 B1 | 7/2008 |
| EP | 1973368 A2 | 9/2008 |
| EP | 2083576 A1 | 7/2009 |
| EP | 2098022 A1 | 9/2009 |
| EP | 1843614 B1 | 3/2011 |
| EP | 1671496 B1 | 4/2012 |
| EP | 2461627 A1 | 6/2012 |
| EP | 2509349 A1 | 10/2012 |
| EP | 1041837 B1 | 12/2012 |
| EP | 2633628 A1 | 9/2013 |
| EP | 2833601 A2 | 2/2015 |
| EP | 3788840 | 3/2021 |
| JP | 2012-170090 | 9/2012 |
| JP | 2015-527774 | 9/2015 |
| JP | 2021-523657 | 9/2021 |
| KR | 10-627804 B1 | 9/2006 |
| KR | 10-2017-0141550 A | 12/2017 |
| KR | 10-2017-0141998 A | 12/2017 |
| KR | 10-2017-0142401 A | 12/2017 |
| KR | 10-2021-0008477 | 1/2021 |
| RU | 2491718 C2 | 8/2013 |
| RU | 2754353 | 9/2021 |
| TW | 2021/01923 | 1/2021 |
| TW | I811354 | 8/2023 |
| TW | I816035 | 9/2023 |
| WO | WO 2000/018170 A1 | 3/2000 |
| WO | WO 2007/047580 A2 | 4/2007 |
| WO | WO 2009/017133 A1 | 2/2009 |
| WO | WO 2013/023955 A2 | 2/2013 |
| WO | WO 2014/032570 A1 | 3/2014 |
| WO | WO 2016/023002 A1 | 11/2016 |
| WO | WO 2017/100473 A1 | 6/2017 |
| WO | WO 2017/209693 A1 | 12/2017 |
| WO | WO 2019/213117 A1 | 11/2019 |
| WO | WO 2020/231758 A1 | 11/2020 |
| WO | WO 2021/029869 A1 | 2/2021 |

OTHER PUBLICATIONS

Interoperable UE Handovers in LTE, Radisys, Sep. 2011, in 11 pages.
VoLTE with SRVCC: The second phase of voice evolution for mobile LTE devices, Qualcommm, Oct. 2012, in 10 pages.
Examination Report in Indian Application No. 2012017049916 dated Dec. 9, 2021 in 6 pages.
Extended European Search Report in European Application No. 19796576.7 dated Jun. 14, 2022 in 16 pages.
International Search Report and Written Opinion dated Jan. 28, 2022 in International Patent Application No. PCT/US2021/072093.
International Search Report and Written Opinion dated Jul. 23, 2019 in International Patent Application No. PCT/US2019/029972 in 5 pages.
International Search Report and Written Opinion dated Jun. 26, 2020 in International Patent Application No. PCT/US2020/031945.
Notice of Allowance in Japanese Patent Application No. 2021-510266, dated Aug. 2, 2022 in 3 pages.
Notice of Allowance in Korean Patent Application No. 10-2020-7032227, dated Sep. 15, 2022 in 4 pages.
Office Action in Australian Application No. 2019263145 dated Apr. 20, 2021 in 3 pages.
Office Action in Canadian Application No. 3098896 dated Oct. 29, 2021 in 6 pages.
Office Action in Chinese Application No. 201980042335.0 dated Jun. 30, 2023 in 11 pages.
Office Action in Japanese Application No. JP 2021-510266 dated Jan. 11, 2021 in 5 pages.
Office Action in Korean Application No. 10-2020-7032227 dated Sep. 15, 2021 in 9 pages.
Office Action in Taiwanese Application No. 108115041 dated Jun. 23, 2022 in 23 pages.

(56)     References Cited

OTHER PUBLICATIONS

Office Action in Taiwanese Application No. 11220346720 dated Apr. 14, 2023 in 19 pages.
Partial Supplementary European Search Report in European Application No. 19796576.7, dated Feb. 4, 2022 in 14 pages.
Search Report received in Russian Application No. 2020138945 dated Jan. 28, 2020 in 4 pages.
Search Report received in Russian Application No. 2020138945 dated Feb. 2, 2021 in 4 pages.
International Search Report and Written Opinion dated Jan. 6, 2026 in International Patent Application No. PCT/US2025/047408.

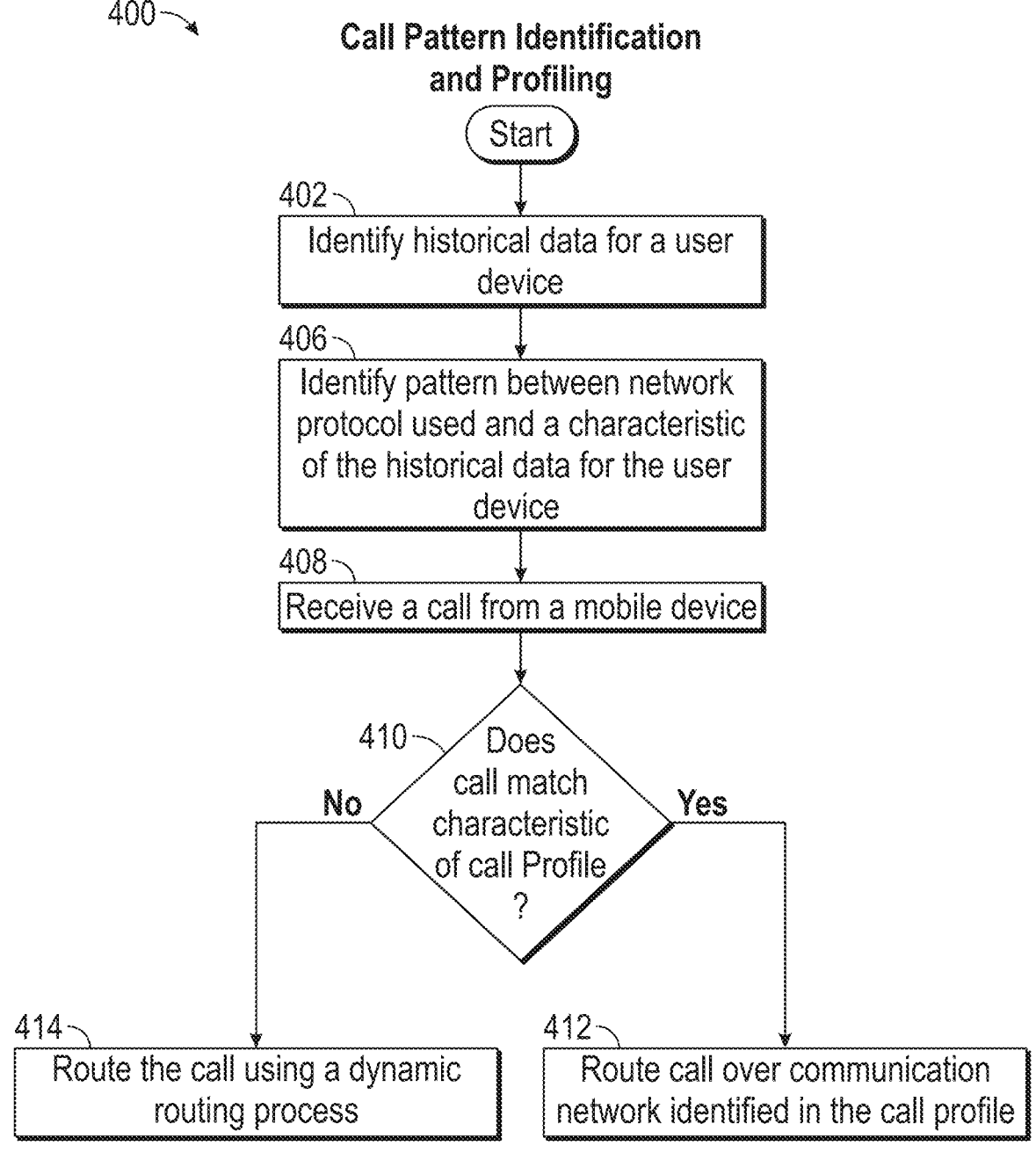

400

**Call Pattern Identification
and Profiling**

Start

402

Identify historical data for a user
device

406

Identify pattern between network
protocol used and a characteristic
of the historical data for the user
device

408

Receive a call from a mobile device

410    Does
call match
characteristic
of call Profile
?

No                                    Yes

414

Route the call using a dynamic
routing process

412

Route call over communication
network identified in the call profile

FIG. 4

Routing Based on Source and Destination Network Characteristics

ROUTE MAPPING PROCESS

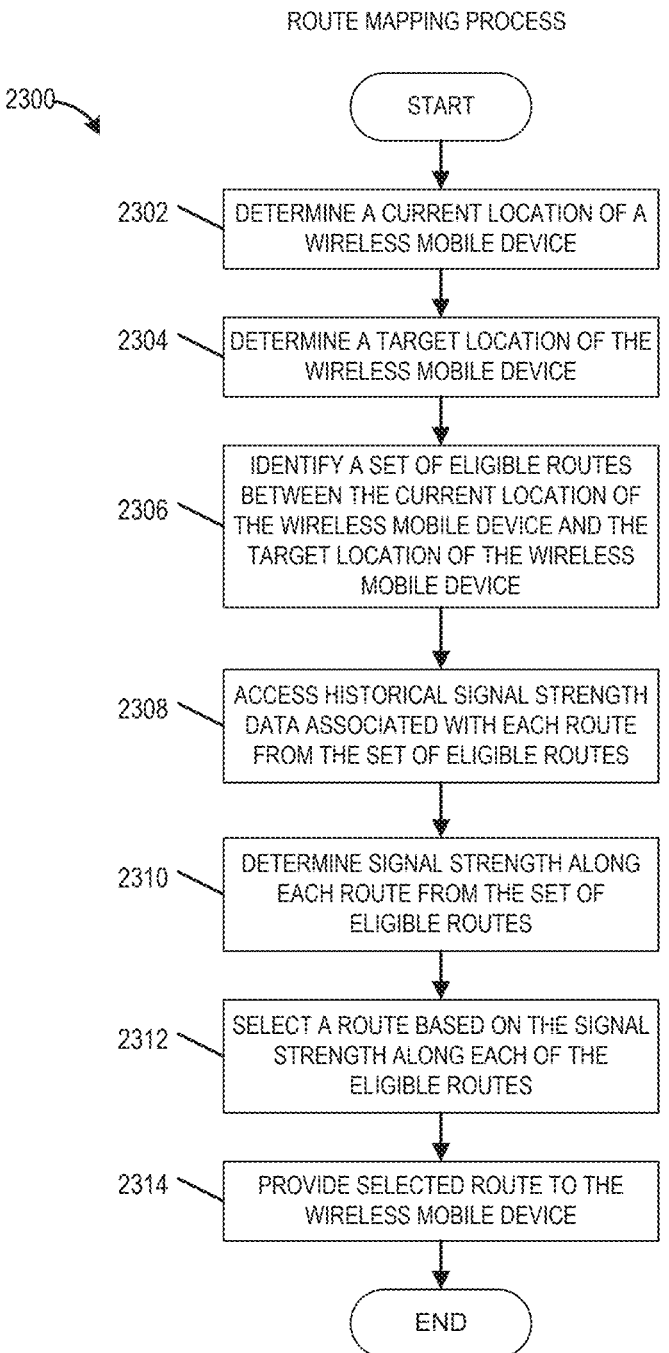

2300

START

2302 — DETERMINE A CURRENT LOCATION OF A WIRELESS MOBILE DEVICE

2304 — DETERMINE A TARGET LOCATION OF THE WIRELESS MOBILE DEVICE

2306 — IDENTIFY A SET OF ELIGIBLE ROUTES BETWEEN THE CURRENT LOCATION OF THE WIRELESS MOBILE DEVICE AND THE TARGET LOCATION OF THE WIRELESS MOBILE DEVICE

2308 — ACCESS HISTORICAL SIGNAL STRENGTH DATA ASSOCIATED WITH EACH ROUTE FROM THE SET OF ELIGIBLE ROUTES

2310 — DETERMINE SIGNAL STRENGTH ALONG EACH ROUTE FROM THE SET OF ELIGIBLE ROUTES

2312 — SELECT A ROUTE BASED ON THE SIGNAL STRENGTH ALONG EACH OF THE ELIGIBLE ROUTES

2314 — PROVIDE SELECTED ROUTE TO THE WIRELESS MOBILE DEVICE

END

FIG. 23

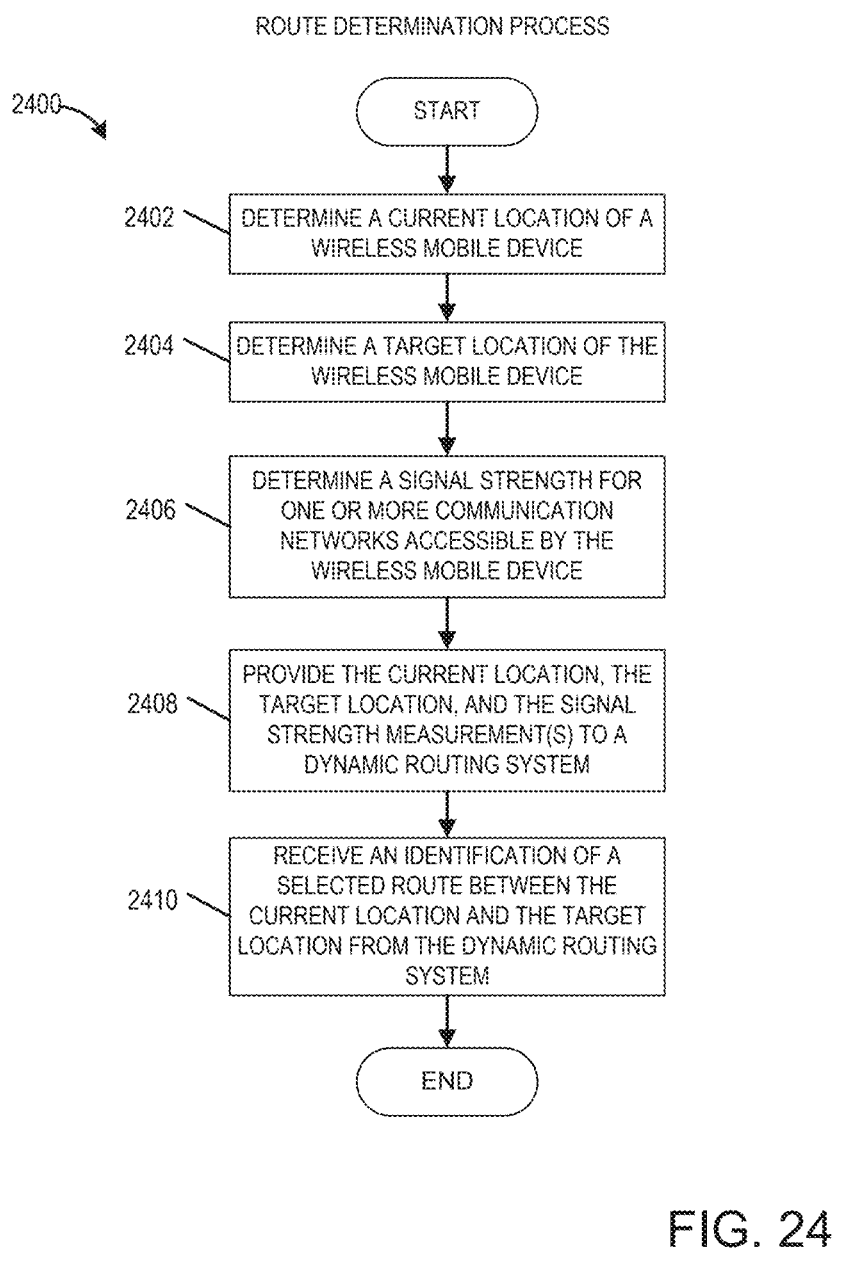

ROUTE DETERMINATION PROCESS

2400

START

2402 — DETERMINE A CURRENT LOCATION OF A WIRELESS MOBILE DEVICE

2404 — DETERMINE A TARGET LOCATION OF THE WIRELESS MOBILE DEVICE

2406 — DETERMINE A SIGNAL STRENGTH FOR ONE OR MORE COMMUNICATION NETWORKS ACCESSIBLE BY THE WIRELESS MOBILE DEVICE

2408 — PROVIDE THE CURRENT LOCATION, THE TARGET LOCATION, AND THE SIGNAL STRENGTH MEASUREMENT(S) TO A DYNAMIC ROUTING SYSTEM

2410 — RECEIVE AN IDENTIFICATION OF A SELECTED ROUTE BETWEEN THE CURRENT LOCATION AND THE TARGET LOCATION FROM THE DYNAMIC ROUTING SYSTEM

END

FIG. 24

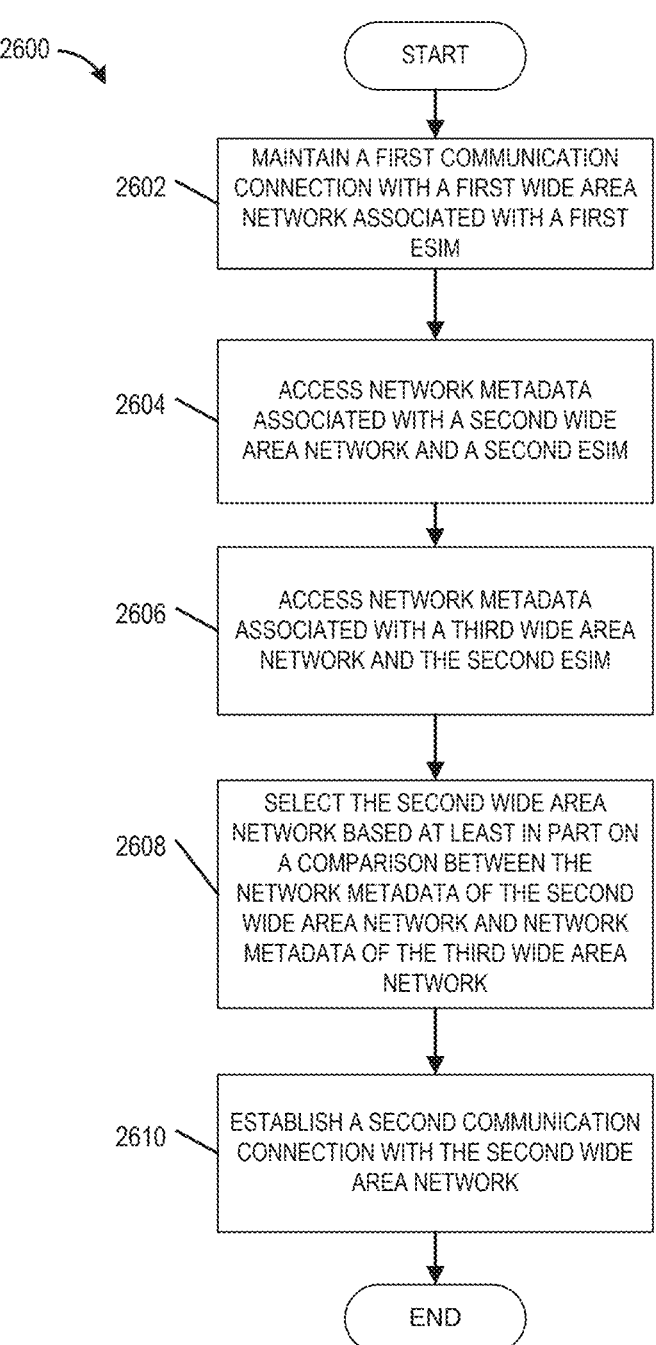

ESIM NETWORK SELECTION PROCESS

2600

START

2602 — MAINTAIN A FIRST COMMUNICATION CONNECTION WITH A FIRST WIDE AREA NETWORK ASSOCIATED WITH A FIRST ESIM

2604 — ACCESS NETWORK METADATA ASSOCIATED WITH A SECOND WIDE AREA NETWORK AND A SECOND ESIM

2606 — ACCESS NETWORK METADATA ASSOCIATED WITH A THIRD WIDE AREA NETWORK AND THE SECOND ESIM

2608 — SELECT THE SECOND WIDE AREA NETWORK BASED AT LEAST IN PART ON A COMPARISON BETWEEN THE NETWORK METADATA OF THE SECOND WIDE AREA NETWORK AND NETWORK METADATA OF THE THIRD WIDE AREA NETWORK

2610 — ESTABLISH A SECOND COMMUNICATION CONNECTION WITH THE SECOND WIDE AREA NETWORK

END

FIG. 26

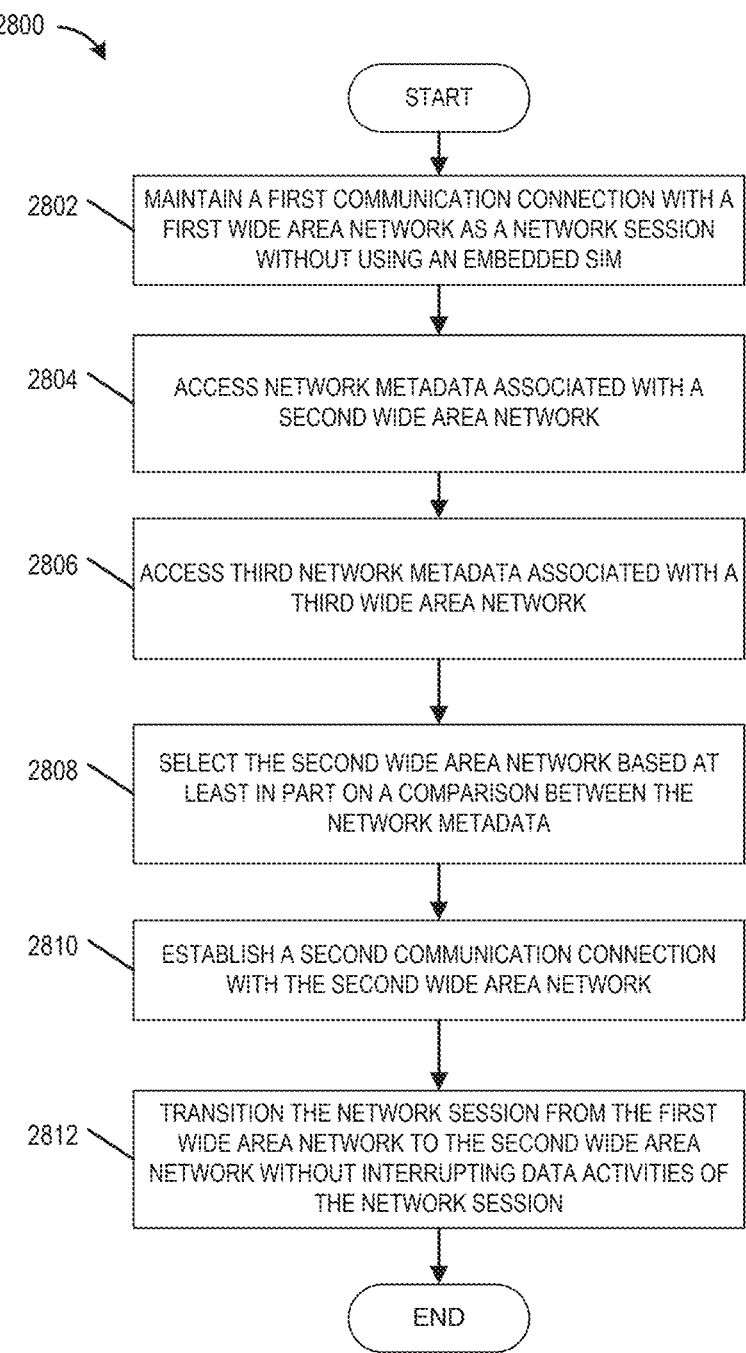

VSIM NETWORK SELECTION PROCESS

2800

START

2802 — MAINTAIN A FIRST COMMUNICATION CONNECTION WITH A FIRST WIDE AREA NETWORK AS A NETWORK SESSION WITHOUT USING AN EMBEDDED SIM

2804 — ACCESS NETWORK METADATA ASSOCIATED WITH A SECOND WIDE AREA NETWORK

2806 — ACCESS THIRD NETWORK METADATA ASSOCIATED WITH A THIRD WIDE AREA NETWORK

2808 — SELECT THE SECOND WIDE AREA NETWORK BASED AT LEAST IN PART ON A COMPARISON BETWEEN THE NETWORK METADATA

2810 — ESTABLISH A SECOND COMMUNICATION CONNECTION WITH THE SECOND WIDE AREA NETWORK

2812 — TRANSITION THE NETWORK SESSION FROM THE FIRST WIDE AREA NETWORK TO THE SECOND WIDE AREA NETWORK WITHOUT INTERRUPTING DATA ACTIVITIES OF THE NETWORK SESSION

END

FIG. 28

MULTIPLE ACTIVE NETWORK WIRELESS DEVICE

RELATED APPLICATIONS

This application claims priority to U.S. Provisional Application No. 63/698,267 filed Sep. 24, 2024 and titled "MULTIPLE ACTIVE NETWORK WIRELESS DEVICE," which is hereby incorporated by reference in its entirety for all purposes. This application incorporates by reference U.S. application Ser. No. 16/869,431, filed May 7, 2020 and titled "MULTIPLE ACTIVE NETWORK WIRELESS DEVICE USING A SHADOW NUMBER," the disclosure of which is hereby incorporated by reference in its entirety, and which is a continuation-in-part of U.S. application Ser. No. 16/690, 011, filed Nov. 20, 2019 and titled "MULTIPLE ACTIVE NETWORK WIRELESS DEVICE," the disclosure of which is hereby incorporated by reference in its entirety, and which is a continuation of U.S. application Ser. No. 16/399,796, which was filed on Apr. 30, 2019 and is titled "MULTIPLE ACTIVE NETWORK WIRELESS DEVICE," the disclosure of which is expressly incorporated by reference herein in its entirety for all purposes, and which claims priority to U.S. Provisional Application No. 62/665,103, which was filed on May 1, 2018 and is titled "SYSTEM AND METHOD FOR MULTI-NETWORK DYNAMIC ROUTING," the disclosure of which is expressly incorporated by reference herein in its entirety for all purposes. Further, U.S. application Ser. No. 16/399,796 also claims priority to U.S. Provisional Application No. 62/836,571, which was filed on Apr. 19, 2019 and is titled "MULTIPLE ACTIVE NETWORK WIRELESS DEVICE," the disclosure of which is expressly incorporated by reference herein in its entirety for all purposes. Further, U.S. application Ser. No. 16/869,431 also claims priority to U.S. Provisional Application No. 62/846,510, which was filed on May 10, 2019 and is titled "MULTIPLE ACTIVE NETWORK WIRELESS DEVICE," the disclosure of which is expressly incorporated by reference herein in its entirety for all purposes. Further, this application also incorporates by reference U.S. Provisional Application No. 63/107,799, which was filed on Oct. 30, 2020 and is titled "ROUTE GUIDANCE FOR A MULTIPLE ACTIVE NETWORK WIRELESS DEVICE," the disclosure of which is expressly incorporated by reference herein in its entirety for all purposes. Further, this application incorporates by reference in its entirety for all purposes U.S. application Ser. No. 13/367,133 (now U.S. Pat. No. 9,124,957), which was filed on Feb. 6, 2012 and is titled "SYSTEM AND METHOD FOR DYNAMIC MULTIFACTOR ROUTING." Any and all applications, if any, for which a foreign or domestic priority claim is identified in the Application Data Sheet of the present application are hereby incorporated by reference in their entireties under 37 CFR 1.57.

BACKGROUND

Network protocols can be used to connect devices for mobile communications. One way of connecting devices is using the Global System for Mobile Communications (GSM) architecture and/or standard, which may employ time-division multiple-access (TDMA) protocols. Voice from one device can be transformed into digital data, and given a channel and a time slot. The receiving device can listen to the voice during the assigned time slot. Some network protocols that compete with GSM implement Code-Division Multiple Access (CDMA), which can connect calls using a code division system. Call data may be encoded with a unique key and multiple call data may be transmitted at once. The receiving device may use the unique key to identify the data associated with the specific call to which the receiving device is connected.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a wireless device configured to communicate with at least one wide area network from a plurality of wide area networks, wherein the at least one wide area network is selected based at least in part on network metadata. The wireless device may include a memory including at least a first eSIM and a second eSIM, wherein the memory stores specific computer-executable instructions. Further, the wireless device may include a hardware processor in communication with the memory and configured to execute the specific computer-executable instructions to at least maintain, at a first point in time and at a first location, a first communication connection with a first wide area network of the plurality of wide area networks, wherein first network metadata is associated with the first wide area network and the first eSIM, and wherein the first wide area network is designated a primary carrier; access, at the first point in time and at the first location, second network metadata associated with a second wide area network of the plurality of wide area networks and the second eSIM; access, at the first point in time and at the first location, third network metadata associated with a third wide area network of the plurality of wide area networks and the second eSIM; select the second wide area network based at least in part on a comparison between the second network metadata and the third network metadata; and establish a second communication connection with the second wide area network, wherein the second wide area network is designated a standby carrier.

The wireless device of the preceding paragraph can include any combination or sub-combination of the following features: where the memory is configured to store the first network metadata, the second network metadata, and the third network metadata; where the first network metadata, the second network metadata, and the third network metadata is stored on a remote device accessible by the wireless device; where the hardware processor is further configured to execute the specific computer-executable instructions to at least: determine a first comparison result between the second network metadata and the first network metadata, designate the second wide area network as the primary carrier based at least in part on the first comparison result, and designate the first wide area network as the standby carrier based at least in part on the first comparison result; where the first comparison result indicates that a second signal strength corresponding to the second communication connection with the second wide area network is greater than a first signal strength corresponding to the first communication connection with the first wide area network; where the first comparison result indicates that a second bandwidth corresponding to the second communication connection with the second wide area network is greater than a first bandwidth corresponding to the first communication connection with the first wide area network; where the hardware processor is further configured to execute the specific computer-executable instructions to at least: maintain, at a second point in time, the second communication connection with the second wide area network, access, at the second point in time, fourth network metadata stored at the first eSIM and associated with a fourth wide area network of the plurality of wide area networks, access, at the second point in time, the first network metadata stored at the first eSIM and associated with the first wide area network of the plurality of wide area networks, select the fourth wide area network based at least in part on a comparison between the first network metadata and the fourth network metadata, and establish a third communication connection with the fourth wide area network, where the fourth wide area network is designated the standby carrier; where the hardware processor is further configured to execute the specific computer-executable instructions to at least end the first communication connection with the first wide area network based at least in part on the comparison between the first network metadata and the fourth network metadata; where the second point in time occurs when the wireless device is at a second location; where the hardware processor is further configured to execute the specific computer-executable instructions to at least: determine a second comparison result between the fourth network metadata and the second network metadata, designate the fourth wide area network as the primary carrier based at least in part on the second comparison result, and designate the second wide area network as the standby carrier based at least in part on the second comparison result; where, when the first wide area network is designated the primary carrier, the hardware processor is further configured to execute the specific computer-executable instructions to at least establish a call over the first wide area network or transmit a user data packet over the first wide area network; where, when the second wide area network is designated the standby carrier, the hardware processor is further configured to execute the specific computer-executable instructions to at least maintain the second communication connection with the second wide area network without establishing a call over the second wide area network and without transmitting a user data packet over the second wide area network until at least such time when the second wide area network is designated the primary carrier; where, when the second wide area network is designated the standby carrier, the hardware processor is further configured to execute the specific computer-executable instructions to at least maintain the second communication connection with the second wide area network without establishing a call over the second wide area network and without transmitting a user data packet over the second wide area network until at least such time when an application or a network location associated with the second wide area network is accessed; where the network metadata comprises at least one of: a signal strength of a communication connection with a wide area network of the plurality of wide area networks, a signal type of a signal used to communicate over the communication connection, an availability of data service over the communication connection, a bandwidth associated with the communication connection, historical signal strength data associated with the wide area network, a quality of service associated with the communication connection, a packet drop rate associated with the communication connection, a network security metric associated with the wide area network, or a network reliability metric associated with the wide area network; where the hardware processor is further configured to execute the specific computer-executable instructions to at least perform the comparison between the second network metadata and the third network metadata based at least in part on signal strength, signal type, availability of data service, or historical signal strength information; where the hardware processor is further configured to execute the specific computer-executable instructions to at least: determine a second signal strength corresponding to the second communication connection with the second wide area network, and determine a third signal strength corresponding to a third communication connection with the third wide area network, where the comparison compares the second signal strength corresponding to the second communication connection and the third signal strength corresponding to the third communication connection; where the hardware processor is further configured to execute the specific computer-executable instructions to at least: receive, from a gateway or the memory, a second signal strength corresponding to the second communication connection with the second wide area network, and receive, from the gateway or the memory, a third signal strength corresponding to a third communication connection with the third wide area network; where the comparison compares the second signal strength corresponding to the second communication connection and the third signal strength corresponding to the third communication connection; where the hardware processor is further configured to execute the specific computer-executable instructions to at least receive the comparison between the second network metadata and the third network metadata from a gateway or the memory; where the first wide area network is a cellular network; where the first wide area network is implemented using a first communication technology and is associated with a first service provider, and the second wide area network is implemented using a second communication technology and is associated with a second service provider; further comprises a primary antenna and a diversity antenna, where the hardware processor is further configured to execute the specific computer-executable instructions to at least: transmit and receive signals, through the primary antenna, of the first communication connection with the first wide area network, and receive signals, through the diversity antenna, of the second communication connection with the second wide area network; where the hardware processor is further configured to execute the specific computer-executable instructions to at least: determine a signal strength associated with the second communication connection with the second wide area network based at least in part on a signal received via the diversity antenna, and update the second network metadata based on the signal strength associated with the second communication connection with the second wide area network; where the first point in time comprises a first time period.

Certain aspects of the present disclosure relate to a method for establishing communication between a wireless device and at least one wide area network from a plurality of wide area networks, wherein the at least one wide area network is selected based at least in part on network metadata stored on the wireless device. The method performed by a hardware processor configured to execute specific computer-executable instructions, the method comprising maintaining, at a first point in time and at a first location, a first communication connection with a first wide area network of the plurality of wide area networks, wherein first network metadata associated with the first wide area network and a first embedded Subscriber Identity Module (eSIM) is stored in a memory of the wireless device, and wherein the first wide area network is designated a primary carrier; accessing, at the first point in time and at the first location, second network metadata stored in the memory and is associated with a second wide area network of the plurality of wide area networks and a second eSIM; accessing, at the first point in time and at the first location, third network metadata stored in the memory and associated with a third wide area network of the plurality of wide area networks and the second eSIM; selecting the second wide area network based at least in part on a comparison between the second network metadata and the third network metadata; and establishing a second communication connection with the second wide area network, wherein the second wide area network is designated a standby carrier.

The method of the preceding paragraph can include any combination or sub-combination of the following features: the method further comprises: determining a first comparison result between the second network metadata and the first network metadata, designating the second wide area network as the primary carrier based at least in part on the first comparison result, and designating the first wide area network as the standby carrier based at least in part on the first comparison result; where the first comparison result indicates that a second signal strength corresponding to the second communication connection with the second wide area network is greater than a first signal strength corresponding to the first communication connection with the first wide area network; where the first comparison result indicates that a second bandwidth corresponding to the second communication connection with the second wide area network is greater than a first bandwidth corresponding to the first communication connection with the first wide area network; the method further comprises: maintaining, at a second point in time, the second communication connection with the second wide area network, accessing, at the second point in time, fourth network metadata stored at the first eSIM and associated with a fourth wide area network of the plurality of wide area networks, accessing, at the second point in time, the first network metadata stored at the first eSIM and associated with the first wide area network of the plurality of wide area networks, selecting the fourth wide area network based at least in part on a comparison between the first network metadata and the fourth network metadata, and establishing a third communication connection with the fourth wide area network, where the fourth wide area network is designated the standby carrier; the method further comprises disconnecting from the first wide area network responsive, at least in part, on the comparison between the first network metadata and the fourth network metadata; where the second point in time occurs when the wireless device is at a second location; the method further comprises: determining a second comparison result between the fourth network metadata and the second network metadata, designating the fourth wide area network as the primary carrier based at least in part on the second comparison result, and designating the second wide area network as the standby carrier based at least in part on the second comparison result; where, when the first wide area network is designated the primary carrier, the method further comprises: establishing a call over the first wide area network, or transmitting a user data packet over the first wide area network; where, when the second wide area network is designated the standby carrier, the method further comprises maintaining the second communication connection with the second wide area network without establishing a call over the second wide area network and without transmitting a user data packet over the second wide area network until at least such time when the second wide area network is designated the primary carrier; where the network metadata comprises at least one of: a signal strength of a communication connection with a wide area network of the plurality of wide area networks, a signal type of a signal used to communicate over the communication connection, an availability of data service over the communication connection, a bandwidth associated with the communication connection, historical signal strength data associated with the wide area network, a quality of service associated with the communication connection, a packet drop rate associated with the communication connection, a network security metric associated with the wide area network, or a network reliability metric associated with the wide area network; the method further comprises performing the comparison between the second network metadata and the third network metadata based at least in part on signal strength, signal type, availability of data service, or historical signal strength information; the method further comprises: determining a second signal strength corresponding to the second communication connection with the second wide area network, and determining a third signal strength corresponding to a third communication connection with the third wide area network, where the comparison compares the second signal strength corresponding to the second communication connection and the third signal strength corresponding to the third communication connection; the method further comprises: receiving, from a gateway, a second signal strength corresponding to the second communication connection with the second wide area network, and receiving, from the gateway, a third signal strength corresponding to a third communication connection with the third wide area network, where the comparison compares the second signal strength corresponding to the second communication connection and the third signal strength corresponding to the third communication connection; the method further comprises receiving the comparison between the second network metadata and the third network metadata from a gateway; where the first wide area network is a cellular network; where the first wide area network is implemented using a first communication technology and is associated with a first service provider, and the second wide area network is implemented using a second communication technology and is associated with a second service provider; the method further comprises: transmitting and receiving signals, through a primary antenna, of the first communication connection with the first wide area network, and receiving signals, through a diversity antenna, of the second communication connection with the second wide area network; the method further comprises: determining a signal strength associated with the second communication connection with the second wide area network based at least in part on a signal received via the diversity antenna, and updating the second network metadata based on the signal strength associated with the second communication connection with the second wide area network; where the first point in time comprises a first time period.

Certain aspects of the present disclosure relate to wireless device configured to communicate with at least one wide area network from a plurality of wide area networks. The at least one wide area network is selected based at least in part on network metadata. The wireless device may include a memory configured to store a virtual subscriber identity module (vSIM), wherein the memory is further configured to store specific computer-executable instructions; and a hardware processor in communication with the memory. The hardware processor may be further configured to execute the specific computer-executable instructions to at least: maintain, at a first time period and at a first location, a first communication connection established with a first wide area network of the plurality of wide area networks based on first carrier profile information associated with the first wide area network and stored at the vSIM, wherein the first communication is associated with first network metadata, and wherein the first wide area network is designated a primary carrier; access, at the first time period and at the first location, second network metadata associated with a second wide area network of the plurality of wide area networks; access, at the first time period and at the first location, third network metadata associated with a third wide area network of the plurality of wide area networks; compare the second network metadata to the third network metadata; in response to determining that a metric of the second network metadata exceeds a corresponding metric of the third network metadata; designate the second wide area network as an active standby carrier in the vSIM and designate the third wide area network as an available standby carrier in the vSIM; establish a second communication connection with the second wide area network; and in response to determining at a second time period that the metric of the second network exceeds a corresponding metric of the first network metadata, transition a network session with a remote device from the first communication connection over the first wide area network to the second communication connection over the second wide area network.

The wireless device of the preceding paragraph can include any combination or sub-combination of the following features: where the hardware processor is further configured to execute the specific computer-executable instructions to at least in response to determining at a second time period that the metric of the second network exceeds a corresponding metric of the first network metadata, transition a network session with a remote device from the first communication connection over the first wide area network to the second communication connection over the second wide area network without interrupting data activities of the network session by requesting a next data packet from the second wide area network; where the hardware processor is further configured to execute the specific computer-executable instructions to at least: determine a time when the network session is not actively communicating packets, establish the second communication connection with the second wide area network during the time when the vSIM is inactive, in response to establishing the second communication connection with the second wide area network, obtain data from the second wide area network, and cease the first communication connection with the first wide area network, where the second wide area network is designated the primary carrier; where the hardware processor is further configured to execute the specific computer-executable instructions to at least: determine a time when the network session is actively communicating packets, establish the second communication connection with the second wide area network during the time when the vSIM is in active use, determine the wireless device is able to cease communicating with the first wide area network and connect to the second wide area network while maintaining a data transfer session, in response to establishing the second communication connection with the second wide area network, obtain data from the second wide area network during the data transfer session, and cease the first communication connection with the first wide area network, where the second wide area network is designated the primary carrier; where the memory is configured to store the first network metadata, the second network metadata, and the third network metadata; where the first network metadata, the second network metadata, and the third network metadata are stored on a remote device accessible by the wireless device; where the vSIM is configured to store a plurality of carrier profiles, where the plurality of carrier profiles comprise a first profile corresponding to one primary carrier, and where the plurality of carrier profiles comprise a second profile corresponding to one standby carriers; where the hardware processor is further configured to execute the specific computer-executable instructions to at least identify the first wide area network from the one primary carrier of the first profile; where the hardware processor is further configured to execute the specific computer-executable instructions to at least identify the second wide area network and the third wide area network from the one standby carrier of the second profile; where the hardware processor is further configured to execute the specific computer-executable instructions to at least: determine a first comparison result between the second network metadata and the first network metadata, designate the second wide area network as the primary carrier based at least in part on the first comparison result, and designate the first wide area network as the standby carrier based at least in part on the first comparison result; where the first comparison result indicates that a second signal strength corresponding to the second communication connection with the second wide area network is greater than a first signal strength corresponding to the first communication connection with the first wide area network; where the first comparison result indicates that a second bandwidth corresponding to the second communication connection with the second wide area network is greater than a first bandwidth corresponding to the first communication connection with the first wide area network; where the hardware processor is further configured to execute the specific computer-executable instructions to at least: maintain, at a second time period, the second communication connection with the second wide area network, access, at the second time period, fourth network metadata associated with a fourth wide area network of the plurality of wide area networks, access, at the second time period, the first network metadata associated with the first wide area network of the plurality of wide area networks, select the fourth wide area network based at least in part on a comparison between the first network metadata and the fourth network metadata, and establish a third communication connection with the fourth wide area network, where the fourth wide area network is designated the standby carrier; where the hardware processor is further configured to execute the specific computer-executable instructions to at least end the first communication connection with the first wide area network based at least in part on the comparison between the first network metadata and the fourth network metadata; where the second time period occurs when the wireless device is at a second location; where the hardware processor is further configured to execute the specific computer-executable instructions to at least: determine a second comparison result between the fourth network metadata and the second network metadata, designate the fourth wide area network as the primary carrier based at least in part on the second comparison result, and designate the second wide area network as the standby carrier based at least in part on the second comparison result; where, when the first wide area network is designated the primary carrier, the hardware processor is further configured to execute the specific computer-executable instructions to at least establish a call over the first wide area network or transmit a user data packet over the first wide area network; where, when the second wide area network is designated the standby carrier, the hardware processor is further configured to execute the specific computer-executable instructions to at least maintain the second communication connection with the second wide area network without establishing a call over the second wide area network and without transmitting a user data packet over the second wide area network until at least such time when the second wide area network is designated the primary carrier; where, when the second wide area network is designated the standby carrier, the hardware processor is further configured to execute the specific computer-executable instructions to at least maintain the second communication connection with the second wide area network without establishing a call over the second wide area network and without transmitting a user data packet over the second wide area network until at least such time when an application or a network location associated with the second wide area network is accessed; where the network metadata comprises at least one of: a signal strength of a communication connection with a wide area network of the plurality of wide area networks, a signal type of a signal used to communicate over the communication connection, an availability of data service over the communication connection, a bandwidth associated with the communication connection, historical signal strength data associated with the wide area network, a quality of service associated with the communication connection, a packet drop rate associated with the communication connection, a network security metric associated with the wide area network, or a network reliability metric associated with the wide area network; where the hardware processor is further configured to execute the specific computer-executable instructions to at least perform the comparison between the second network metadata and the third network metadata based at least in part on signal strength, signal type, availability of data service, or historical signal strength information; where the hardware processor is further configured to execute the specific computer-executable instructions to at least: determine a second signal strength corresponding to the second communication connection with the second wide area network, and determine a third signal strength corresponding to a third communication connection with the third wide area network, where the comparison compares the second signal strength corresponding to the second communication connection and the third signal strength corresponding to the third communication connection; where the hardware processor is further configured to execute the specific computer-executable instructions to at least: receive, from a gateway or the memory, a second signal strength corresponding to the second communication connection with the second wide area network, and receive, from the gateway or the memory, a third signal strength corresponding to a third communication connection with the third wide area network, where the comparison compares the second signal strength corresponding to the second communication connection and the third signal strength corresponding to the third communication connection; where the hardware processor is further configured to execute the specific computer-executable instructions to at least receive the comparison between the second network metadata and the third network metadata from a gateway or the memory; where the first wide area network is a cellular network; where the first wide area network is implemented using a first communication technology and is associated with a first service provider, and the second wide area network is implemented using a second communication technology and is associated with a second service provider; further comprises a primary antenna and a diversity antenna, where the hardware processor is further configured to execute the specific computer-executable instructions to at least: transmit and receive signals, through the primary antenna, of the first communication connection with the first wide area network, and receive signals, through the diversity antenna, of the second communication connection with the second wide area network; where the hardware processor is further configured to execute the specific computer-executable instructions to at least: determine a signal strength associated with the second communication connection with the second wide area network based at least in part on a signal received via the diversity antenna, and update the second network metadata based on the signal strength associated with the second communication connection with the second wide area network.

Certain aspects of the present disclosure relate to a method for establishing communication between a wireless device and at least one wide area network from a plurality of wide area networks. The plurality of wide area networks are associated to a virtual Subscriber Identity Module (vSIM), wherein the at least one wide area network is selected based at least in part on network metadata. The method may be implemented by a hardware processor of a wireless device configured to support communication with a memory. The method may include maintaining, at a first time period and at a first location, a first communication connection with a first wide area network of the plurality of wide area networks as a network session for the wireless device to receive data packets, wherein first network metadata is associated with the first wide area network, and wherein the first wide area network is designated a primary carrier, wherein the network session is established without using an embedded SIM; accessing, at the first time period and at the first location, second network metadata associated with a second wide area network of the plurality of wide area networks; accessing, at the first time period and at the first location, third network metadata associated with a third wide area network of the plurality of wide area networks; selecting the second wide area network based at least in part on a comparison between the second network metadata and the third network metadata; establishing a second communication connection with the second wide area network, wherein the second wide area network is designated a standby carrier; and transitioning the network session from the first wide area network to the second wide area network without interrupting data activities of the network session by requesting a next data packet from the second wide area network.

The method of the preceding paragraph can include any combination or sub-combination of the following features: where the method further comprises: determining a time when the vSIM is inactive, establishing the second communication connection with the second wide area network during the time when the vSIM is inactive, in response to establishing the second communication connection with the second wide area network, obtain data from the second wide area network, and ceasing the first communication connection with the first wide area network, where the second wide area network is designated the primary carrier; where the method further comprises: determining a time when the vSIM is in active use, establishing the second communication connection with the second wide area network during the time when the vSIM is in active use, determining the wireless device is able to cease communicating with the first wide area network and connect to the second wide area network while maintaining a data transfer session, in response to establishing the second communication connection with the second wide area network, obtaining data from the second wide area network during the data transfer session, and ceasing the first communication connection with the first wide area network, where the second wide area network is designated the primary carrier; where the vSIM is configured to store a plurality of carrier profiles, where the plurality of carrier profiles comprise a first profile corresponding to one or more primary carriers, and where the plurality of carrier profiles comprise a second profile corresponding to one or more standby carriers; where the method further comprises identifying the first wide area network from the one or more primary carriers of the first profile; where the method further comprises identifying the second wide area network and the third wide area network from the one or more standby carriers of the second profile; where the method further comprises storing the first network metadata, the second network metadata, and the third network metadata on the wireless device; where the method further comprises storing the first network metadata, the second network metadata, and the third network metadata on a remote device accessible by the wireless device; where the method further comprises: determining a first comparison result between the second network metadata and the first network metadata, designating the second wide area network as the primary carrier based at least in part on the first comparison result, and designating the first wide area network as the standby carrier based at least in part on the first comparison result; where the first comparison result indicates that a second signal strength corresponding to the second communication connection with the second wide area network is greater than a first signal strength corresponding to the first communication connection with the first wide area network; where the first comparison result indicates that a second bandwidth corresponding to the second communication connection with the second wide area network is greater than a first bandwidth corresponding to the first communication connection with the first wide area network; where the method further comprises: maintaining, at a second time period, the second communication connection with the second wide area network, accessing, at the second time period, fourth network metadata associated with a fourth wide area network of the plurality of wide area networks, accessing, at the second time period, the first network metadata associated with the first wide area network of the plurality of wide area networks, selecting the fourth wide area network based at least in part on a comparison between the first network metadata and the fourth network metadata, and establishing a third communication connection with the fourth wide area network, where the fourth wide area network is designated the standby carrier; where the method further comprises ending the first communication connection with the first wide area network based at least in part on the comparison between the first network metadata and the fourth network metadata; where the second time period occurs when the wireless device is at a second location; where the method further comprises: determining a second comparison result between the fourth network metadata and the second network metadata, designating the fourth wide area network as the primary carrier based at least in part on the second comparison result, and designating the second wide area network as the standby carrier based at least in part on the second comparison result; where, when the first wide area network is designated the primary carrier, the hardware processor is further configured to execute the specific computer-executable instructions to at least establish a call over the first wide area network or transmit a user data packet over the first wide area network; where, when the second wide area network is designated the standby carrier, the method further comprises maintaining the second communication connection with the second wide area network without establishing a call over the second wide area network and without transmitting a user data packet over the second wide area network until at least such time when the second wide area network is designated the primary carrier; where, when the second wide area network is designated the standby carrier, the method further comprises maintaining the second communication connection with the second wide area network without establishing a call over the second wide area network and without transmitting a user data packet over the second wide area network until at least such time when an application or a network location associated with the second wide area network is accessed; where the network metadata comprises at least one of: a signal strength of a communication connection with a wide area network of the plurality of wide area networks, a signal type of a signal used to communicate over the communication connection, an availability of data service over the communication connection, a bandwidth associated with the communication connection, historical signal strength data associated with the wide area network, a quality of service associated with the communication connection, a packet drop rate associated with the communication connection, a network security metric associated with the wide area network, or a network reliability metric associated with the wide area network; where the method further comprises performing the comparison between the second network metadata and the third network metadata based at least in part on signal strength, signal type, availability of data service, or historical signal strength information; where the method further comprises: determining a second signal strength corresponding to the second communication connection with the second wide area network, and determining a third signal strength corresponding to a third communication connection with the third wide area network, where the comparison compares the second signal strength corresponding to the second communication connection and the third signal strength corresponding to the third communication connection; where the method further comprises: receiving, from a gateway or a memory of the wireless device, a second signal strength corresponding to the second communication connection with the second wide area network, and receiving, from the gateway or the memory, a third signal strength corresponding to a third communication connection with the third wide area network, where the comparison compares the second signal strength corresponding to the second communication connection and the third signal strength corresponding to the third communication connection; where the method further comprises receiving the comparison between the second network metadata and the third network metadata from a gateway or a memory of the wireless device; where the first wide area network is a cellular network; where the first wide area network is implemented using a first communication technology and is associated with a first service provider, and the second wide area network is implemented using a second communication technology and is associated with a second service provider; where the method further comprises: transmitting and receiving signals, through a primary antenna, of the first communication connection with the first wide area network, and receiving signals, through a diversity antenna, of the second communication connection with the second wide area network; where the method further comprises: determining a signal strength associated with the second communication connection with the second wide area network based at least in part on a signal received via the diversity antenna, and updating the second network metadata based on the signal strength associated with the second communication connection with the second wide area network.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIG. 4 illustrates a flow diagram for one embodiment of a process for determining a call pattern and creating a caller profile in accordance with the teachings of the present disclosure.

14 using a dual-SIM dual-data active wireless device in accordance with certain embodiments of the present disclosure.

Figure 18:
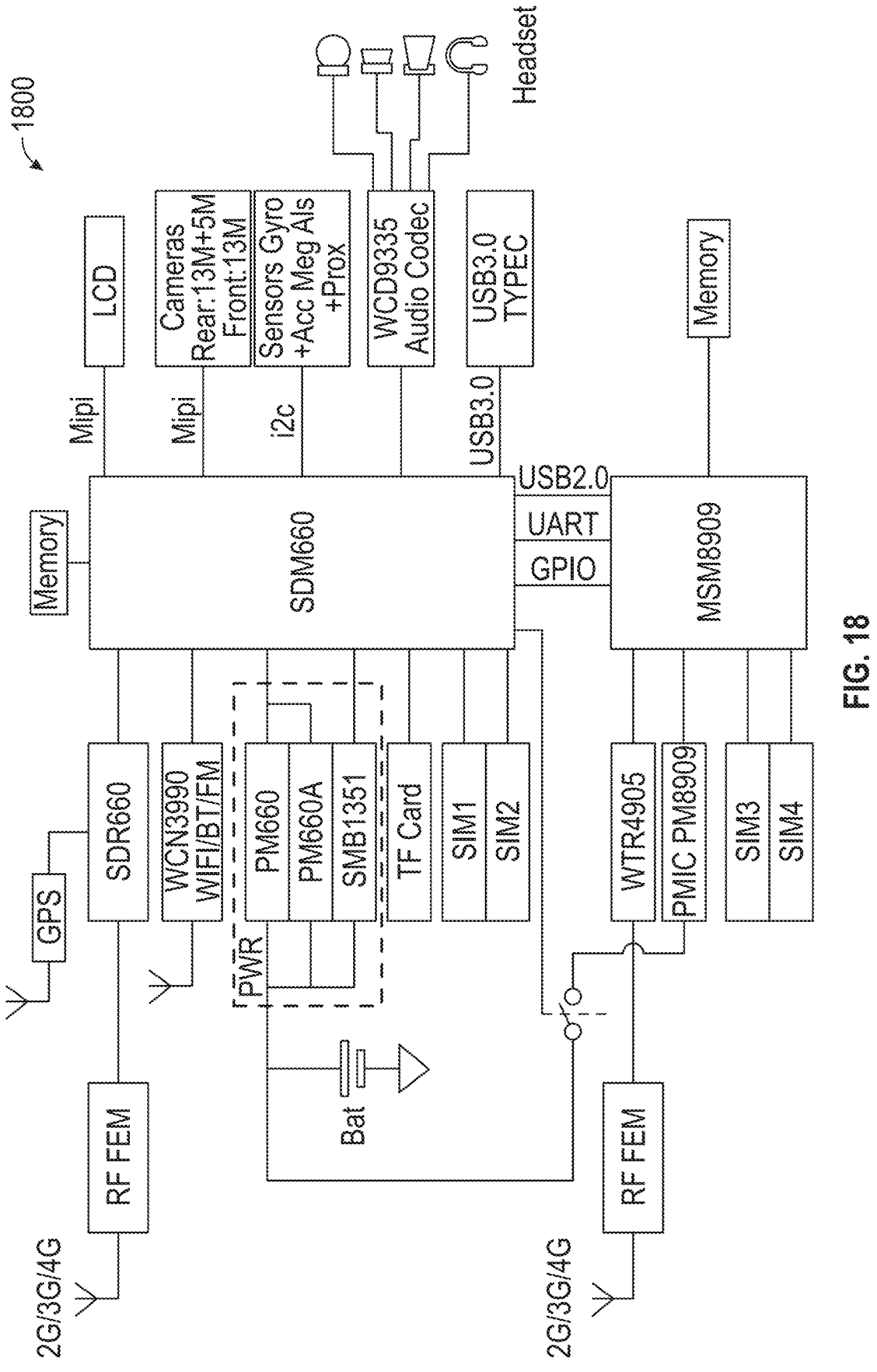

FIG. 18 illustrates a second example device-level implementation of a dual-SIM dual-data active wireless device in accordance with certain embodiments of the present disclosure.

Figure 19:
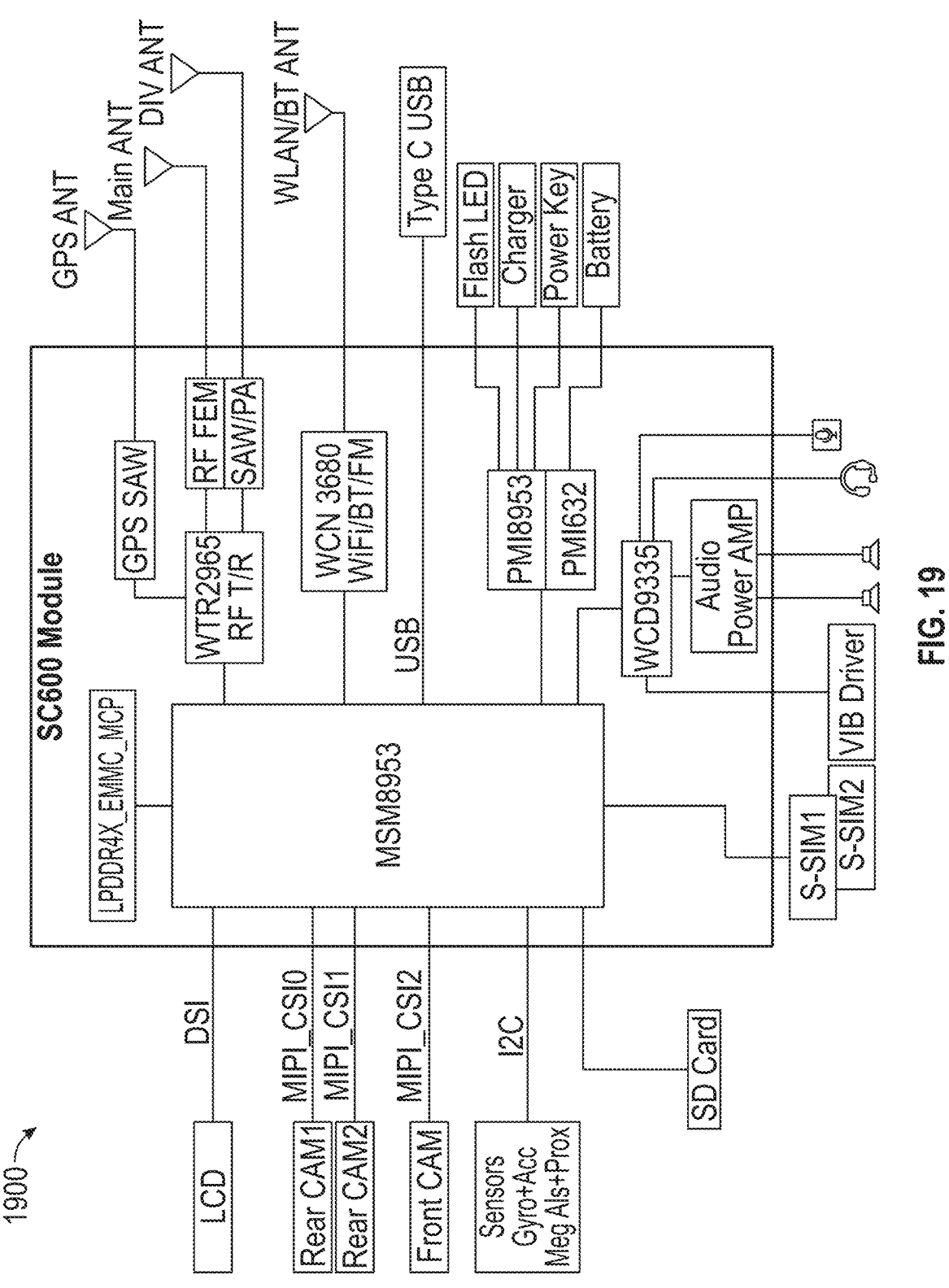

FIG. 19 illustrates a second example device-level implementation of a dual-SIM dual-data active wireless device in accordance with certain embodiments of the present disclosure.

Figure 20:
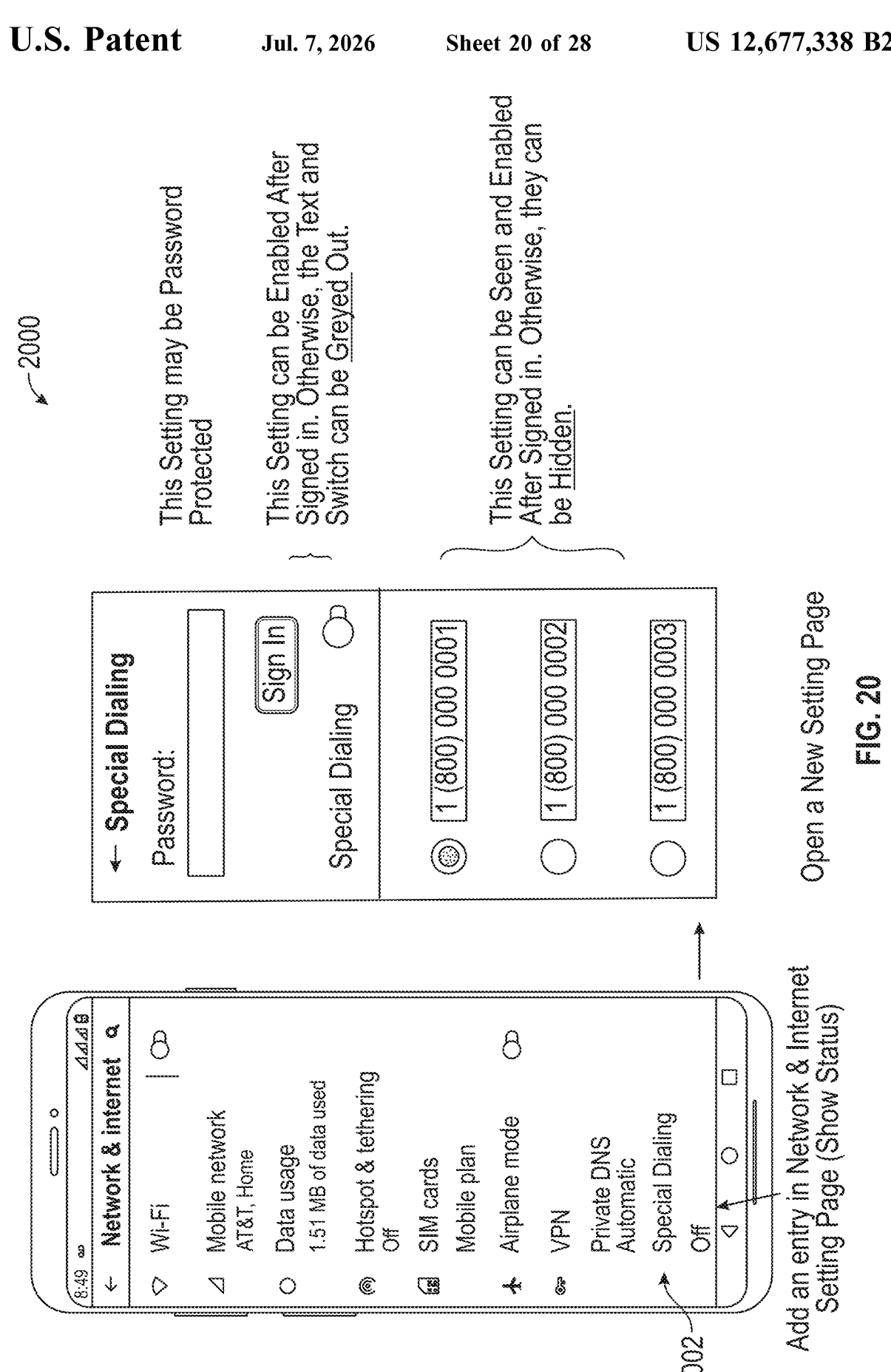

FIG. 20 illustrates an example user interface of a wireless device that may support a shadow number.

Figure 21:
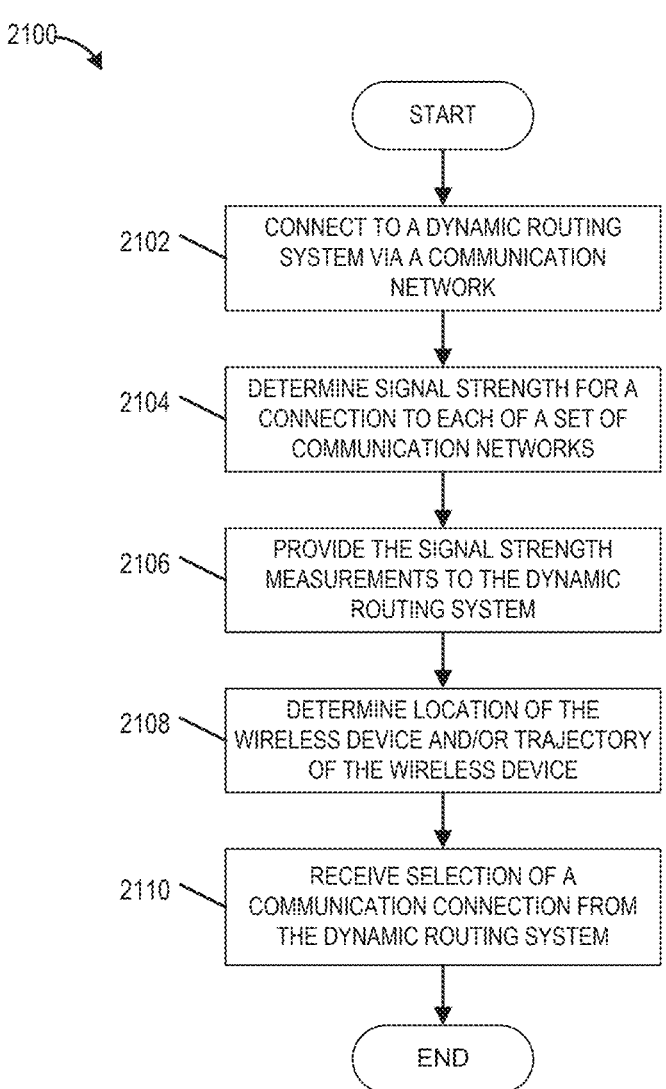

FIG. 21 illustrates a flow diagram for one embodiment of a centralized network selection process in accordance with the teachings of the present disclosure.

Figure 22:
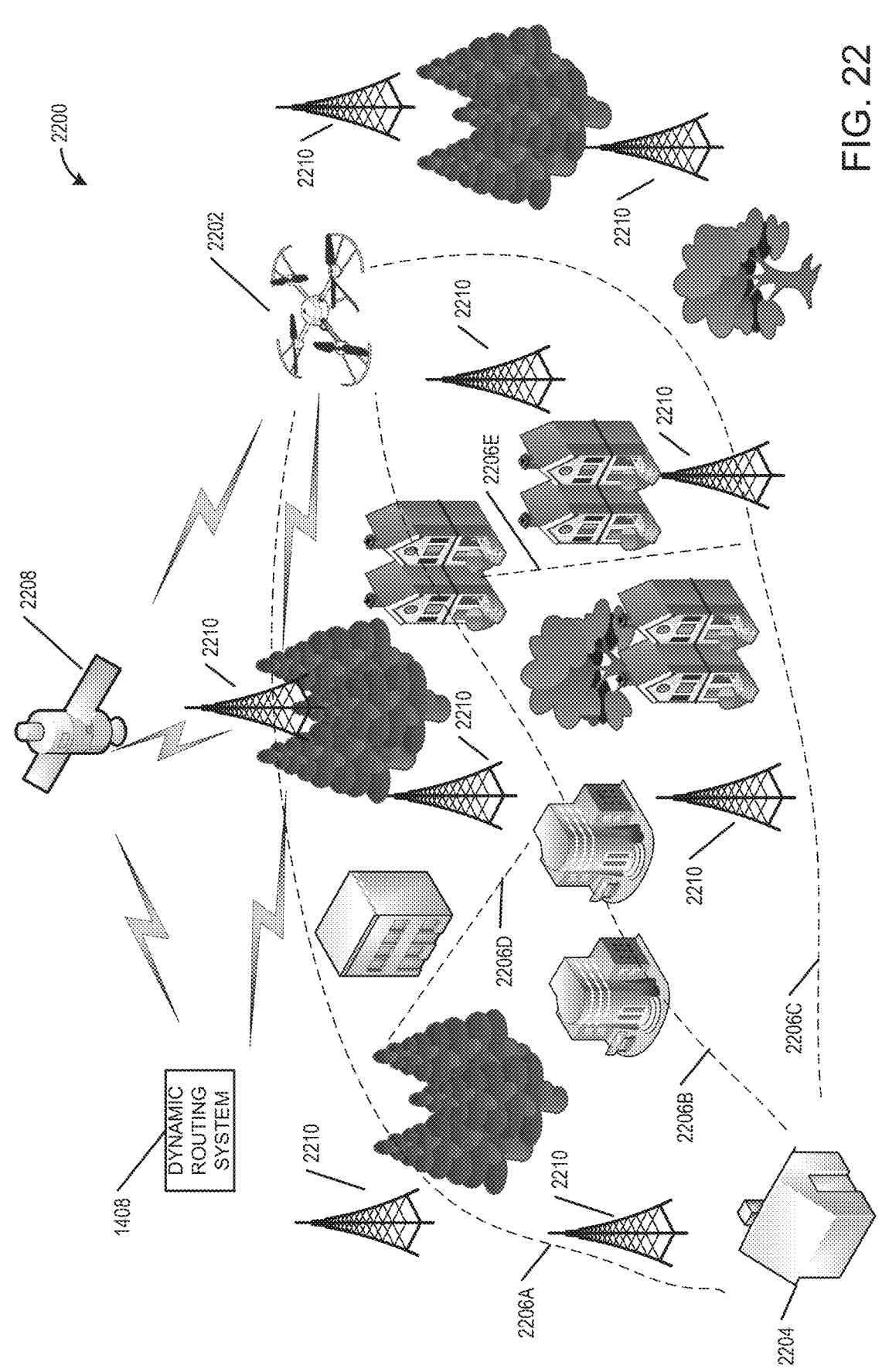

FIG. 22 illustrates an embodiment of a satellite communications environment in accordance with the teachings of the present disclosure.

FIG. 23 illustrates a flow diagram for an example embodiment of a route mapping process in accordance with the teachings of the present disclosure.

FIG. 24 illustrates a flow diagram for an example one embodiment of a route determination process in accordance with the teachings of the present disclosure.

Figure 25:
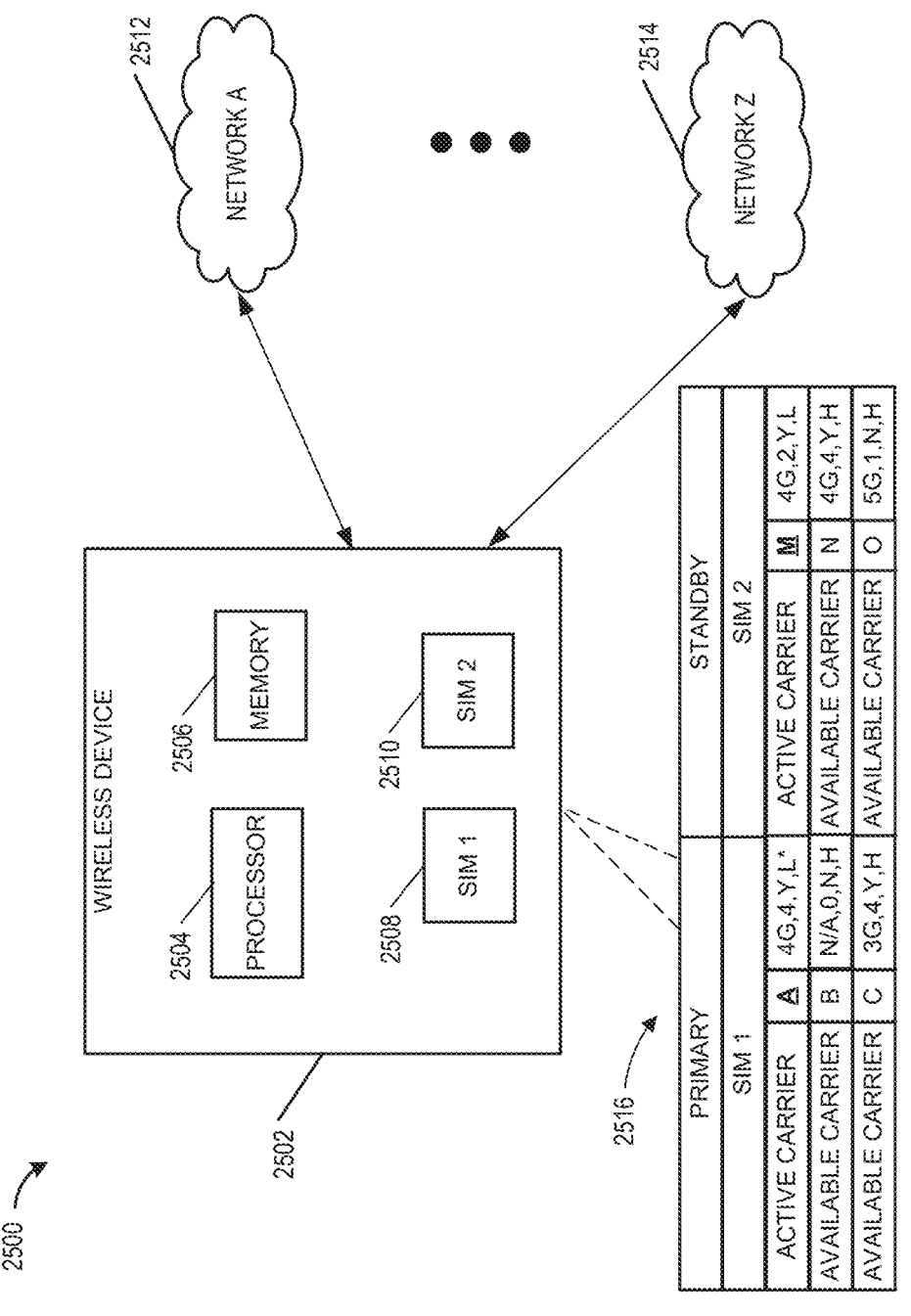

FIG. 25 illustrates an example communication environment for communicating using an embedded SIM wireless device in accordance with the teachings of the present disclosure.

FIG. 26 illustrates a flow diagram for an example embodiment of a network selection process in accordance with the teachings of the present disclosure.

Figure 27:
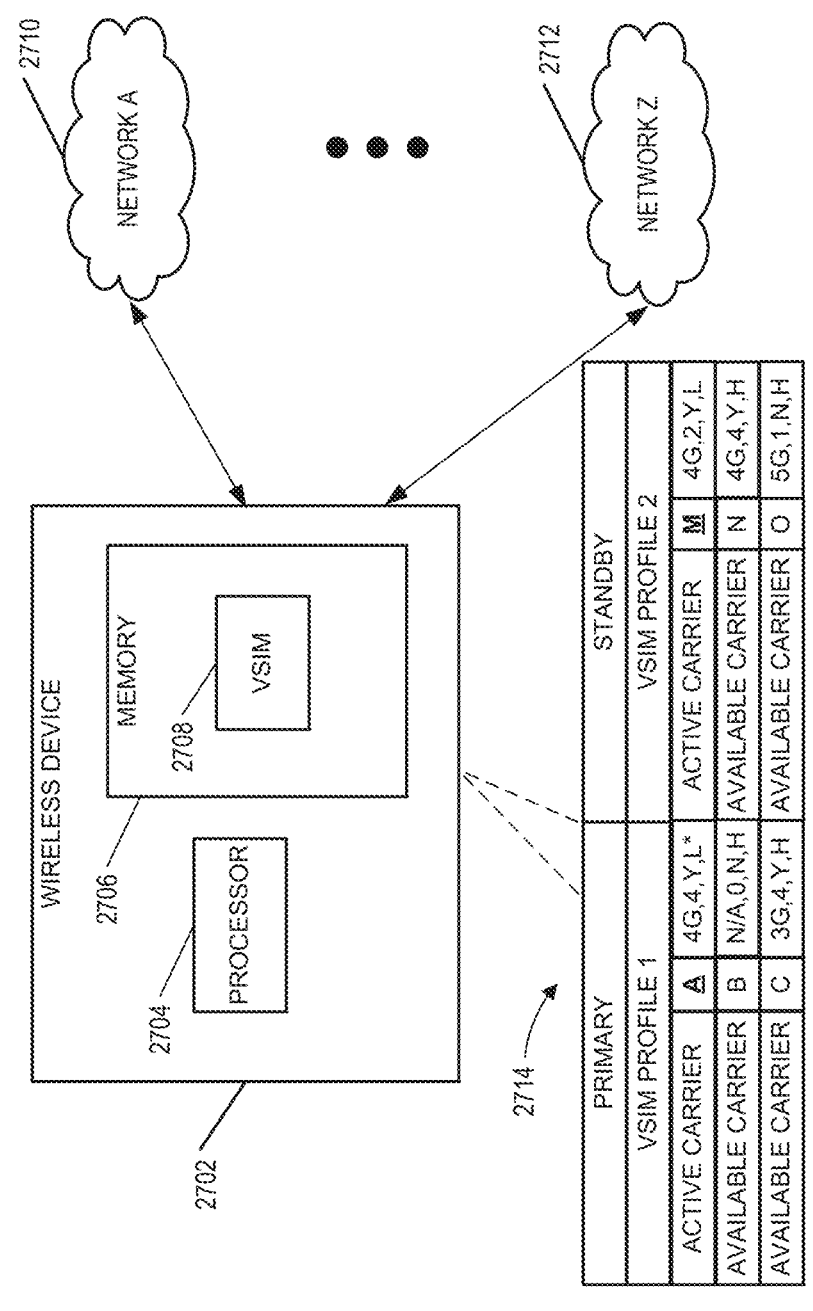

FIG. 27 illustrates an example communication environment for communicating using a virtual SIM wireless device in accordance with the teachings of the present disclosure.

FIG. 28 illustrates a flow diagram for an example embodiment of a network selection process in accordance with the teachings of the present disclosure.

DETAILED DESCRIPTION

Introduction

A number of routing systems decide how to route calls based on a single type of network protocol. In many cases, the communications devices are able to support a single type of network protocol, such as CDMA or GSM, which may implement a TDMA protocol or a CDMA protocol, or a subset of frequency bands used in cellular communication. In some embodiments, network protocols can include other network protocols that can be used to provide communication services to multiple users in a wired or wireless medium, such as frequency division multiple access (FDMA), orthogonal frequency division multiple access (OFDMA), spatial division multiple access (SDMA), WiFi technology, Bluetooth, Digital Enhanced Cordless Telecommunications (DECT), Near Field Communications (NFC), ZigBee, WiGig, Long-Term Evolution (LTE), and/or the like. In some such cases, the routing systems can route calls from one communications network provider to another communications network provider within the same network that implements the same type of network protocol. Limiting the routing of calls to communications network providers associated with networks using the same type of network protocol limits the availability of networks available for the call. Some networks that implement particular network protocols may provide better network connectivity at particular geographic or network locations than other networks that implement other network protocols. For example, a GSM network may provide better service than a CDMA network at a particular location. Furthermore, if many calls are made using the same network in a particular area, the network may suffer decreased performance.

This disclosure describes a number of systems and associated processes that can dynamically route calls over one or more communication networks, which may be provided by one or more communication network providers. The communication networks may implement different network protocols, such as CDMA or GSM. Further, some communication networks may utilize the same network protocol, but using different frequency bands. Moreover, this disclosure describes certain criteria that can be used to automatically identify the appropriate network for a call based on the criteria. In some cases, the criteria may include a geographical location, which may be associated with a particular network. In some such cases, a mobile device that can support multiple protocols may have increased options for networks that can process a call compared to traditional communication systems.

Further, this disclosure describes a number of systems and associated processes that enable pattern recognition and profiling of certain call patterns that can be used to determine an optimal network for a call. In certain embodiments, determining a network over which to route a call can be based at least in part on network characteristics of both the source and destination devices of the call. Advantageously, in some embodiments, a dynamic routing system can route calls that were initially established with a first communications network implementing a first network protocol, which may implement GSM, to a second communications network implementing a second network protocol, which may implement CDMA. As such, if one network using one network protocol has reduced network performance, the call can be rerouted over a different network using another network protocol, which may be owned or maintained by a different communications network provider. These and other features are described in greater detail below with respect to the figures.

Example Communications Environment

Figure 1:
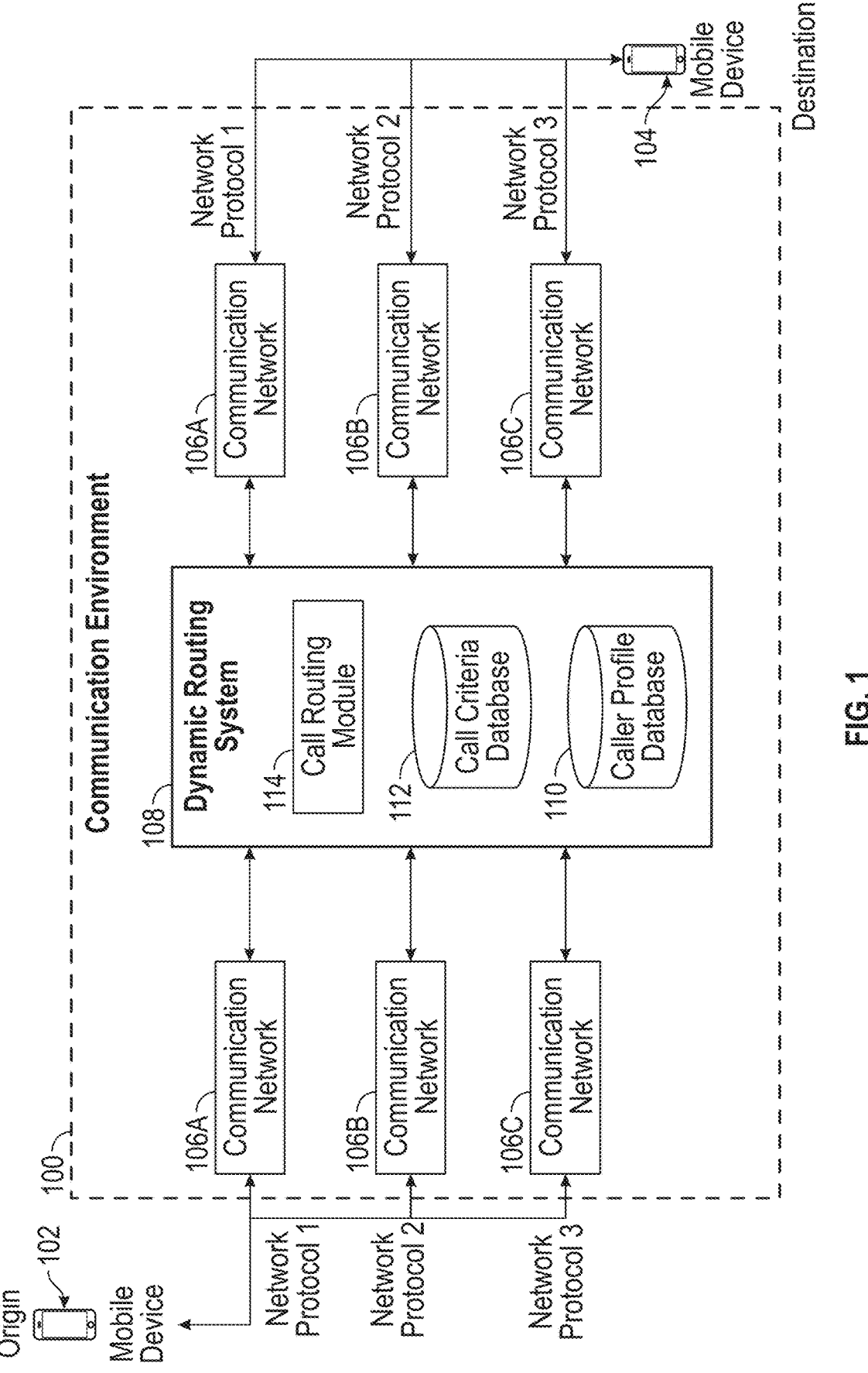
FIG. 1 illustrates an embodiment of a communications environment in accordance with the teachings of the present disclosure.

FIG. 1 illustrates an embodiment of a communications environment 100 in accordance with the teachings of the present disclosure. In the communications environment 100, a mobile device 102 can make a call to a mobile device 104. In the illustrated example, the mobile device 102 may be associated with a user who is initiating a call and may be referred to as the origin of the call, and the mobile device 104 may associated with a user who the caller desires to call and may be referred to as the target or destination for the call. However, it should be understood that the roles of the users, and consequently the roles of the mobile devices 102 and 104 may be reversed. The call is not limited in type and can include any type of call that may be performed over one or more communication networks that may implement one or more different communication protocols. For example, the call can be: a telephone call placed via mobile phone, a Voice over Internet Protocol (VOIP) call, or a modem call, to name a few. Further, the mobile device 102 and the mobile device 104 can include any user or organization capable of placing the call.

To establish the call connection between the mobile device 102 and the mobile device 104, the call may be routed over one or more different communication networks provided or maintained by one or more communication network providers. In some cases, each communication network may be owned or maintained by a different communication network provider. However, in some embodiments, multiple communication networks may be maintained by a single communication network provider. For example, a provider may maintain a 3G and 4G network. Further, the provider may be implementing a 5G network. Each of the 3G, 4G, or 5G networks may implement versions of the same communication profile or may implement different communication profiles.

In one embodiment, the call is routed to a dynamic routing system 108. The dynamic routing system 108 can determine one or more network protocols that are supported by a communication network 106 of a communications network provider. The communications environment illustrated three communication networks 106A, 106B, 106C, which may individually be referred to as a communication network 106 or collectively referred to as communication networks 106. For example, the dynamic routing system 108 may determine that a communication network 106A can implement a network protocol 1, a communications network 106B can implement a network protocol 2, and a communication network 106C can implement a network protocol 3. In some embodiments, the communication network 106A and 106C may both implement the network protocol 1, but using different frequency spectrums or bands. The dynamic routing system 108 can be associated with one or more of the communication network providers or with any entity that can offer systems or services for facilitating optimal or improved routing over one or more of the communication networks based on one or more routing criteria. For example, the dynamic routing system 108 may be configured to provide optimal or improved routing based on a criteria of improving call signal strength for calls or reducing dropped call rates for calls. Further, each communication network 106 can include a number of computing devices and/or telephony devices, such as session border controls and gateways, to facilitate communications within the communication network 106, between a plurality of communication networks 106, and/or with the dynamic routing system 108. Some non-limiting examples of these computing devices are illustrated in FIG. 1 with respect to the dynamic routing system 108 and are described further below. Although FIG. 1 illustrates a particular embodiment of a configuration of the communications environment 100, other configurations are possible. For example, other embodiments of the communications environment 100 may enable routing of calls directly to the dynamic routing system 108 prior to the calls being routed to a communication network 106. In some embodiments, the communications networks 106 can communicate directly with other communication networks.

In certain embodiments, when routing a call, the dynamic routing system 108 can determine a communication network 106 to route the call based on a number of factors. These factors can include, for example: the origin of the call; the destination of the call; the price charged to the dynamic routing system 108 to route a call over a communication network 106 and/or the price charged by the dynamic routing system 108 to receive a call from a communication network 106; network characteristics; geolocation of a caller; a pattern in historical call data; and/or the like. Some of these factors are discussed in more detail below.

In FIG. 1, several potential communication paths exist to connect the mobile device 102 to the mobile device 104 via the communications network providers 106 and the dynamic routing system 108. For example, a call from the mobile device 102 may be routed from the communications network 106A to the dynamic routing system 108, from the dynamic routing system 108 to the communications network 106C, and then from the communications network 106C to the mobile device 104. In some embodiments, the call from the mobile device 102 may be initially routed from the communications network 106A to the dynamic routing system 108. The dynamic routing system 108, based on one or more routing criteria, may subsequently instruct the mobile device 102 to use the communication network 106B to complete the call. Completing the call with the communications network 106B may include initiating a new call to the mobile device 104 using the communication network 106B. In certain embodiments, the initial call to the dynamic routing system 108 and the subsequent call to the mobile device 104 may occur with or without knowledge of the user initiating the call on the mobile device 102. Although a limited number of communication networks and call paths are illustrated in FIG. 1, it is possible for additional paths via additional communication networks to exist to connect the mobile device 102 with the mobile device 104. Further, note that although only one dynamic routing system 108 is illustrated, it is possible for multiple dynamic routing systems 108 to exist and for each dynamic routing system 108 to communicate with a number of communication networks, such as the communications network providers 106 in FIG. 1 and other dynamic routing systems 108.

In some embodiments, the dynamic routing system 108 includes a call routing module 114, a call criteria database 112, and a caller profile database 110. In some implementations, the dynamic routing system 108 may include multiple call routing modules 114, call criteria databases 112, and/or caller profile databases 110. Although illustrated as subsystems, it is possible in some embodiments for the call routing module 114, call criteria database 112, and/or caller profile database 110 to be separate systems that are external to the dynamic routing system 108 and with which the dynamic routing system 108 may communicate. The call criteria database 112 can include or store criteria for selecting a network using a particular network protocol by the call routing module 114, as described further herein. The caller profile database 110 can store profile information of a caller, such as historical call data, a pattern identified for callers, geolocation of the caller, and/or the like.

The call routing module 114 can route a call initiated by the mobile device 102 across one or more communication networks 106. To determine the one or more communication networks 106 upon which to route the call, the call routing module 114 can identify or determine call information associated with the call and use the identified information to facilitate selection of communication network 106. The call information may include network characteristics such as throughput and latency, supported network protocols of the mobile devices and/or available communication networks for the call, supported communication frequencies, and/or the like. Further, in some embodiments, the call information may include price or rate information for a cell phone plan of the caller user and/or the recipient user, and/or price or rate information for one or more of the communication networks to route the call on behalf of the dynamic routing system 108 or the one or more other communication networks.

The call routing module 114 can include any system that can receive a call and determine where to route the call. The call may be received from a communications network 106, an entity and/or processor associated with the communications network 106, the mobile device 102, the mobile device 104, the dynamic routing system 108, or any other system capable of providing the call to the call routing module 114. Further, the call routing module 114 can include any system that can provide and/or route a call to another system. This call can be provided to a communications network 106, an entity and/or processor associated with the communications network provider 106, the mobile device 102, the mobile device 104, and/or any other system capable of receiving the call from the call routing module 114. In addition, the call routing module 114 can include any system capable of providing and/or receiving call information associated with a call.

The call routing module 114 can prioritize and/or rank certain communications networks 106 or provider of communication networks. The call routing module 114 can include any system capable of receiving call information associated with a call and/or determining a ranked order routing list of networks 106 and/or communications network providers to which to route the call. For example, the call routing module 114 can be implemented by one or more computing systems and each computing system can include one or more processors. In certain embodiments, the call routing module 114 can implement one or more of the systems and/or perform one or more of the processes for routing a call that is disclosed in U.S. Pat. No. 9,124,957, issued on Sep. 1, 2015 and titled "SYSTEM AND METHOD FOR DYNAMIC MULTIFACTOR ROUTING," the entire disclosure of which is hereby incorporated by reference herein for all purposes.

In some embodiments, the call routing module 114 can rank a number of communications networks 106 to process a call. The call routing module 114 can receive call information associated with the call. Using the call information, the call routing module 114 can perform one or more ranking processes to determine a ranked routing list of communication networks. The ranked routing list can indicate a ranked order for communication networks and/or communication network providers that are capable of routing the call and that satisfy a set of network selection criteria. The call routing module 114 can include any system capable of determining the ranked order routing list for a call based on a number of criteria or factors. The call routing module 114 can rank the available networks 106 and/or communications network providers based on certain weighted values for the networks and/or communications network providers. For example, the weightings can be determined based on a network throughput capability, a price or profit margin when using a network and/or the communication network provider, a caller profile retrieved from the caller profile database 110, a certain criteria of a call retrieved from the call criteria database 112, such as a geographical location, a current number of calls routed to the communication network 106, a network and/or associated communication network provider rating, and/or the like.

Call Routing

Figure 2:
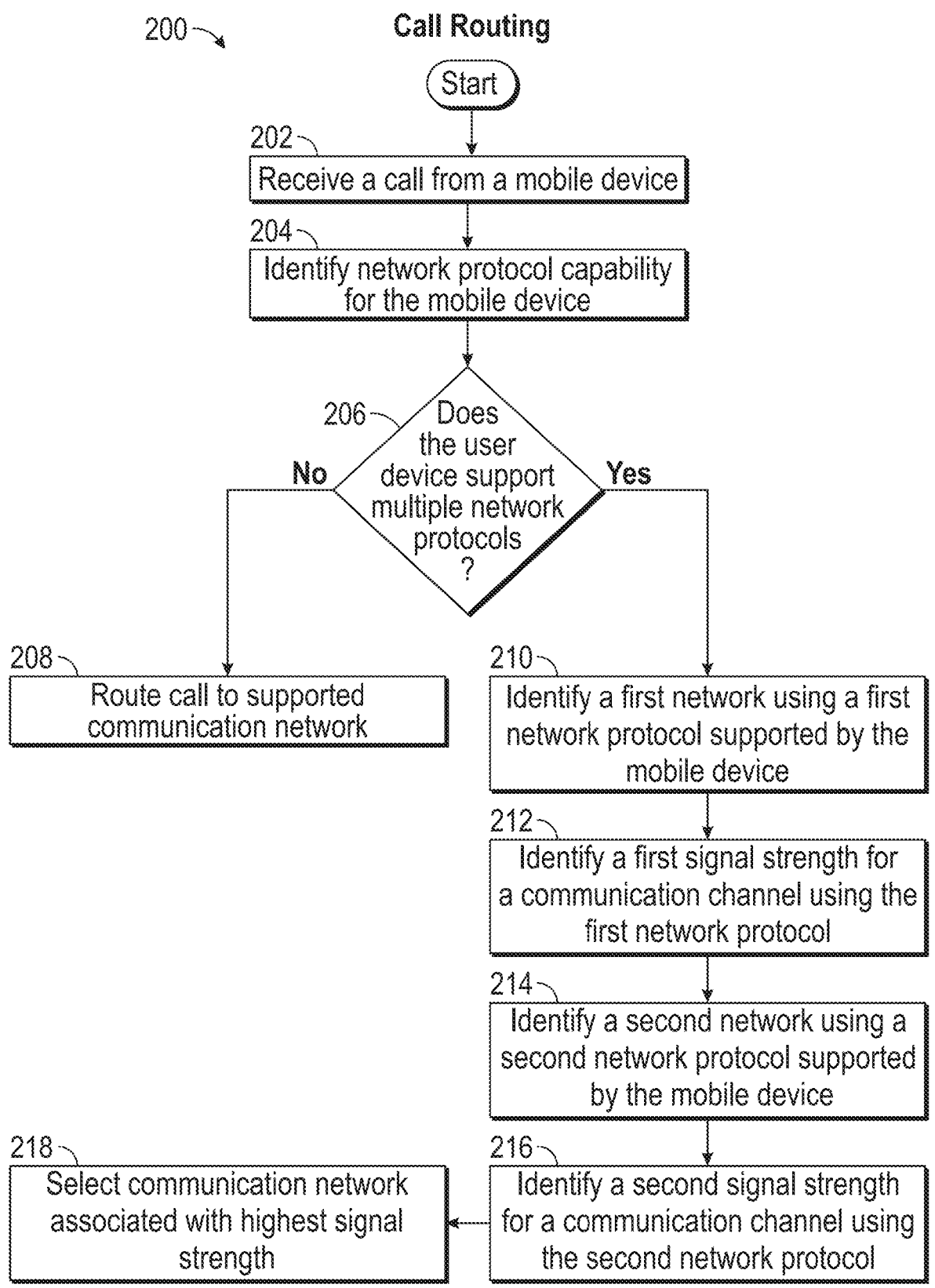
FIG. 2 illustrates a flow diagram for one embodiment of a dynamic call routing process in accordance with the teachings of the present disclosure.

FIG. 2 illustrates a flow diagram for one embodiment of a dynamic call routing process 200 in accordance with the teachings of the present disclosure. The process 200 can be performed by any system capable of routing a call including a communications network 106 that initially received a call from the mobile device 102, a communications network provider 106 that completed the final call connection to the mobile device 104, a communications network between an initial network that received that call and a destination network that provided the call to the mobile device 104, a dynamic routing system 108, and/or the like. Although a number of different systems may perform some or all of the process 200, to simplify discussion, the process 200 will be described with respect to particular systems.

The process begins at block 202 when, for example, the dynamic routing system 108 receives a call initiated by a mobile device 102. In some embodiments, receiving a call may include receiving an indication that a user is attempting or likely to attempt to initiate a call. For example, when a user opens a dialer or other application on a phone or when a user enters or begins to enter a phone number to initiate a call, the process 200 may be initiated enabling the selection of a preferred network for completing the call prior to the call being initiated.

At block 204, the dynamic routing system 108 determines the one or more network protocols supported by the mobile device 102. The network protocols can include, for example, CDMA, GSM, or other supported cellular network protocols. Further, in some embodiments, the block 204 may include identifying one or more frequency bands and/or network providers supported by the mobile device 102. In some embodiments, the dynamic routing system 108 can route among a variety of communication networks that may vary based on the protocol implemented, the frequency bands supported, the communications standards supported (for example 3G, 4G, or 4G LTE) or other characteristics of the communication network that may, in some cases, impact which wireless devices can communicate with the communication network. For example, the dynamic routing system 108 may route a call between different GSM carriers, between different CDMA carriers, between a carrier implementing a 4G communication standard and a carrier implementing a 3G communications standard, and/or the like. To simplify discussion, and not to limit the present disclosure, a number of embodiments disclosed herein are described with respect to routing a call between a GSM and a CDMA network.

At decision block 206, the dynamic routing system 108 determines whether the mobile device 102 supports a plurality of network protocols, such as a dual network protocol capability. This determination can be based, at least in part, on the determination that the mobile device 102 supports both GSM and CDMA protocols, or other network protocols. In some embodiments, a network that supports a particular network protocol can be associated with one SIM card of a mobile device, and another network that supports a different network protocol can be associated with another SIM card of the mobile device.

If it is determined at the decision block 206 that the mobile device 102 supports multiple network protocols, at block 210, the dynamic routing system 108 identifies a first network 106A that implements a first network protocol supported by the mobile device 102. For example, the first communications network 106A may implement a GSM protocol.

At block 212, the dynamic routing system 108 identifies a first signal strength for a communication channel using the first communication network 106A. Determining the signal strength may include sending a request to the mobile device 102 for a measurement of the first signal strength and/or may include receiving the measured first signal strength from the mobile device 102. The communication channel may be between the mobile device 102 and an initial base station or cell tower of the communication network 106A, which may be referred to as a first hop or first mile. Alternatively, or in addition, the first communication channel may include a greater portion of the communication channel between the mobile device 102 and the communication network 106A and/or the mobile device 104. In some cases, the signal strength is the signal strength between the mobile device 102 and the initial base station or cell tower.

At block 214, the dynamic routing system 108 identifies a second network 106B that implements a second network protocol supported by the mobile device 102. For example, the second communications network 106C may implement a CDMA protocol.

At block 216, the dynamic routing system 108 identifies a second signal strength for a communication channel using the second communication network 106B. In certain embodiments, the block 216 can include one or more of the embodiments described with respect to the block 212.

At block 218, based at least in part on the first and second signal strengths, the dynamic routing system 108 can select a communication network associated with the higher signal strength for the mobile device 102 to route the call. Routing the call via the network for which the mobile device 102 has the highest signal strength may include providing the mobile device 102 with the identity of the network associated with the highest signal strength enabling the mobile device 102 to initiate the call with the communications network that offers the best signal strength for the mobile device 102 at the particular location and time when the process 200 was initiated. Alternatively, or in addition, the dynamic routing system 108 can cause the call to be routed to the communication network with the highest signal strength on behalf of the mobile device 102. In certain embodiments, the process 200 may be used to identify a network to route a call based on alternative or additional criteria to signal strength. For example, drop call rate, time-of-day pricing, available network bandwidth, or other information may be used to identify a network to route the call. In certain embodiments, the operations associated with the blocks 214 and 216 may be repeated for each communication network or communication network protocol supported by the mobile device 102 or with which the mobile device 102 is capable of communicating. For example, the operations may be repeated for the communication network 106C.

If it is determined at decision block 206 that the mobile device 102 does not support multiple network protocols, at the block 208, the call is routed to the network supported by the mobile device 102.

Figure 3:
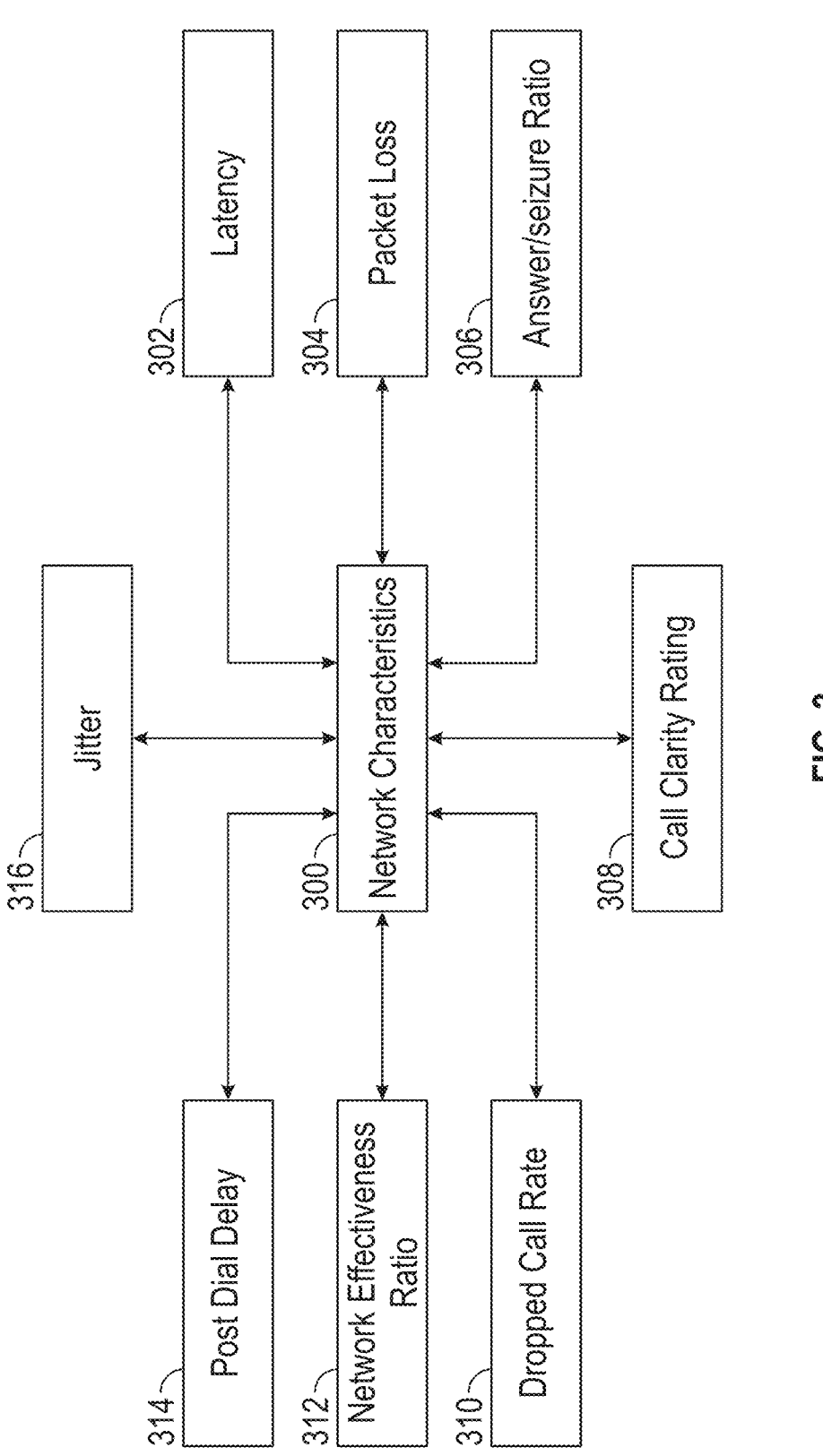
FIG. 3 illustrates a diagram illustrating various network characteristics that can be used to determine which communications network provider and/or network protocol to use to connect the call in accordance with the teachings of the present disclosure.

FIG. 3 illustrates a diagram identifying various network characteristics 300 that can be used to determine which network associated with a communications network provider and/or network protocol to use to connect the call in accordance with the teachings of the present disclosure. A non-limiting list of network characteristics 300 can include network latency 302, packet loss 304, an answer/seizure ratio 306, a call clarity rating 308, a dropped call rate 310, a network effectiveness ratio 312, a post dial delay 314, jitter 316, and/or the like. For example, the network latency 302 for a first network using the GSM protocol with a first communications network provider that supports the GSM protocol may be lower than that of a second network using the CDMA protocol with a second communications network provider that supports the CDMA protocol. In the example of block 216 of FIG. 2, the dynamic routing system 108 can route the call to a network using the GSM protocol because of the improved network latency 302 performance.

Call Pattern Identification and Profiling

FIG. 4 illustrates a flow diagram for one embodiment of a process 400 for determining a call pattern and creating a caller profile in accordance with the teachings of the present disclosure. The process 400 can be performed by any system capable of determining a call pattern and/or creating and/or applying a caller profile. Although a number of different systems may perform some or all of the process 400, to simplify discussion, the process 400 will be described with respect to particular systems.

The process begins at block 402 when, for example, the dynamic routing system 108 identifies historical call data for a mobile device 102. In some embodiments, the historical call data is associated with a user or phone number associated with the mobile device 102. Thus, the historical call data may include historical data for multiple devices that are or have been associated with a user or phone number. The historical call data can include information relating to when calls are made, where the calls are made from (e.g., a home or business address, an urban or rural area, and the like), who is being called, and/or the like. For example, the historical call data may indicate that a particular user or mobile device 102 typically makes a call around 2:00 PM to a particular number each day, or on weekends.

At block 406, the dynamic routing system 108 identifies a pattern between the network and/or network protocol used, and a characteristic of the historical data for the mobile device 102. Using the identified patterns, a call profile can be established for the user or mobile device 102. For example, the dynamic routing system 108 can determine that a user initiates a call every evening from the user's home to a particular number (e.g., a number associated with the user's uncle). The dynamic routing system 108 can determine that the call occurs between a certain time period, such as between 8 PM to 10 PM. The dynamic routing system 108 can determine that the network that is frequently selected for this call or that provides the best signal strength is a particular network. The dynamic routing system 108 can establish criteria to automatically route the call to the particular network when a call is made that matches the profile created based on the historical data. In some embodiments, a machine learning process can be used to identify call profiles for a user or mobile device 102.

At block 408, the dynamic routing system 108 receives a call initiated by the mobile device 102, from a communications network. Receiving the call may include determining characteristics associated with the call, such as time of day, identity of the caller, location of the caller, and the like. For example, the dynamic routing system 108 can determine whether the request is to and/or from a certain caller, is being made in a certain time frame and/or geolocation, a call type and/or the like. In one embodiment, identifying the call type can include, for example: identifying if the call origin and/or the call destination is international; identifying if the call is interstate; identifying if the call is intrastate; identifying if the call is a fax call; identifying if the call is a modem call; identifying if the call is a toll-free call; and identifying if the call is a premium-rate call, to name a few.

At decision block 410, the dynamic routing system 108 determines whether the characteristics of the call matches characteristics of a call profile associated with the user or mobile device 102.

If the characteristics of the call satisfy a particular call profile, the dynamic routing system 108 routes the call using communication a network identified in the call profile at block 412. If the characteristics of the call do not satisfy a call profile, the dynamic routing system 108, at block 414, routes the call using a dynamic routing process, such as the process 200. In some embodiments, the call may be routed using a traditional routing process at block 414.

22

Geolocation Profiling

Figure 5:
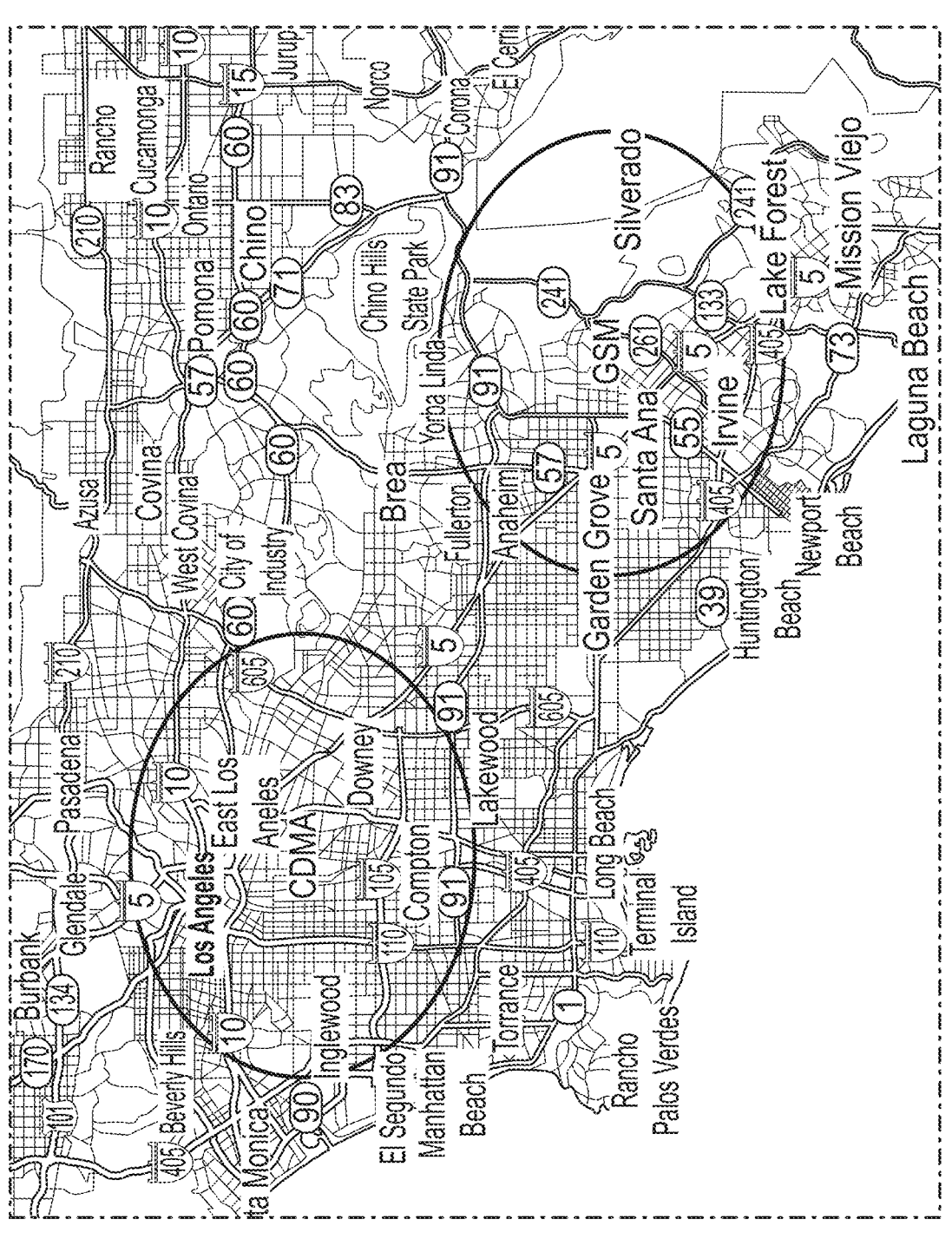
FIG. 5 illustrates a diagram for one embodiment of geolocation profiling for determining a network protocol for a call in accordance with the teachings of the present disclosure.

FIG. 5 illustrates a diagram for one embodiment of geolocation profiling for determining a network for a call in accordance with the teachings of the present disclosure. In some embodiments, it may be determined that for a particular mobile device 102 or user that a particular network is preferred in a particular geographic location. For example, as illustrated in FIG. 5, it may be determined that when a user is within Los Angeles, it is preferable to use a CDMA protocol for making calls because, for example, the CDMA protocol may provide increased signal strength or a lower dropped call rate. However, when a user or mobile device is in Orange County, it may be determined that it is preferable to make calls using a GSM protocol (e.g., over a GSM network) because, for example, the GSM protocol may provide increased signal strength or an improved call clarity compared to the CDMA network in the identified locations.

In some embodiments, the mobile device 102 and/or the dynamic routing system 108 can override the network selection indicated by the geolocation profile. For example, although it may generally be preferred to use a CDMA protocol in Los Angeles, the dynamic routing system 108 may determine based at least in part on network characteristics at a particular time that the GSM protocol is preferred. In some such cases, the default selection of a CDMA protocol may be overridden based on the determined or measured network characteristics at the particular time.

Routing Based on Source and Destination Network Characteristics

Figure 6:
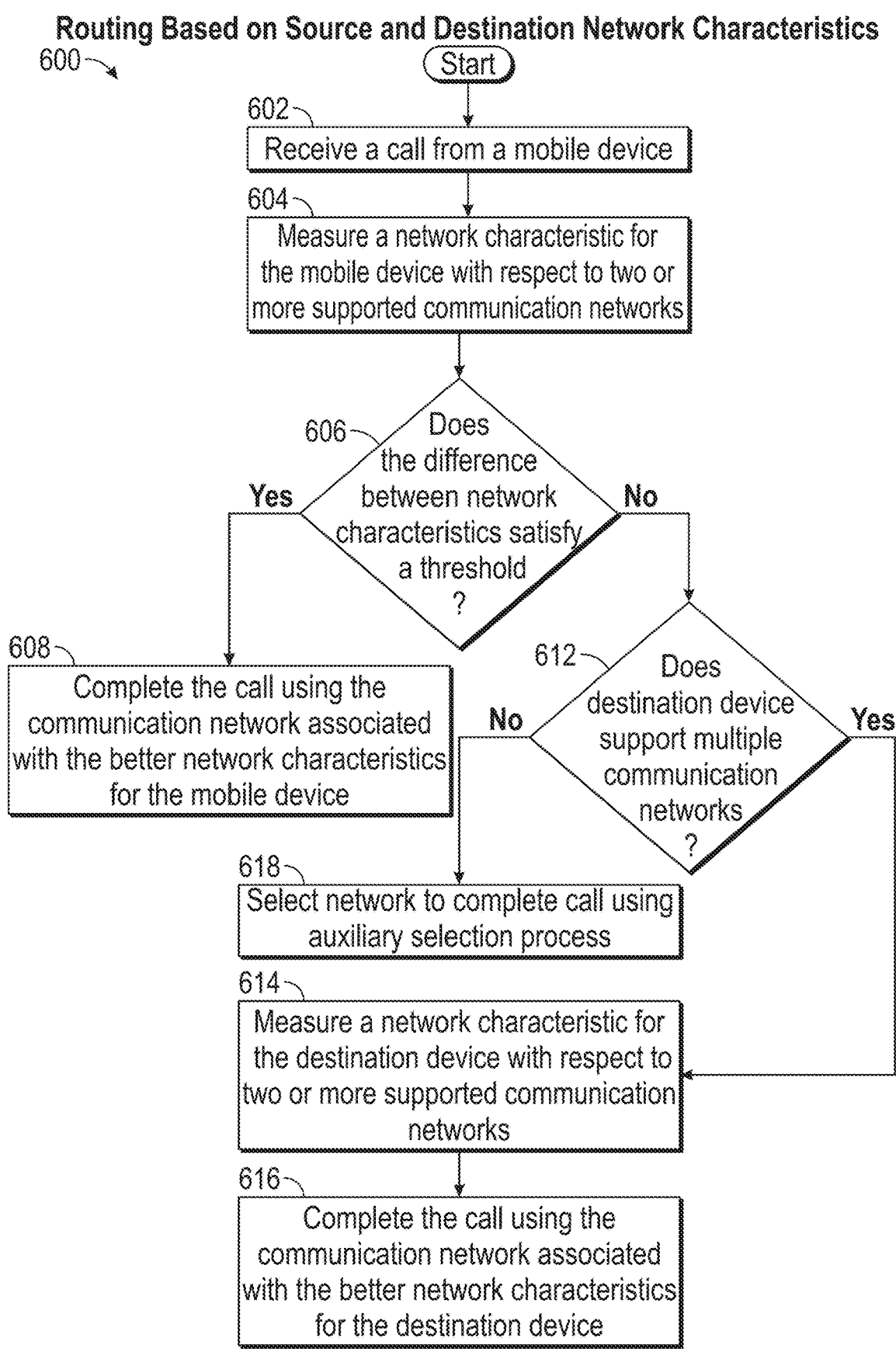
FIG. 6 illustrates a flow diagram for one embodiment of a dynamic call routing process for routing based on source and destination network characteristics in accordance with the teachings of the present disclosure.

FIG. 6 illustrates a flow diagram for one embodiment of a dynamic call routing process 600 for routing a call based on both source and destination network characteristics in accordance with the teachings of the present disclosure. The process 600 can be performed by any system capable of routing a call including a communications network 106 that initially received a call from the mobile device 102, a communications network 106 that completed the final call connection to the mobile device 104, a communications network somewhere in between, a dynamic routing system 108, and/or the like. Although a number of different systems may perform some or all of the process 600, to simplify discussion, the process 600 will be described with respect to particular systems.

The process begins at block 602 when, for example, the dynamic routing system 108 receives a call initiated by a mobile device 102, which may be referred to a source or origin device. In certain embodiments, the block 602 may include one or more of the embodiments described with respect to the block 202.

At block 604, the dynamic routing system 108 identifies or measures a network characteristic for the source device for each of a set of two or more supported communication networks. As previously described the supported communication networks may include networks of different vendors and/or networks that implement or support different network protocols. For example, if the source device can interact or communicate with both a GSM network and a CDMA network, the dynamic routing system 108 can determine a first signal strength associated with the source device communicating with the GSM network and a second signal strength associated with the source device communicating with the CDMA network.

At decision block 606, the dynamic routing system 108 determines whether the difference between network characteristics of the two or more supported communications networks satisfies a threshold. For example, the dynamic routing system 108 can determine whether a difference between the first signal strength and the second signal strength in the previous example satisfies a threshold signal strength difference.

If it is determined that the difference between the network characteristics do not satisfy the threshold, then at block 612 the dynamic routing system 108 determines whether the mobile device 104, which may be referred to as the target or destination device, supports multiple communication networks. If the destination device supports multiple communication networks, at block 614, the dynamic routing system 108 identifies or measures a network characteristic for the destination device for each of a set of two or more supported communication networks. This network characteristic may be the same network characteristic determined at the block 604, or it may be a different network characteristic. For example, the dynamic routing system 108 may measure signal strength for the destination device with respect to each supported communication network as with the example described above with respect to the source device, or it may measure bandwidth. In some embodiments, both at the block 604 and the block 614, the network characteristics may include or may be a combination of multiple network characteristics. At block 616, the dynamic routing system 108 may complete the call using the communication network associated with the more desirable value. For example, the call may be completed with the communication network that has the highest signal strength or the lowest call drop rate for the destination device. If multiple communication networks are associated with the more desirable or better network characteristic value, an auxiliary selection process may be performed, such as a random communication network selection, a selection based on alternative network characteristics, a round-robin selection, a selection based on pricing, or a selection based on user preferences.

If it is determined at the decision block 612 that the destination device does not support multiple communication networks, a communication network is selected to complete the call using an auxiliary selection process at the block 618. The auxiliary selection process may include selecting a communication network from the two or more communication networks supported by the source mobile device using a random communication network selection, a selection based on alternative network characteristics, a round-robin selection, a selection based on pricing, or a selection based on user preferences.

If it is determined at the decision block 606 that the difference between the network characteristics do satisfy a threshold, the dynamic routing system 108, at block 608, completes the call using the communication network associated with the better or more desired network characteristics for the mobile device 102. In certain embodiments, the block 608 may include one or more of the embodiments described with respect to the block 616. In certain embodiments, the dynamic routing system 108 may complete the call using the selected communication network by identifying the selected communication network to the mobile device 102. The mobile device 102 can then establish the call with the selected communication network. In some cases, establishing the call with the selected communication network may include initiating a new call with the selected communication network and transferring the audio from the call received at the block 602 to the new call. The establishing of a new call and/or the transfer of the existing call may occur without the knowledge of the user making or desiring to make the call using the mobile device 102.

In some embodiments, a determination of a communication network to complete the call may be based at least in part on network characteristics for communication networks available to the source mobile device 102 and the destination mobile device 104. In other embodiments, for a particular call, a communication network may be selected for the outgoing portion of the call placed by the mobile device 102 and a communication network may be selected for the incoming portion of the call to the mobile device 104. Thus, a communication network 106A may be selected for the mobile device 102 to make a call, while a communication network 106C may be selected for the mobile device 104 to receive the call.

Rerouting During a Call

Figure 7:
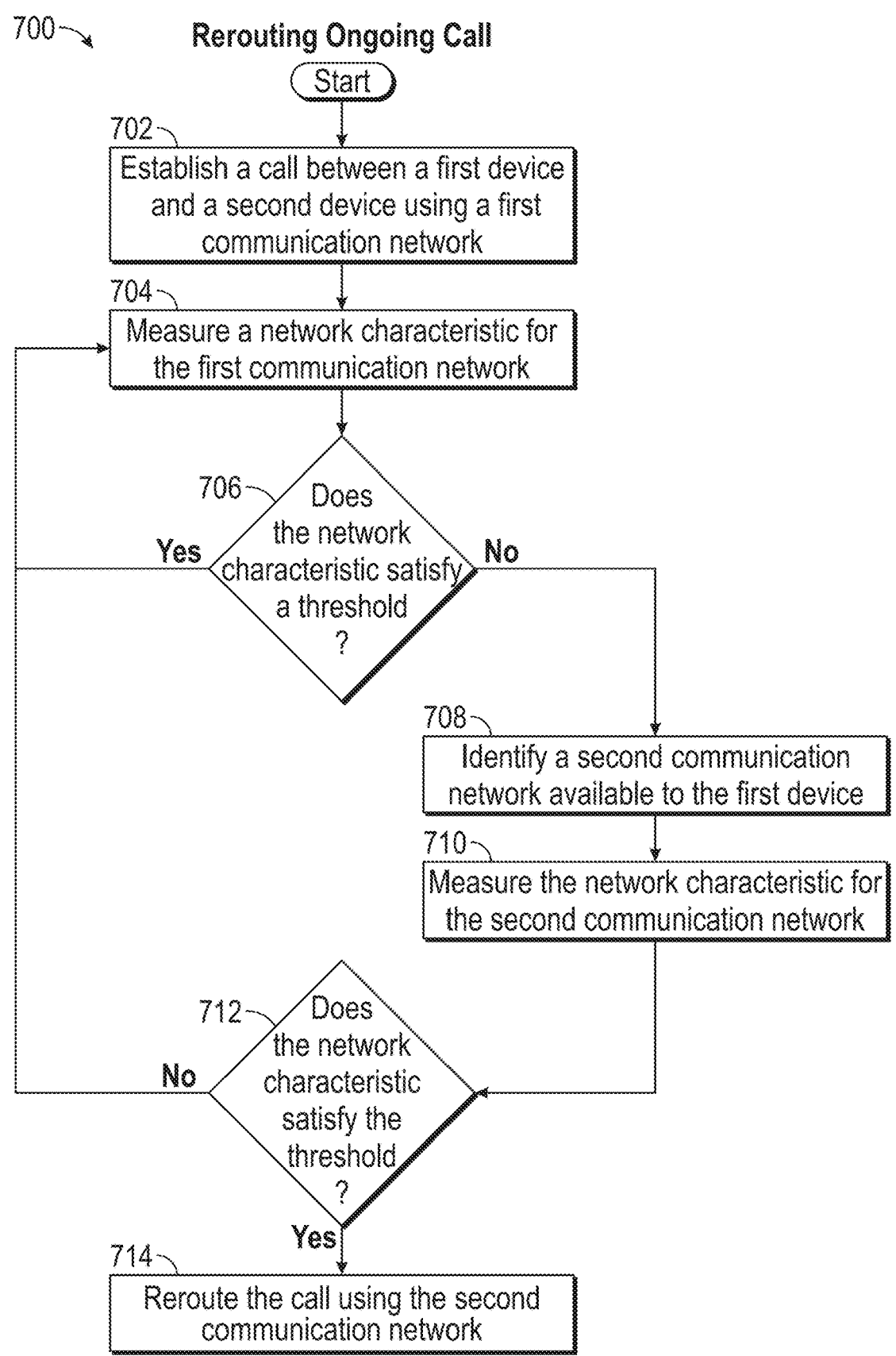
FIG. 7 illustrates a flow diagram for one embodiment of a dynamic call routing process for rerouting during a call in accordance with the teachings of the present disclosure.

FIG. 7 illustrates a flow diagram for one embodiment of a dynamic call routing process 700 for rerouting an ongoing call in accordance with the teachings of the present disclosure. The process 700 can be performed by any system capable of routing a call including a communications network 106 that initially received a call from the mobile device 102, a communications network 106 that completed the final call connection to the mobile device 104, a communications network somewhere in between, a dynamic routing system 108, and/or the like. Although a number of different systems may perform some or all of the process 700, to simplify discussion, the process 700 will be described with respect to particular systems.

The process begins at block 702 when, for example, the dynamic routing system 108 establishes a call between a source mobile device 102 and a target mobile device 104 using a first communication network 106. Establishing the call may include selecting the first communication network 106 using, for example, the process 200, the process 600, or any other process for selecting a communication network from among a plurality of communication networks. Further, establishing the call may include connecting the device 102 to the device 104 using the selected network. Alternatively, establishing the call may include providing the device 102 with an identity of the communication network enabling the device 102 to establish the call using the selected communication network.

At block 704, the dynamic routing system 108 measures, or otherwise determines, a network characteristic for the first communication network, which may use a first network protocol. For example, the dynamic routing system 108 can determine a signal strength, a bandwidth, or a dropped call rate for the first communication network. For example, the network characteristic can include one or more network characteristics described in FIG. 3 above.

At decision block 706, the dynamic routing system 108 determines if the measured network characteristic satisfies a threshold value. If the measured network characteristic satisfies the threshold, the process 700 returns to the block 704 where the dynamic routing system 108 may continuously, intermittently, or periodically measure the network characteristic. In some embodiments, a threshold can be determined based on an identified pattern. For example, a threshold can be determined based on a pattern identified in the historical data for a user device (e.g., mobile device 102) using the process 400 of FIG. 4. The pattern can be identified between a network protocol and a characteristic of the historical data for the user device, and the threshold can be established based on this pattern. For example, the historical data for a user device can indicate a high packet loss for a mountainous region for the GSM protocol. If the user is traveling through the mountainous region at a later time using the CDMA protocol, the system may set the packet loss threshold to be higher for switching to the GSM protocol. In another example, the historical data for the user can indicate that the CDMA protocol has historically performed better (e.g., higher call clarity or less dropped calls) than the GSM protocol for the mountainous region. In some such cases, the system may automatically default calls to a network using the CDMA protocol. The system may switch to the GSM protocol based on an average difference between the historical performance of a network implementing a CDMA protocol and a network implementing a GSM protocol.

In some embodiments, the threshold can be a dynamic threshold. For example, a wireless device can be connected to a call using a first protocol. The system can identify performance of network characteristics for the first protocol. The system can also identify performance of network characteristics for the second protocol. For example, as the caller is traveling from one destination to another while on the call, the performance of network characteristics for the first protocol may diminish, while the performance of network characteristics for the second protocol may improve. The threshold to switch the call from the first protocol to the second protocol can be dynamically adjusted based on the change of the performance of network characteristics for the first and second protocols. In one embodiment, the dynamic threshold can be adjusted based on an average of the performance of network characteristics for the first and second protocols. In another embodiment, the dynamic threshold can be based on the performance of the network characteristic for the first protocol diminishing below the performance of the network characteristic for the second protocol. For example, the dynamic threshold can be based on the performance of the network characteristic for the first protocol diminishing below the performance of the network characteristic for the second protocol for a particular time period.

If it is determined that the measured network characteristic does not satisfy the threshold, the dynamic routing system 108, at block 708, identifies a second available communication network, which may use a second network protocol that differs from the first network protocol. Alternatively, both networks may use the same network protocol, but may be maintained by different vendors and/or may use different frequency bands.

At the block 710, the dynamic routing system 108 measures the network characteristic for the second communication network. The block 710 may include one or more of the embodiments described with respect to the block 704.

At decision block 712, the dynamic routing system 108 determines whether the network characteristic measured, or otherwise obtained, at the block 710 satisfies the threshold. If it is determined that the measured network characteristic for the second communication network does not satisfy the threshold, the process may return to the block 704. In some embodiments, the time between successive measurements of the network characteristic at the block 704 may differ based on whether the process 700 returned to the block 704 from the decision block 706 or the decision block 712. Further, in some embodiments, the time between successive measurements of the network characteristic at the block 704 may differ based on whether the user associated with the device 102 has moved a threshold distance. For example, the block 704 may be repeated more frequently for a user who is moving at more than a threshold rate, such as a user who may be in a moving vehicle or is walking around a neighborhood or town. The process 700 may be performed more frequently when the user is moving than when the user is stationary, or relatively stationary, because the user may pass through more cell regions associated with different base stations. Alternatively, or in addition, the process may be performed more frequently when a user is moving (e.g., driving or walking) because the user may pass by more obstacles that can affect wireless coverage compared to when the user is stationary (e.g., sitting at home or at work). In some embodiments, the process 700 may end instead of returning to the block 704.

If at decision block 712 it is determined that the network characteristic measured at the block 710 for the second communication network satisfies the threshold, the dynamic routing system 108, at the block 714, reroutes the call using the second communication network. Rerouting the call may include establishing a second call with the second communication network and transferring the audio to the second call after establishing the second call. The initial call may then be ended. In some embodiments, the dynamic routing system 108 reroutes the call by instructing the mobile device 102 to establish the new call and to switch the audio to the new call. In some embodiments, the call is rerouted without knowledge of the users involved in the call.

In some embodiments, the threshold used at the decision block 706 and the decision block 712 may differ. For example, the threshold to determine whether a network may exist that may provide better service or satisfy particular desired criteria (e.g., the threshold at the block 706) may be lower than the threshold used to determine whether to select a new communication network to process the call (e.g., the threshold at the block 712). Advantageously, by using different thresholds, it is possible to account for communication resource costs involved in switching or rerouting an existing call. Moreover, in certain embodiments, by using a higher threshold to determine whether to switch communication networks rather than a threshold used to determine whether additional networks exist, the continuous and repeated rerouting of calls between two networks can be reduced.

In certain embodiments, instead of, or in addition to, determining that the network characteristic of the second communication network satisfies a threshold, the decision block 712 may include determining whether the network characteristic for the second communication network is more than a threshold degree higher or better than the network characteristic for the first communication network. Advantageously, in certain embodiments, by ensuring the second communication network is more than a threshold degree better than the first communication network before rerouting the call, the occurrence of continuous and repeated rerouting of calls between two networks can be reduced.

Dual-SIM Wireless Devices

Cellular communication networks often use subscriber identity modules (SIM) to identify a user of a wireless device. The SIM card is often implemented as a type of smartcard or integrated circuit that is inserted into a wireless device and communicates with a processor of the wireless device and/or a communication network. The SIM card will include information that uniquely identifies the user and/or wireless device. For example, the SIM card may securely store an international mobile subscriber identity (IMSI) number and its related key. This information stored on the SIM card may be used to identify and authenticate users or subscribers of a mobile or wireless device. The SIM card may additionally include a unique serial number, such as an integrated circuit card identifier (ICCID), security authentication and ciphering information, temporary information related to a local network (e.g., a cellular or other wireless network), a list of services accessible by a user, and one or more passwords (e.g., a personal identification number (PIN), and a personal unblocking code (PUC) for PIN unlocking). The SIM card is often required to enable a wireless device to connect to and/or communicate with a particular cellular network associated with the SIM card. Further, a SIM card of one cellular network is often unusable for a wireless device to connect to and/or communicate with another cellular network. For example, a wireless device with a SIM card that enables communication with a T-Mobile® network typically cannot communicate with a Verizon® or ATT® network. A user desiring to communicate on the Verizon® or ATT® network must usually change the SIM card with one that is associated with the Verizon® or ATT® network.

Most wireless devices support a single SIM card and thus, most wireless devices can only communicate with a single cellular communication network at any given time. Some wireless devices may support two SIM cards enabling the wireless device to communicate with two cellular networks. However, typically only one SIM card may be active at a time. Thus, the wireless device can only communicate with a single cellular network associated with the active SIM card. Moreover, to switch SIM cards and communicate with another cellular network using the second SIM card, the wireless device typically must be reset or restarted, or the network subsystem at a minimum must be rebooted. When the wireless device is restarted or rebooted, the second SIM card can be selected as the active SIM card.

Often, if inconvenient at all, the restarting of the wireless device or the network subsystem of the wireless device is only a minor inconvenience because, for example, users often only switch SIM cards and/or cellular networks when travelling to a different country. In such cases, the phone is usually turned off or is in "airplane" mode during transit. Thus, the switching of SIM cards may be considered part of the turning on of the wireless device at the new location.

However, beyond travelling between countries or distant geographic locations associated with different cellular networks, there may be additional times when it can be beneficial to change cellular networks. For example, as a user travels in a more limited area or within a particular country, the coverage area or strength of a particular cellular network may vary. Usually, a user's quality of service when using the wireless device corresponds to limitations of the particular cellular network subscribed to by the user. However, in some cases, it is desirable to maintain an improved quality of service by switching between cellular networks to maintain service using the cellular network that provides the best connection or highest signal strength in any particular area. Further, it may be desirable to have connections to multiple cellular networks simultaneously to improve multitasking with the wireless device. For example, a user may desire to download or stream content (e.g., music, movies, or games) from one or more content providers simultaneously, and/or while on a voice call with another user. In some such cases, each service or action may affect the quality of service or the other service or action when performed during connection to a single cellular network. However, by connecting to multiple cellular networks, it is possible to perform multiple tasks with minimal impact on each task. Moreover, it is possible to assign higher priority tasks, or tasks that require more bandwidth (e.g., high-definition content download) or a better connection to one cellular network while assigning lower priority tasks or tasks that require less bandwidth (e.g., a voice call) to another cellular network that may have lower signal strength.

Embodiments disclosed herein present a system and methods that enable a wireless device to communicate over multiple cellular networks without the aforementioned problems. For example, embodiments disclosed herein present a wireless device that is capable of communicating with multiple cellular networks at the same time, or substantially the same time, without requiring the wireless device to be reset or to reboot some or all of the wireless device. Further, embodiments disclosed herein present a wireless device that can switch the cellular network that is performing a task (e.g., downloading media, performing a voice call) prior to performing the task and/or during the task without downtime or loss of access to the cellular network during the transition between cellular networks.

Figure 8:
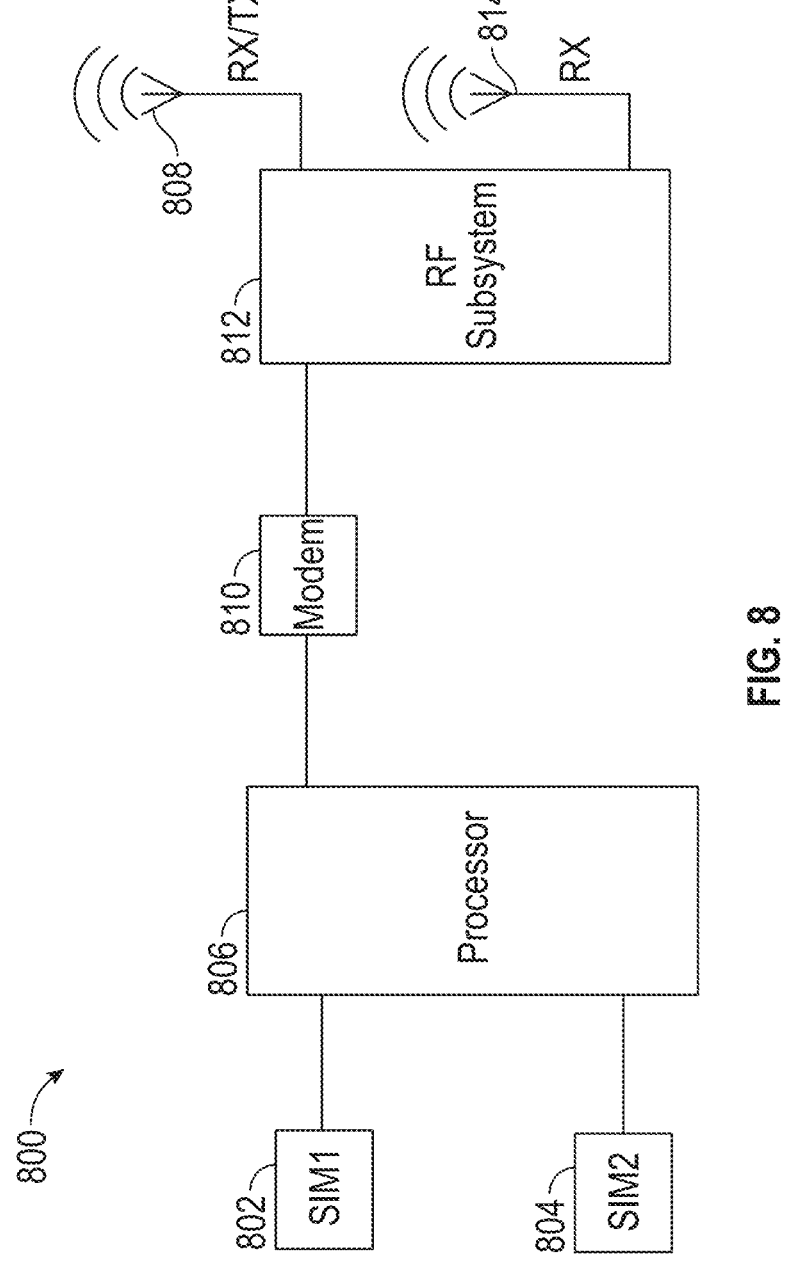
FIG. 8 illustrates a block diagram of a comparative example of a dual-SIM wireless device.

FIG. 8 illustrates a comparative example of a portion of a dual-SIM wireless device 800. As illustrated, the wireless device 800 may include two SIM cards 802, 804 that may communicate with a processor 806. The processor 806 may control communication with a pair of cellular networks associated with the SIM cards 802, 804, respectively. Further, the wireless device 800 includes a single or primary antenna 808 for transmitting and receiving voice or data packets over a cellular network. The wireless device 800 further includes a modem 810 and RF subsystem 812, which way include a front-end module, filter, or other radio frequency hardware for separating or combining signals that are received or are to be transmitted over the cellular network. The modem 810 may convert data for transmission via the primary antenna 808. The modem 810 can convert digital data packets to modulated electrical signals for transmission via the primary antenna 808. The RF subsystem 812 may include radio frequency diplexers, duplexers, and amplifiers for facilitating transmission and reception of wireless signals. For example, the RF subsystem 812 may include a front-end module configured to filter and amplify (e.g., using a low noise amplifier) a received signal. Further, the front-end module may further include one or more power amplifiers for amplifying a signal for transmission.

The wireless device may include a diversity antenna 814 that may be used to help determine signal strength. The diversity antenna 814 may obtain an independent sample from signals received by the wireless device. These independent samples may be used to measure the signal strength of signals received from the cellular network associated with the SIM card 802 or the SIM card 804. Typically, the diversity antenna is for receive only and does not transmit signals, including voice or data packets. As such, the wireless device does not include a modem in connection with the diversity antenna 814.

To switch between networks associated with the SIM 802 or SIM 804, the wireless device 800 may be rebooted or turned off and then back on. Alternatively, the network subsystem may be reset. In either case, communication with a cellular network is generally not maintained while the active SIM is switched between SIM 802 and SIM 804.

Figure 9:
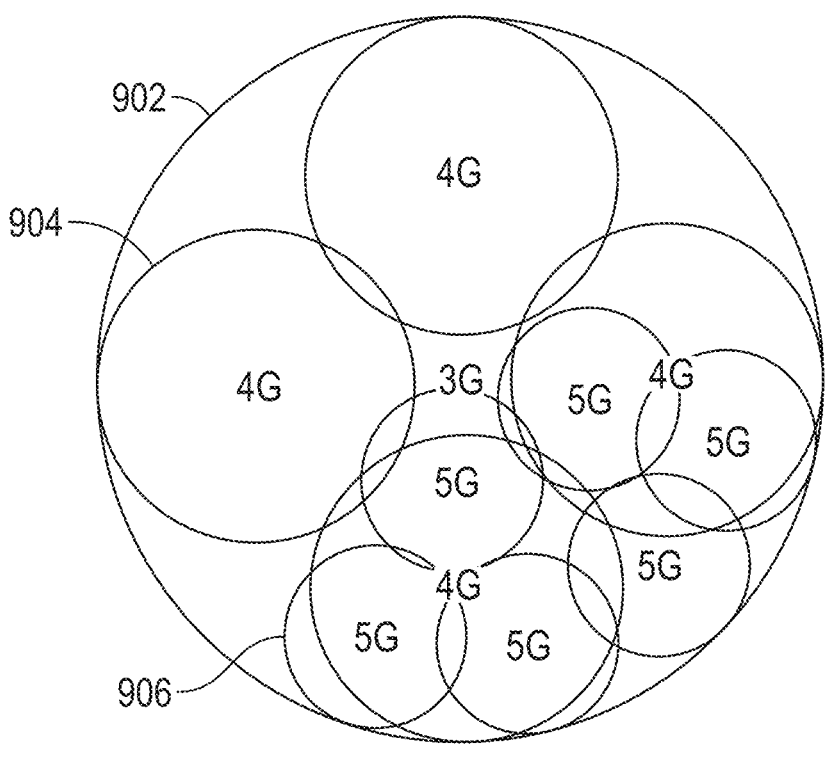
FIG. 9 illustrates an example of cellular coverage across different communication technologies.

FIG. 9 illustrates an example of cellular coverage across different communication technologies. Each of the circles represents the coverage of a single base station implementing a particular communication technology. For ease of illustration, some circles associated with 4G and/or 5G communication are omitted. However, it should be understood that more circles representing more base stations may exist to cover more of the geographic area represented by the circle 902.

The circle 902 may represent a geographic area with 3G cellular coverage provided by a single 3G base station. A base station implementing 3G communication technology may have wider geographic coverage compared to base stations that implement 4G or 5G communication technology as represented by the circles 904 and 906. Thus, more 4G or 5G base stations may be required to cover the same geographic area as a 3G base station. Further, more base stations implementing 5G technology may be required than base stations implementing 4G technology to cover the same geographic area. Thus, although newer cellular communication technologies may provide benefits, such as improved bandwidth or improved download/upload speeds, the coverage may be worse in particular geographic areas. It is therefore desirable to have wireless devices that can take advantage of different competitors' cellular networks to improve the chance of optimal coverage in any particular area. For example, it is advantageous to have a wireless device that can communicate over 2, 3, or more cellular networks without input from a user and/or without restarting or rebooting the wireless device or the network subsystem, which may include one or more pieces of hardware that facilitate communication over a network, of the wireless device.

Example Dual-SIM and Dual-Data Active Device

Figure 10:
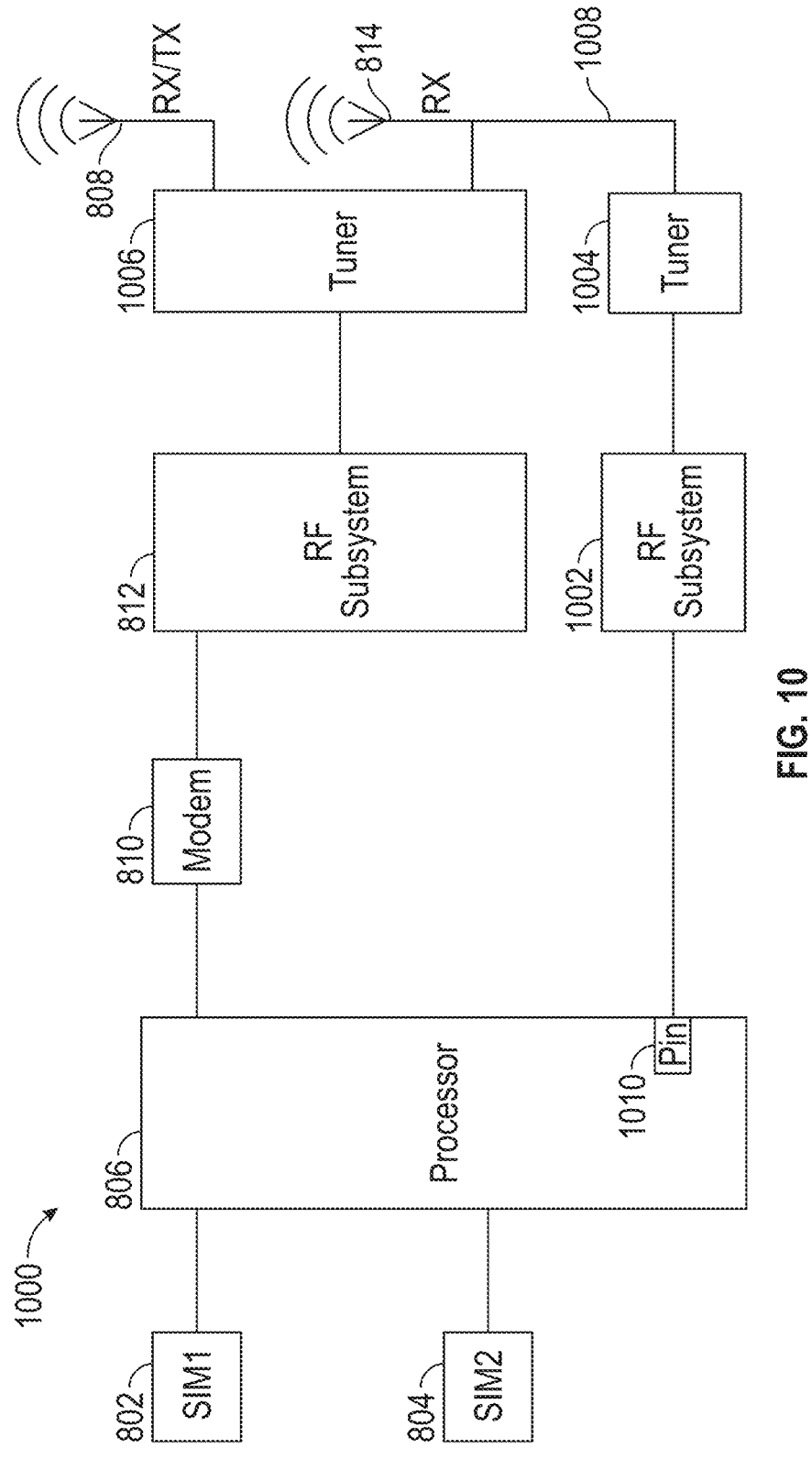
FIG. 10 illustrates a block diagram of an example of a dual-SIM dual-data active wireless device in accordance with certain embodiments of the present disclosure.

FIG. 10 illustrates an example of a portion of a dual-SIM dual-data active wireless device 1000 in accordance with certain embodiments. As discussed above, with respect to the wireless device 800, a wireless device may have multiple SIM cards. Such a device may be referred to as a dual-SIM device. As previously discussed, the dual-SIM device can only communicate with a single communication or cellular network at a time using a single SIM card. To communicate using the second SIM card, the wireless device must be reset to switch the active SIM card to the second SIM card.

A dual-SIM dual-data active wireless device enables a wireless device to communicate with multiple cellular networks using multiple SIM cards without needing to reset the wireless device, or network subsystem, which can cause temporary loss of a connection for a period of time, e.g., 20, 30, or 45 seconds. Although the temporary loss of connection may be acceptable when the wireless device is not in use, it can be problematic during a call or when the wireless device is accessing content on a network. A dual-SIM dual-data active wireless device may include a wireless device that can transmit and/or receive data packets on two cellular networks associated with two different SIM cards at the same time, or substantially the same time (e.g., within 1, 2, or 5 microseconds apart, or close enough in time that a user does not experience a loss or reduction in service).

In some embodiments, data packets transmitted over one cellular network may be associated with a first task, and data packets transmitted over another cellular network may be associated with the first task or a second task. For example, the first task may be accessing media at a first network site or from a first media service and the second task may be a voice call with another user or accessing media from another network site or media service. The data packets may be received or transmitted over the two cellular networks simultaneously or sufficiently close enough in time such that a user does not notice an interruption in services or an interruption in the performance of either the first task or the second task. In other words, in certain embodiments, the user may download content from a media site over the first communication network while talking to another user over the second communication network without any interruption in either task.

The wireless device 1000 of FIG. 10 includes a number of similar elements as the wireless device 800 as indicated by the re-use of certain reference numbers. The wireless device 1000 may be, or may mimic, a dual-SIM dual-data active wireless device in that the wireless device 1000 can receive communications from multiple cellular networks simultaneously, and can transmit across multiple cellular networks. However, at a particular point in time, the wireless device 1000 transmits across one cellular network. The wireless device may switch the active SIM associated with the desired cellular network dynamically and without restarting the wireless device enabling the wireless device 1000 to function similarly to a dual-SIM dual data active wireless device.

The wireless device 1000 includes a second RF subsystem 1002. The second RF subsystem 1002 may be configured similarly to, and may perform similar actions as, the RF subsystem 812. However, while the RF subsystem 812 may process signals received on the primary antenna 808, the RF subsystem may process signals received by the diversity antenna 814. Thus, in some cases, the RF subsystem 812 may process signals from a first cellular network associated with the SIM 802 that are received by the primary antenna 808, and the RF subsystem 1002 may process signals from a second cellular network associated with the SIM 804 received by the diversity antenna 814. In other cases, the RF subsystem 812 may process signals from the second cellular network associated with the SIM 804 that are received by the primary antenna 808, and the RF subsystem 1002 may process signals from the first second cellular network associated with the SIM 802 received by the diversity antenna 814.

As illustrated in FIG. 10, the signal path that includes the RF subsystem 812 includes the modem 810. However, the signal path that includes the RF subsystem 1002 omits the modem. Accordingly, in certain embodiments of the wireless device 1000, the signal path that includes the RF subsystem 812 may both receive and transmit voice and/or data packets using the primary antenna 808. However, the signal path that includes the RF subsystem 1002 may receive signals, but may not transmit signals via the diversity antenna 814. Further, the signals received at the diversity antenna 814 from the second cellular network may be all data packets, which may include voice data packets (e.g., VoLTE), but may omit voice packets. Accordingly, in certain embodiments, the RF subsystem 1002 may be a slimmed down version of the RF subsystem 812. For example, while the RF subsystem 812 may include a power amplifier module with one or more power amplifiers for amplifying a signal prior to transmission, the RF subsystem 1002 may omit the power amplifier module. The slimmed down RF subsystem 1002 may thus be smaller in physical area and may use less power than the RF subsystem 812.

In certain embodiments, the wireless device may include a tuner 1004 and a tuner 1006. The tuners 1004, 1006 may include any type of filter that can separate the signals received on the antennas 808, 814. For example, the tuner 1004 may include a band-pass filter to pass signals associated with a first cellular network associated with SIM 802 and one or more band-stop filters to remove signals (e.g., noise, undesired harmonics, frequency bands associated with other wireless or cellular networks, and the like) not associated with communication with the first cellular network. Similarly, the tuner 1006 may include a band-pass filter to pass signals associated with a second cellular network associated with SIM 804 and one or more band-stop filters to remove signals not associated with communication with the second cellular network. Further, the tuners 1004, 1006 may convert the received RF signals from the cellular networks into a fixed frequency that facilitates further processing by the RF subsystems 812, 1002 and/or the hardware processor 806.

The tuner 1006 may further be configured to determine whether a received signal is from a cellular network implementing CDMA, TDMA, GSM, or some other type of communication protocol or standard. In some cases, the determination may be made based on a header that identifies the transmitter of the signal or data packer. In other cases, the determination may be made based on the signal characteristics. Based on the determination of the type of communication protocol, the tuner 1006 may cause a modification in the configuration of the RF subsystem 812. Alternatively, or in addition, the RF subsystems 812, 1002 may determine the type of cellular network or the communication protocol implemented by the cellular network. In yet other embodiments, the processor 806 may determine the type of cellular network or the communication protocol implemented by the cellular network, and may configure the RF subsystems 812, 1002 accordingly.

In certain embodiments, the processor 806 may determine that the second cellular network associated with the SIM 804 is preferable for transmission. For example, the processor 806 may determine that the current signal strength of the second cellular network exceeds, or exceeds by a particular threshold, the current signal strength of the first cellular network. Additionally, or alternatively, the processor 806 may determine that transmission should occur over both the first cellular network and the second cellular network using both SIM 802 and SIM 804, respectively. For example, the processor 806 may determine that the wireless device 1000 is attempting to transmit media (e.g., pictures) to a cloud network service (e.g., Dropbox®), and is attempting to establish and maintain a voice call, either using voice-packets or data packets (e.g., Voice over LTE (VoLTE)), or to transmit other data packets using another service (e.g., send email using an email provider). In some such cases, the wireless device 1000 may maintain also receive signals associated with the cellular network that is currently transmitting. Thus, in some such cases, either antenna 808, 814, and corresponding signal path, may receive signals from either cellular network associated with the SIMS 802, 804. As such, in some embodiments, the tuner 1004 may further include a band-pass filter to pass signals associated with the second cellular network associated with SIM 804 and one or more band-stop filters to remove signals not associated with communication with the second cellular network. Similarly, the tuner 1006 may further include a band-pass filter to pass signals associated with the first cellular network associated with SIM 802 and one or more band-stop filters to remove signals not associated with communication with the first cellular network.

It should be understood that the tuners 1004, 1006 may include other types of filters and may include other circuitry for performing other functions related with the receipt of one or more signals associated with one or more cellular and/or wireless networks. Further, the tuner 1006 may additionally include circuitry for performing functions related to the transmission of signals associated with one or more cellular and/or wireless networks. In certain embodiments, the tuners

1004, 1006 may be optional or omitted. For example, the functionality of the tuners 1004, 1006 may be included in the RF subsystems 812, 1002, respectively. Further, in certain embodiments, the wireless device 1000 may further include one or more additional filters, diplexers, duplexers, or other circuitry for splitting and/or combining signals for communication with the cellular networks.

To enable the additional signal path that includes the RF subsystem to receive signals from one or more of the cellular networks, the diversity antenna 814 may include an additional connection 1008. The connection 1008 may provide the signal received at the diversity antenna 814 to the tuner 1004. Accordingly, the received signal received by the diversity antenna 814 may be provided to both the tuner 1006 and the tuner 1004. The signal provided by the antenna 814 to the signal path that includes the tuner 1006 may be used to measure a signal strength of a cellular network in communication with the wireless device 1000. The signal provided by the antenna 814 to the signal path that includes the tuner 1004 may be processed to obtain data received over the cellular network in communication with the wireless device 1000.

The RF subsystem 1002 may be in communication with a port of the processor, such as an auxiliary port. The port may be a pin 1010 that is included on the processor 806 that enables an auxiliary device to communicate with the processor 806. Advantageously, in certain embodiments, by connecting the second signal path to another port of the processor 806 (e.g., the pin 1010) it is possible to switch the active SIM 802 or 804 without resetting, rebooting, or otherwise losing communication to one of the cellular networks.

In certain embodiments, the auxiliary device is the second RF communication path that permits signals received from a cellular network at the diversity antenna 814 to be provided to the processor 806. The processor 806 can receive data from a second cellular network associated with the second SIM 804 over the diversity antenna 814 via the second RF subsystem 1002 connected to the auxiliary port. In some embodiments, the pin 1010 is not an auxiliary port but is associated with a particular feature of the processor 806. In some such embodiments, the pin 1010 can be repurposed to receive communication signals from a cellular network over the antenna 814 in place of the feature previously associated with the pin 1010. Accordingly, in certain embodiments, existing processors 806 can be retrofitted to support multiple cellular networks communicating with the wireless device 1000 in concert.

Further, the processor 806 can switch the SIM 802, 804 card that is using the first or primary RF subsystem 812 enabling the wireless device 1000 to transmit over either cellular network using the primary, or non-diversity, antenna. The processor 806 may determine the SIM 802, 804 card, or cellular network, to connect to or communicate with using the primary antenna 808 based on a detected signal strength of the two networks. Although the embodiment of FIG. 10 enables the wireless device 1000 to receive data from both cellular networks at the same time, transmission may occur over a single cellular network at a particular point in time. Thus, in some cases, the wireless device may not be a bi-directional dual-data dual-active device where both SIMs 802, 804 are simultaneously active for both transmission and reception. However, the processor 806 may rapidly (e.g., within a few microseconds or milliseconds) switch the SIM 802, 804 cards associated with the primary antenna 808 or the SIM 802, 804 that is active a particular point in time. In some such cases, the rapid switching of which SIM 802, 804 is active and/or which SIM 802, 804 is operating over the signal path that includes the antenna 808, may make it undetectable to a user that transmission is occurring via one of the cellular networks and not both cellular networks.

The switching of the active SIM 802, 804, or the SIM that is receiving and transmitting may be determined and/or performed by firmware. This firmware may operate at the kernel or operating system level of the processor 806. The firmware may determine the active SIM 802, 804, or the SIM 802, 804 (and associated cellular network) to select for communication based on signal strength for the cellular networks. In addition, or alternatively, the SIM 802, 804 may be selected based on the available bandwidth, the quality of service of the connection, the stability of the connection, a cost associated with the cellular network or any other characteristics associated with the cellular networks or connections therewith.

In certain embodiments, the wireless device 1000 may lose connection for a short period of time (e.g., less than 30 seconds, within 5 seconds, within a second, and any value between the foregoing) when switching active SIM cards. In some such embodiments, the wireless device 1000 may be configured to not switch active SIMs during an ongoing phone call. Thus, in certain embodiments, a user may not lose voice service during a transition between networks.

Second Example Dual-SIM and Dual Data Active Device

Figure 11:
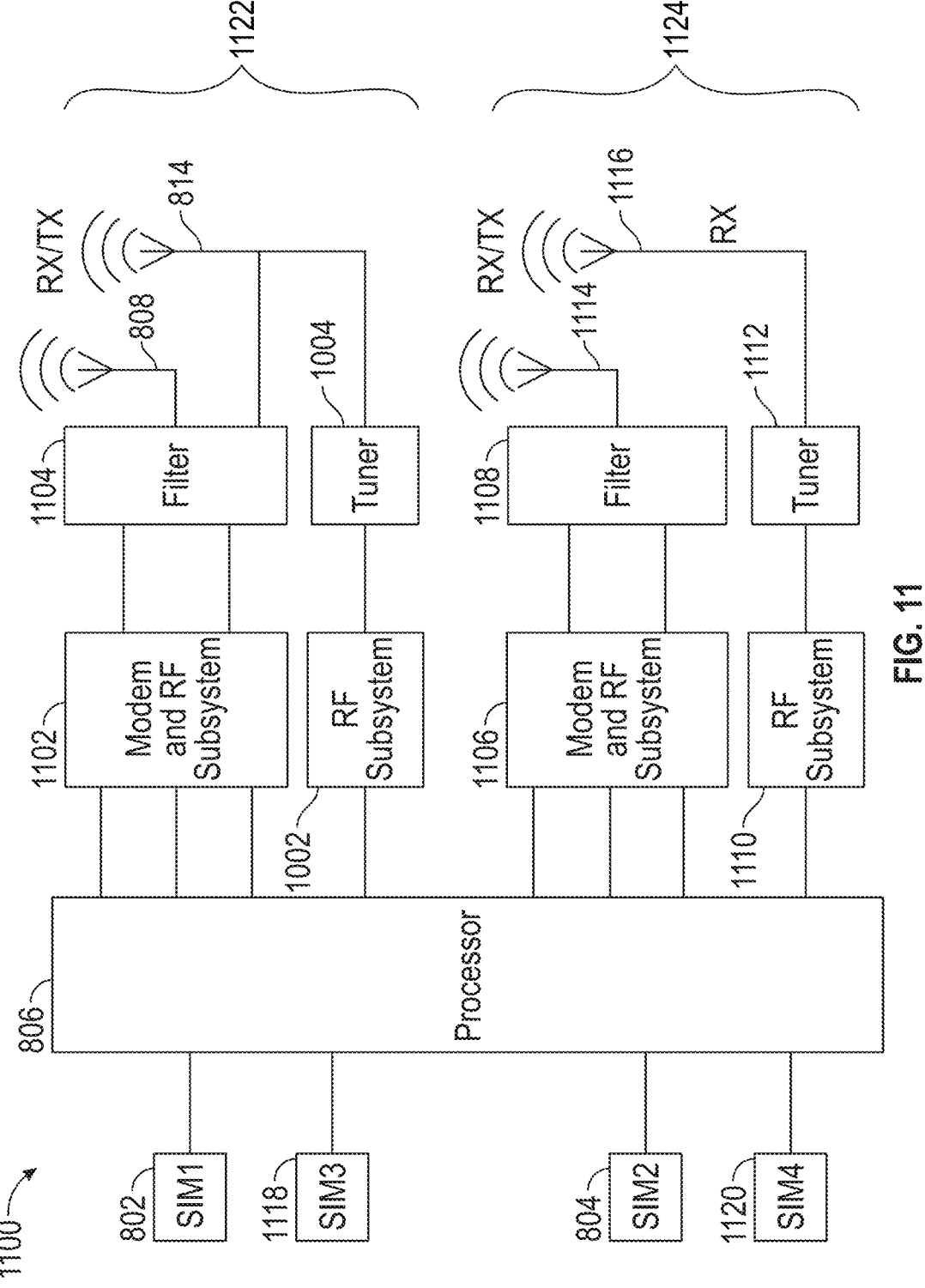
FIG. 11 illustrates a block diagram of a second example of a dual-SIM dual-data active wireless device in accordance with certain embodiments of the present disclosure.

FIG. 11 illustrates a second example of a dual-SIM dual-data active wireless device 1100 in accordance with certain embodiments. The wireless device 1100 of FIG. 11 includes a number of similar elements as the wireless devices 800 and 1000 as indicated by the re-use of certain reference numbers. As previously discussed, the wireless device 1000 may transmit over a single cellular network at a particular point in time. In contrast, the wireless device 1100 may have multiple active SIM cards and may communicate (e.g., both transmit and receive) with multiple cellular networks at a particular point in time. Thus, the wireless device 1100 may simultaneously receive and/or transmit signals using multiple cellular networks. The embodiments of FIG. 11 enables the wireless device to both receive and transmit over at least two cellular networks simultaneously, or at substantially the same time, by including a second pair of primary and diversity antennas. Further, the embodiment of FIG. 11 provides the ability to communicate with more than two cellular networks by replicating the features of the embodiments of FIG. 10.

The wireless device 1100 may include a modem and RF subsystem 1102 that combines the modem and RF subsystem previously described. It should be understood that the modem and RF subsystem may be implemented on a single die (as illustrated) or on multiple separate chips or dies. Further, the wireless device 1100 may include a filter 1104. The filter 1104 may include one or more filters that separate the desired frequency band from other received frequencies. For example, the filter 1104 may separate frequency bands associated with communication with a cellular network corresponding to the SIM 802 from frequency bands associated with communication with other cellular networks, such as those corresponding to SIMs 1118, 804, and 1120, respectively. The filter 1104 may provide the signals associated with the cellular network corresponding to the SIM 802 to the modem and RF subsystem while discarding the other signals. Alternatively, or in addition, the filter 1104 may filter out noise and undesired harmonics from the received signals. For example, in some cases, a second or third harmonic of a received RF signal may match the frequency of another communication band associated with another cellular network or with another wireless communication technology, such as Wi-Fi®. To reduce or prevent interference, the filter 1104 may filter out the undesired harmonic. It should be understood that the depiction of the separate filter 1104 and tuner 1004 is for illustrative purposes. In certain embodiments, the filter 1104 may be included as part of a tuner (not shown). Further, the tuner 1004 may include one or more filters. Accordingly, in certain embodiments the element 1104 may be replaced with a combined (or separate pair of) tuner and filter element. Similarly, the tuner 1004 may be replaced with a combined (or separate pair of) tuner and filter element.

The wireless device 1100 may include an upper portion 1122 and a lower portion 1124. The upper portion 1122 may be associated with a pair of SIMs 802, 1118 that correspond to a pair of cellular networks. Further, the upper portion 1122 may include similar elements and functionality as the wireless device 1000. Thus, the upper portion 1122 may receive signals from two different cellular networks associated with the SIMs 802, 1118, and can transmit at any particular point in time over one of the pair of cellular networks.

The lower portion 1124 may be a duplicate of the upper portion 1122. But the lower portion 1124 may be associated with a different pair of SIMs 804, 1120. In certain embodiments, both the lower portion 1124 and the upper portion 1122 of the wireless device 1100 may include and may be controlled by the processor 806. Further, each of the lower portion 1124 and the upper portion 1122 of the wireless device 1100 may separately receive and/or transmit to a cellular network corresponding to one of the active SIMs. Thus, in certain embodiments, the wireless device 1100 may receive communication from up to four cellular networks simultaneously. Further, the wireless device 1100 may transmit to up to two cellular networks simultaneously. Moreover, as with the wireless device 1000, each of the upper portion 1122 and the lower portion 1124 may switch the active SIM enabling transmission with up to four cellular networks.

As illustrated, the lower portion 1124 may have its own primary antenna 1114 and diversity antenna 1116 pair. Alternatively, in certain embodiments, the upper portion 1122 and the lower portion 1124 may share access to one primary antenna (e.g., the primary antenna 808 and one diversity antenna (e.g., the diversity antenna 814).

As with the upper portion 1122, the lower portion 1124 of the wireless device may include a combined modem and RF subsystem 1106 or may separate the modem and RF subsystem. Further, the lower portion 1124 may include a filter 1108 that filters signals received by the primary antenna 1114 before providing the received signals to the modem and RF subsystem 1106. The signal path with the modem and RF subsystem 1106 and filter 1108 can both receive from and transmit signals to the cellular networks associated with the SIM 804 and the SIM 1120.

The lower portion may further include an RF subsystem 1110 and tuner 1112 that can receive signals via the diversity antenna 1116 from the cellular networks associated with the SIM 804 and the SIM 1120. In certain embodiments, the processor 806 communicates with the cellular networks associated with the SIM 802 and SIM 1118 using the upper portion 1122 of the wireless device 1100 and communicates with the cellular networks associated with the SIM 804 and SIM 1120 using the lower portion 1124 of the wireless device 1100. Thus, the elements of the upper portion 1122 and the elements of the lower portion 1124 may be configured to process specific signal bands and to use specific encodings corresponding to the two SIMs of the upper portion 1122 and the lower portion 1124, respectively. Advantageously, in certain embodiments, the segregating of the portions of the wireless device 1100 that communicate with the different cellular networks enables the modem and RF subsystems 1102, 1106 and the RF subsystems 1002 and 1110, as well as associated filters and tuners to be implemented using less circuitry.

Optionally, in certain embodiments, both the upper portion 1122 and the lower portion 1124 can communicate with some or all of the cellular networks corresponding to the SIMS 802, 1118, 804, and 1120. Advantageously, in certain embodiments, by enabling the upper portion 1122 and the lower portion 1124 to communicate with any of the cellular networks associated with the four included SIMs, the wireless device 1100 can transmit data packets or signals to any two of the cellular networks simultaneously.

Although the wireless device 1100 is illustrated as supporting up to four cellular networks, it should be understood that the wireless device 1100 can be modified to support more or fewer cellular networks. For example, the lower portion 1124 may include one SIM. As another example, an additional set of hardware may be included to enable communication with a fifth or sixth cellular network. In certain embodiments, the wireless device 1100 may require more power than the wireless device 1000 requiring a bigger battery and/or reducing battery life. However, the wireless device 1100 can support communication with a greater number of cellular networks. Further, in certain embodiments, the ability to communication with more cellular networks may in some cases reduce required power by providing increased flexibility to switch to a cellular network that has greater signal strength. For example, while the wireless device 1000 may select from up to two cellular networks, the wireless device 1100 may select from up to four cellular networks with which to communicate. As signal strength may vary based on the location of the wireless device, the wireless device 1100 may have more flexibility to select the cellular network with the strongest signal at a particular geographic area or time. In some cases, the increased flexibility may negate some of the increased power requirements of the wireless device 1100 compared to the wireless device 1000.

Third Example Dual-SIM and Dual Data Active Device

Figure 12:
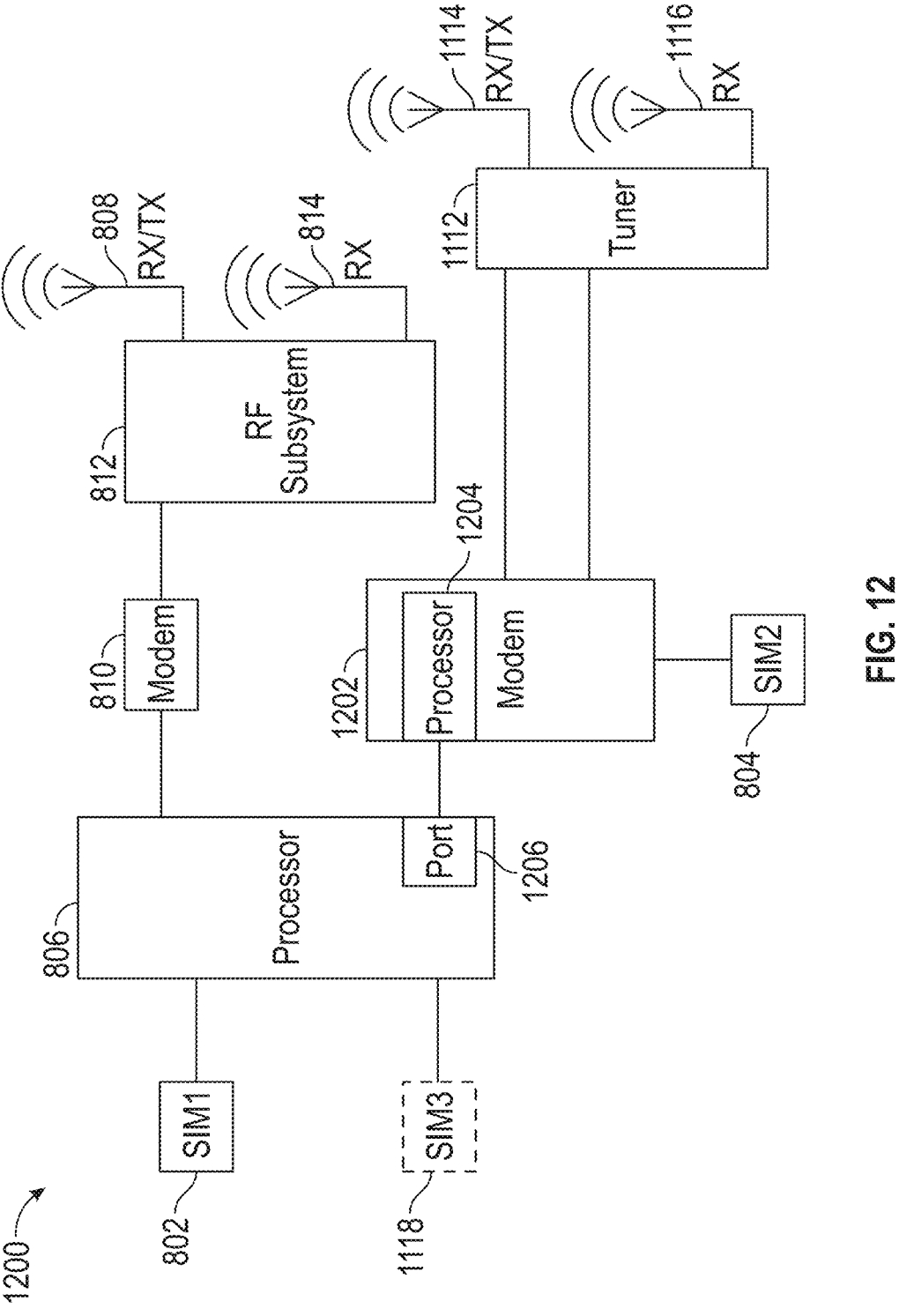
FIG. 12 illustrates a block diagram of a third example of a dual-SIM dual-data active wireless device in accordance with certain embodiments of the present disclosure.

FIG. 12 illustrates a third example of a dual-SIM dual-data active wireless device 1200 in accordance with certain embodiments. The wireless device 1200 of FIG. 12 includes a number of similar elements as the wireless devices 800, 1000, and 1100 as indicated by the re-use of certain reference numbers. The wireless device 1200 includes a second modem 1202 that enables transmission over a second cellular network using a second SIM 804 at substantially the same time as transmission or communication over a first cellular network using a first SIM 802. As a separate modem is within the signal path of the second primary antenna 1114, both primary antennas 808 and 1114 can transmit to two different cellular networks associated with two different SIMs (e.g., SIM 802 or 1118, and SIM 804, respectively). Although not illustrated, the modem 1202 may include an RF subsystem for processing received RF signals received by the primary antennas 1114 and/or the diversity antenna

1116. Further, the RF subsystem of the modem 1202 may facilitate transmission via the primary antenna 1114.

The second modem 1202 may include an embedded processor 1204 that can communicate with a port 1206, such as an auxiliary port or other reserved of the main or primary processor of the wireless device 1200. The port 1206 may be a pinout (e.g., pin 1010) or any other type of interface with the processor 806. In some embodiments, the main processor (e.g., processor 806) may support multiple SIM cards and thus, the wireless device 1200 may include a third SIM 1118 card. This third SIM card may be optional as indicated by the dashed line box for the SIM 1118. In some embodiments, the wireless device of FIG. 12 may further include the embodiment of FIG. 10.

Advantageously, in certain embodiments, the wireless device 1200 can have at least two active SIMs enabling communication with at least two cellular networks simultaneously. Further, the inclusion of multiple modems 810, 1202 enables transmission of data and/or voice packets by the wireless device 1200 to multiple cellular networks simultaneously. Further, in certain embodiments, the wireless device 1200 uses less power than the wireless device 1100.

The connection between the processor 1204 and the processor 806 may be a direct connection with a pin or port 1206 of the processor 806. In some cases, the connection between the processor 806 and the processor 1204 may be a conductive trace on a printed circuit board that includes both the processor 806 and the processor 1204.

In the wireless device 1200, the processor 806 may continue to serve as the main processor or the primary processor. Thus, for example, the processor 806 may select the cellular network with which to communicate for a particular task (e.g., a call or access to a content service). Further, the processor 806 may execute kernel level, operating system level, and application system tasks. In addition, the processor 806 may process user interactions with the wireless device 1200. The embedded processor 1204 may serve as a secondary processor. The processor 1204 may be at least partially controlled by the processor 806. Further, the processor 1204 may be a control host for the modem 1202.

Fourth Example Dual-SIM and Dual Data Active Device

Figure 13:
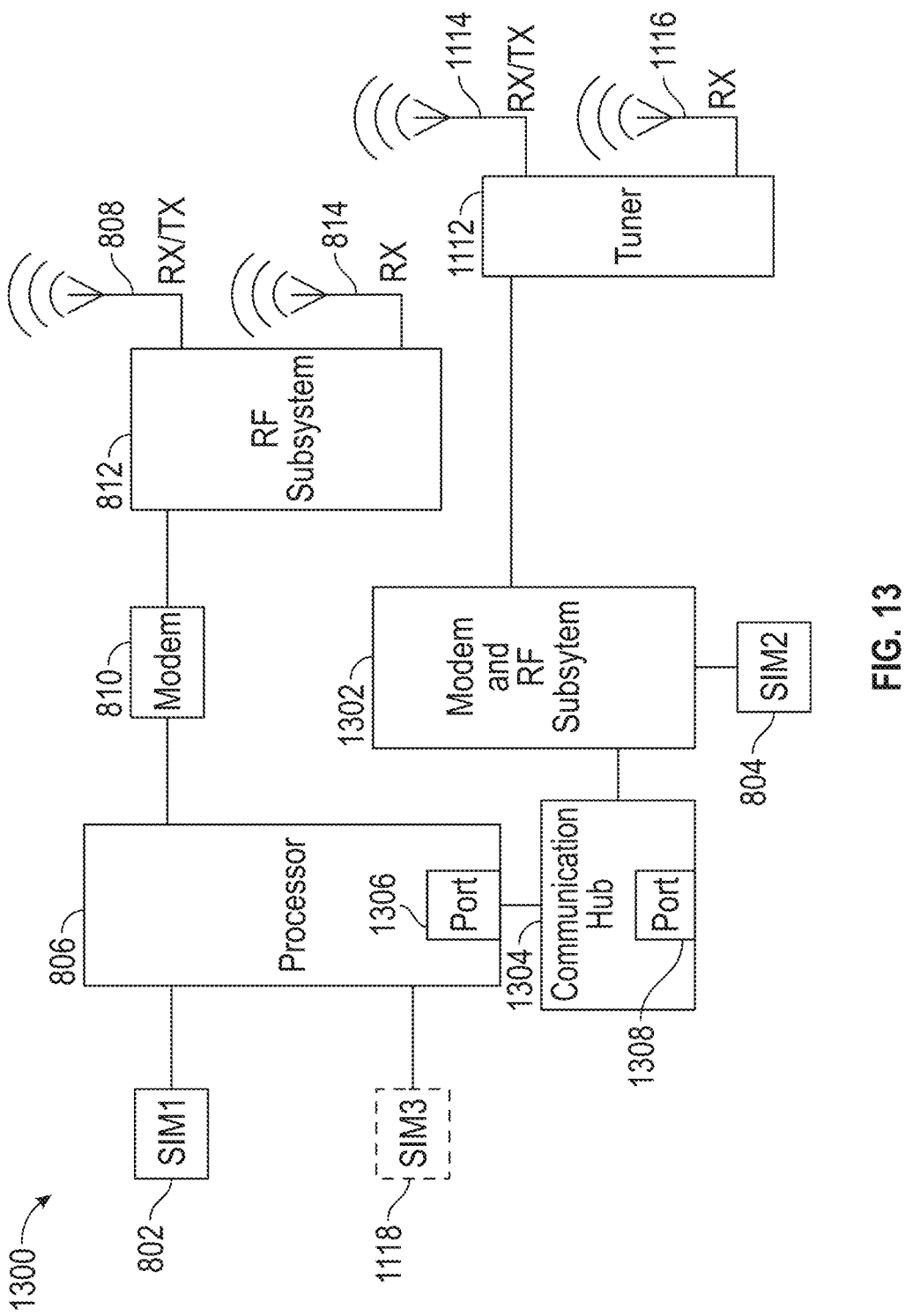
FIG. 13 illustrates a block diagram of a fourth example of a dual-SIM dual-data active wireless device in accordance with certain embodiments of the present disclosure.

FIG. 13 illustrates a fourth example of a dual-SIM dual-data active wireless device 1300 in accordance with certain embodiments. The wireless device 1300 of FIG. 13 includes a number of similar elements as the wireless devices 800, 1000, and 1100 as indicated by the re-use of certain reference numbers. The embodiments of FIG. 13 include an additional modem and RF subsystem 1302. The modem and RF subsystem 1302 may be combined as a single chip as illustrated in FIG. 13, or may be implemented as two separate chips similar to elements 810 and 812. Further, the elements 810 and 812 may be replaced with a single chip that combines the mode and RF subsystem similar to the element 1302. Alternatively, the embodiment of FIG. 13 may include the modem 1202 and embedded processor 1204 of FIG. 12.

The modem and RF subsystem 1302 may communicate with a communication hub 1304. This communication hub 1304 may connect to the data transfer and/or battery charging port 1306 of the processor. Thus, in some such embodiments, the dual-SIM dual-data active features of the wireless device 1300 can be implemented without the addition of another port on the processor and/or without using an auxiliary port or repurposing an assigned or existing port of the processor 806. The data transfer and/or battery charging port 1306 may be a universal serial bus (USB) type port, such as a standard-size USB port, a mini-USB port, a micro-USB port, or a USB Type C port. It should be understood that the port 1306 is not limited to a USB-type port and that the port 1306 can include any type of port used by the wireless device 1300 for charging and/or data transfer. Further, the communication hub 1304 may replicate the data transfer and/or battery charging port 1306 of the processor 806 as the port 1308 of the communication hub 1304 enabling the wireless device 1300 to connect to an outlet or another port for data transfer via the port 1308 of the communication hub 1304. In certain embodiments, the communication hub 1304 may communicate wirelessly with the processor 806, such as via a Bluetooth® or other near-field communication protocol. However, to avoid interference with the communications with the cellular networks, the communication hub 1304 is typically configured to use a wired communication mechanism. As illustrated in the various figures, although described as a dual-SIM dual-data device, various implementations of the wireless devices may support more than two SIMs and/or may have more than two active SIMs actively communicating data packets with multiple cellular networks.

Second Example Communication Environment

Figure 14:
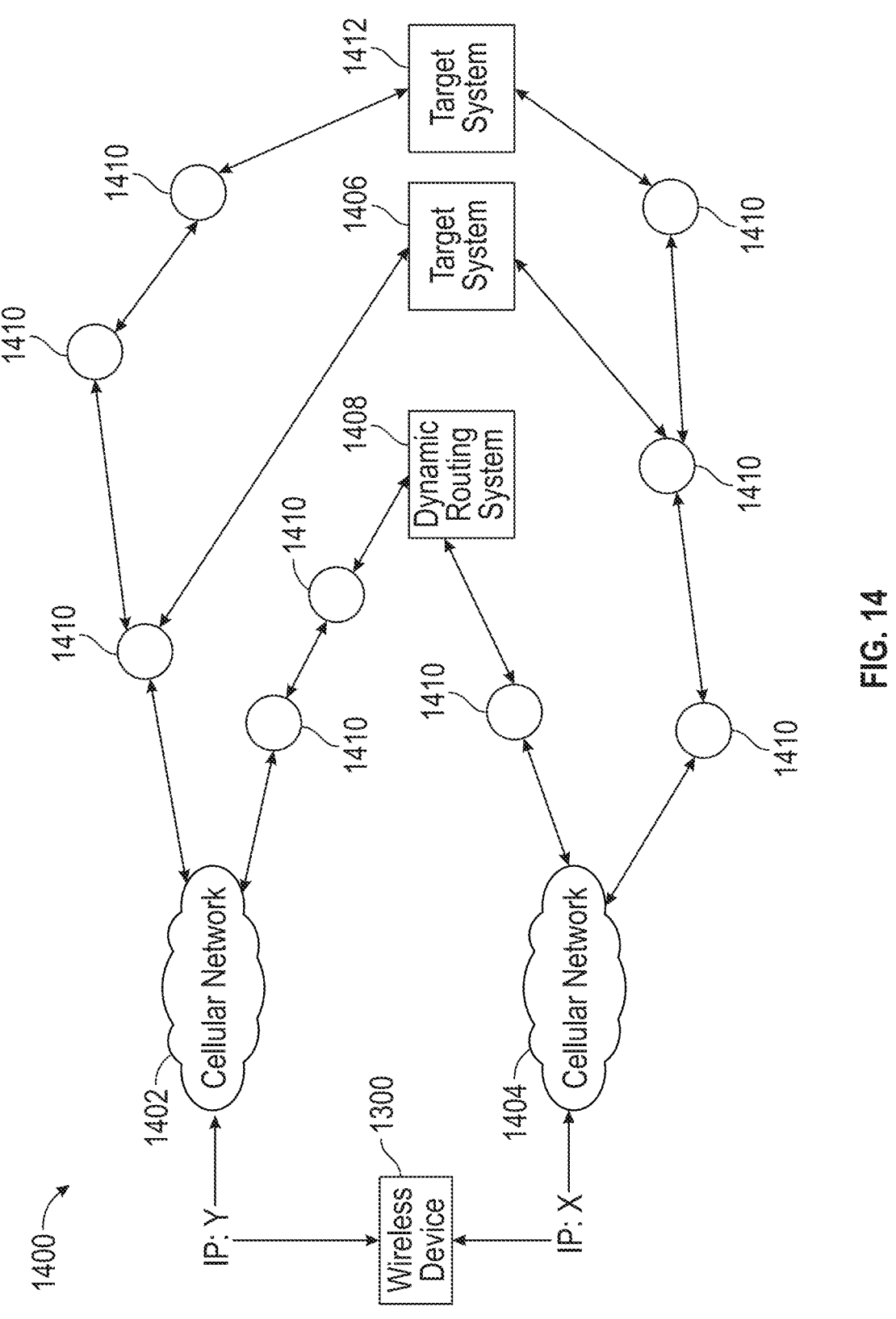
FIG. 14 illustrates an example communication environment for communicating using a dual-SIM dual-data active wireless device.

FIG. 14 illustrates an example communication environment 1400 for communicating using a dual-SIM dual-data active wireless device 1300. The wireless device 1300 may attempt to communicate with a target system 1406 and/or 1412 via the cellular networks 1402 and/or 1404. The wireless device 1300 may be substituted with any of the embodiments of the dual-SIM dual-data active wireless devices described herein. For example, the wireless device 1300 may be substituted with the wireless device 1000, 1100, or 1200. Although only two cellular networks 1402, 1404 and only two target systems 1406, 1412 are depicted, it should be understood that the present disclosure is not limited as such and that the communication environment 1400 may include more or fewer cellular networks and more or fewer target systems.

The target systems 1406, 1412 may include any device that can communicate with the wireless device 1300. For example, the target systems 1406, 1412 may each be another wireless device of the same type or of a different type as the wireless device 1300. Further, the target systems 1406 and 1412 may each be of the same type or of different types. As another example, the target systems 1406, 1412 may each be a server of a network-enabled service. For instance, the target systems 1406, 1412 may each be a server or host of a media streaming service, a data backup service, a shopping service or retailer (e.g., Amazon® or Walmart®), a picture printing service, an email service, and the like. In some cases, the target systems 1406, 1412 may each be a server or other computing device of an employer of a user who owns or uses the wireless device 1300.

The wireless device 1300, and any of the previously described wireless devices, may include any type of device that can communicate over a cellular network. For example, the wireless device 1300 may be or may include a smartphone, a tablet, a laptop, a wearable device (e.g., a smartwatch or smart glasses), a drone (e.g., a delivery drone, a mapping drone, a camera drone, a firefighting drone, etc.), an unmanned aerial vehicle, a delivery device, an automated vehicle, a medical device, or any other device that may include a SIM card and/or may communicate with a cellular network. In some cases, the wireless device 1300, or any of the previously described wireless devices (e.g., wireless devices 1000, 1100, or 1200) can use authentication methods other than SIM cards to communicate with a cellular network. Further, the wireless device 1300 may be capable of communicating with any type of communications network that uses electromagnetic communication. For example, the wireless device 1300 may support cellular communication, Wi-Fi® communication, satellite communication, Bluetooth®, or any other type of wireless communication.

Using embodiments of the dual-SIM dual-data active wireless devices disclosed herein, it is possible to communicate over multiple cellular networks, which may be maintained by different entities or providers, and which may implement different technologies or use different frequency bandwidths. For example, as illustrated in FIG. 14, the wireless device may obtain an identifier, such as an Internet Protocol address from each wireless network or cellular network 1402, 1404. A different entity may own or operate each of the cellular networks 1402, 1404. For example, the cellular network 1402 may be Verizon's network and the cellular network 1404 may be Sprint's network. Further, each of the cellular networks 1402, 1404 may be configured to operate with different frequency bands, different communication standards or protocols, or using different types of hardware. Thus, it will often be the case that a prior art wireless device configured to communicate with cellular network 1402 will be unable to communicate with cellular network 1404, or vice-versa. However, the wireless device 1300, and other wireless devices described herein, may communicate with either or both cellular networks 1402, 1404. Further, the cellular networks 1402, 1404 may include one or more of the embodiments previously described with respect to the communication networks 106. In some cases, the cellular networks 1402, 1404 may be data networks configured to transmit data packets. These data packets may include any type of data. Further the data packets may include or encapsulate voice data. In some cases, the cellular networks 1402, 1404 may transmit both data packets and voice packets. The cellular networks 1402, 1404 may be configured to use different communication technology, protocols, or frequency bands. For example, the cellular networks 1402, 1404 may be 2G, 3G, 4G, 4G LTE, or 5G cellular networks that can communicate with the wireless device 1300 using various corresponding frequency bands or encodings.

Moreover, as explained above, the wireless device 1300 may be able to communicate with other types of wireless networks besides cellular networks. For example, the wireless device 1300 may switch between cellular and a wireless local area network connection, or vice versa. In some cases, the wireless device 1300 may determine the communication connection to establish, maintain, or to switch to based at least in part on one or more connection selection criteria, such as signal or connection strength. In other cases, another system, such as a base station, dynamic routing system, or gateway may determine the communication connection to establish, maintain, or to switch to based at least in part on the one or more connection selection criteria. In such cases, the other system (e.g., dynamic routing system) may instruct the wireless device 1300 as to which network to communicate.

As stated above, the wireless device 1300 may communicate with the target system 1406 via one, or in some cases both, of the cellular networks 1402, 1404. Further, as stated above, the target system 1406 may be another wireless device, such as in the case when a user is calling another user, or the target system 1406 may be a host server, such as when the user is accessing content from a website or other services provider, such as a streaming media service. The wireless device 1300 may determine whether to communicate with the target system 1406 based on one or more characteristics of the cellular networks 1402, 1404 and/or the connections to the cellular networks 1402, 1404. For example, the wireless device 1300 may determine the signal strength of a connection to each of the cellular networks 1402, 1404 and select one of the cellular networks 1402, 1404 with which to establish a connection with the target system 1406 based on the signal strength. The wireless device 1300 may then make the corresponding SIM within the wireless device the active SIM to enable communication with the selected cellular network. In some cases, the wireless device 1300 may maintain multiple active SIMs enabling communication over both the cellular networks 1402, 1404 at the same time, or substantially the same time. For example, the wireless device 1300 may communicate with the target system 1406 using the cellular network 1402 and communicate with the target system 1412 using the cellular network 1404.

In some embodiments, the wireless device 1300 may connect to the dynamic routing system 1408 using one or more of the cellular networks 1402, 1404. The dynamic routing system may include one or more of the embodiments described with respect to the dynamic routing system 108. The wireless device 1300 may provide the dynamic routing system 1408 with a measurement of signal strength between the wireless device 1300 and a base station of each of the cellular networks 1402, 1404. Alternatively, the dynamic routing system 1408 may determine the measurement of signal strength associated with the wireless device's 1300 connection to each cellular network 1402, 1404 from a system of each of the cellular networks 1402, 1404. For example, a base station, routing system, or connection server of each of the cellular networks 1402, 1404 may provide the signal strength information to the dynamic routing system 1408.

As previously stated, the wireless device 1300 may determine the cellular networks 1402, 1404 with which to connect to the target system 1406. In other cases, the dynamic routing system 1408 may determine the cellular network 1402, 1404 the wireless device 1300 should use to communicate with the target system 1406. The dynamic routing system 1408 may select the cellular network 1402, 1404 based at least in part on the signal strength between the wireless device 1300 and the cellular networks 1402, 1404. Alternatively, or in addition, the dynamic routing system 1408 may select the cellular network 1402, 1404 based on other connection characteristics or service level agreements. For example, the dynamic routing system 1408 may select the cellular networks 1402, 1404 based at least in part on one or more of available bandwidth, stability of connection between the wireless device and each cellular networks, priority of traffic or data packets, type of data packet (e.g., voice data packets, media data packets, email, and the like), destination or source of the data sent or received, bandwidth costs associated with the connection, monetary costs associated with the connection, user preferences (e.g., a user may prefer a particular network due, for example, to costs, balancing of vendor usage, brand loyalty, or idiosyncrasies, and the like).

The dynamic routing system 1408 may inform the wireless device 1300 of the preferable or selected cellular network 1402, 1404 or wireless network provider, with which to communicate with the target system 1406. The wireless device 1300 may make the SIM (e.g., SIM 802, 804) card associated with the preferred or selected cellular network active for performing a desired task (e.g., communicating with the target system 1406). In some cases, additional SIM cards may remain active at the wireless device 1300 and may be used to communicate with a corresponding cellular network 1404 to perform another task (e.g., communication with the target system 1412). In some embodiments, the cellular networks 1402, 1404 may be ranked based, for example, on signal strength, bandwidth, stability, and the like, or based on a combination of characteristics. The higher ranked cellular network may be used to perform a task with higher priority. For example, a phone call may be considered higher priority than other tasks, such as media download. In this example, if the signal strength associated with cellular network 1402 exceeds the signal strength associated with cellular network 1404, the phone call may be processed using the cellular network 1402 and the media download, or other task, may be performed using the same network, or may be performed using the cellular network 1404. The determination of whether to divide tasks among networks or to use the same network may depend on the specific task and/or the difference in characteristics between the cellular networks.

Alternatively, or in addition, the higher ranked cellular network may be used to perform a task that requires greater bandwidth or stability, but may or may not be a higher priority task. For example, a voice call usually requires less bandwidth than many other tasks, such as downloading a high-definition (HD) movie. Thus, although the cellular network 1402 may provide a better connection or be associated with higher signal strength, the voice call may be assigned to the cellular network 1404 and the media download to the cellular network 1402. In some cases, whether or not a task is assigned to a particular cellular network may further depend on whether the connection or signal strength is sufficient to provide a minimal quality of service for the task. For example, continuing the previous example, although the voice call may require less bandwidth than the media download task, if the connection to the cellular network 1404 is not strong enough to maintain a clear voice call, the voice call may be allocated, with or without the media download task, to the cellular network 1402.

In certain embodiments, the wireless device 1300 may determine whether a data packet belongs to a particular task for transmission over a particular cellular network 1402, 1404 based on the source or application of the data packet. For example, data packets related to a voice call may be identified based on the source of the data packet being from a dialer application and/or based on the dialer application applying a label or tag to the data packet that identifies the data packet as being for a call (e.g., a voice over data or voice over LTE packet).

Over time, or as the wireless device 1300 is moved, the determination of the cellular network to perform a particular task or over which to maintain or establish a connection with a target system 1406, 1412 may change. If the selected cellular network 1402, 1404 changes, the wireless device 1300 may establish a new connection over the newly selected cellular network, or may use an existing connection with the newly selected cellular network to perform a task, which may be a new task or a task-in-progress (e.g., an existing call or download). To switch an existing task, or task-in-process, associated, for example, with the target system 1406 from one cellular network 1402 to another cellular network 1404, the wireless device 1300 may establish a new connection with the cellular network 1404. The task may be switched to the newly established connection with the cellular network 1404. The connection with the cellular network 1402 may then be dropped, or may be maintained, but may no longer be used to perform the task associated with the target system 1406. The determination of whether to switch cellular networks to perform a task at a particular point in time may be determined based, for example, on the changing signal strength of connections with the cellular networks 1402, 1404, changing bandwidth available, changing connection stability, or any other characteristic of the connections to the cellular networks 1402, 1404. Further, in some implementations, the wireless device 1300 may change the cellular networks used to perform a task when a change in connection characteristics exceeds a threshold or when the connection characteristics associated with a particular cellular network exceeds another cellular network by more than a threshold amount or percentage. Advantageously, in certain implementations, by requiring a threshold change or difference between cellular network characteristics, bouncing between cellular networks or cellular network connections may be reduced or prevented.

In some embodiments, the wireless device 1300, or the dynamic routing system 1408, may maintain a connection to a target system (e.g., the target system 1406) using both cellular networks 1402, 1404 and corresponding SIM cards of the wireless device 1300. The wireless device 1300 may communicate over the preferred cellular network (e.g., the cellular network with a higher signal strength connection to the wireless device 1300). As the user of the wireless device 1300 moves (e.g., drives down the road), the preferred cellular network may change. In some such cases, the wireless device 1300 may switch to the new preferred cellular network using the connection previously established with the new preferred cellular network and maintained throughout the time, or for at least some of the time, that the wireless device 1300 was communicating over the original preferred cellular network.

In some embodiments, the dynamic routing system 1408 may maintain the connection to the target system 1406 via both cellular networks 1402, 1404. As the preferred cellular network for the wireless device 1300 to communicate with the target system 1406 changes, the dynamic routing system 1408 may transition the connection with the wireless device 1300 from the previously preferred cellular network to the currently preferred cellular network. As both connections are maintained, the transition between cellular networks may be performed without service being interrupted.

The communication environment 1400 may include a number of nodes 1410. Each of the nodes 1410 may be of the same type or may differ in type. The nodes 1410 may represent different nodes or hops within a network. At least some of the nodes 1410 may be part of the cellular networks 1402 and/or 1404. Alternatively, at least some of the nodes 1410 may be part of another network in communication with the cellular networks 1402, 1404. In some embodiments, the number of nodes or hops between the wireless device 1300 and the target system 1406, 1412, or the amount of time to communicate between nodes or hops, may be a factor in determining whether the cellular network 1402 or the cellular network 1404 is selected to connect to a target system 1406, 1412. For example, the connection between the wireless device 1300 and the cellular network 1404 may be associated with a higher signal strength than the connection to the cellular network 1402. However, the connection to the cellular network 1402 may be preferred because there are less hops to the target system 1406 using the cellular network 1402 than the cellular network 1404. Thus, in some cases, the particular target system with which the wireless device 1300 desires to connect, or the connection characteristics with the target system may be a factor in selecting the cellular network with which the wireless device 1300 connection to the target system 1406.

Each of the previously described embodiments, or aspects, may be combined or implemented separately. For example, the wireless device 1200 or 1300 may implement aspects of the wireless device 1000 enabling the signal paths associated with the processor 806 to support two SIMs and two corresponding cellular networks while the signal paths associated with the modem 1202 or 1302 may simultaneously support one or two SIMs and the one or two corresponding cellular networks. Accordingly, the wireless device 1200 may support dual active dual data communication across at least two cellular networks.

Additional Example Implementations

Figure 15:
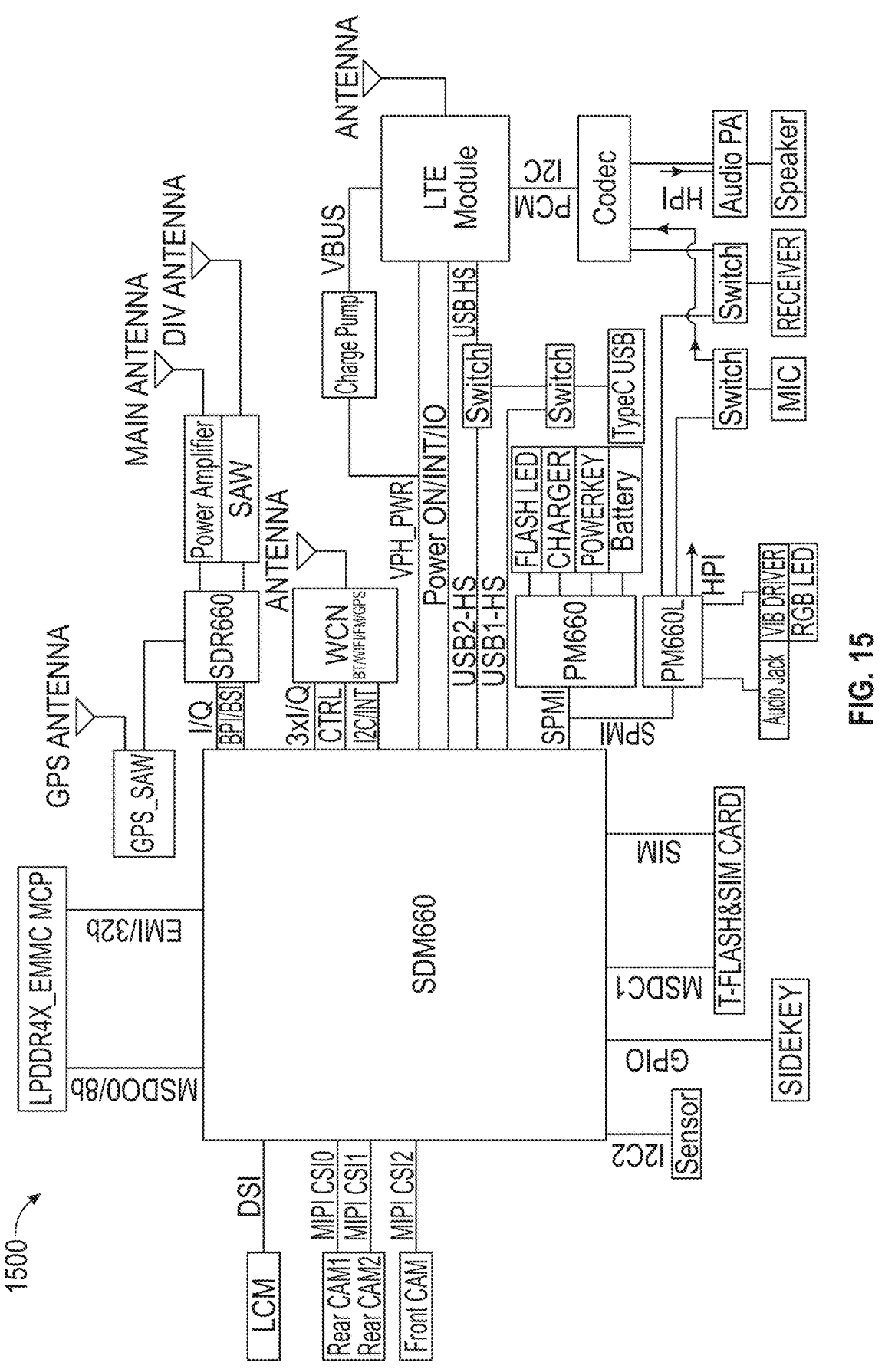
FIG. 15 illustrates an example device-level implementation of a dual-SIM dual-data active wireless device in accordance with certain embodiments of the present disclosure.

FIG. 15 illustrates an example device-level implementation of a dual-SIM dual-data active wireless device 1500 in accordance with certain embodiments of the present disclosure. As illustrated, the wireless device 1500 may include an additional receiver (e.g., the LTE module) and antenna that can communicate with a different cellular network than the main antenna. Thus, wireless device 1500 can maintain two active data communication streams. One communication data stream can be using a first SIM to communicate with a first cellular network and a second communication data stream can be using a second SIM to communicate with a second cellular network. Moreover, each of the data streams can encapsulate voice data enabling either cellular network to be used for a voice call. In some embodiments the codec connected to the LTE module may be optional or omitted. Further, the switches connected to the codec may also be optional or omitted. The data packets received at the LTE module may be communicated to the main processor (e.g., the SDM660 from Qualcomm®) using the universal serial bus (USB) connection to the main processor. The connection type is not limited, and other types of connection types may be used. For example, the USB connection may instead be an electrical serial bus interface standard based connection such as inter-IC sound (12S). As another example, the USB connection may be replaced with a universal asynchronous receiver-transmitter (UART) connection.

Shadow Number

Figure 16:
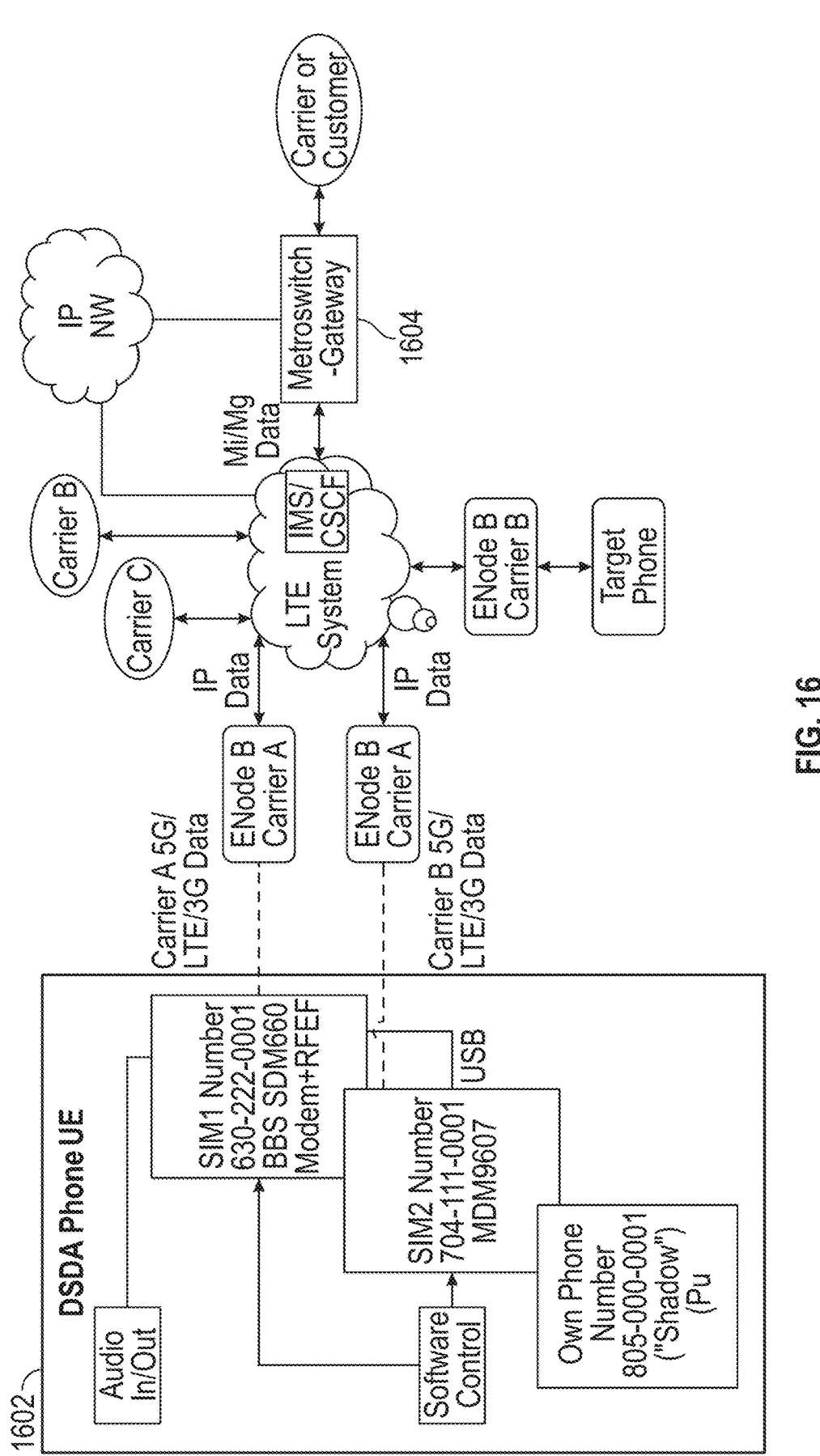
FIG. 16 illustrates an example communication environment for communicating using a dual-SIM dual-data active wireless device with a single phone number in accordance with certain embodiments of the present disclosure.

FIG. 16 illustrates an example communication environment 1600 for communicating using a dual-SIM dual-data active wireless device 1602 with a single phone number in accordance with certain embodiments of the present disclosure. As illustrated, the wireless device 1602 can support multiple SIM cards. Further, the wireless device 1602 can support dual active data. In other words, both SIM cards may be active simultaneously enabling communicate over multiple cellular networks simultaneously, or substantially at the same time.

As previously described, each SIM card may be associated with a different cellular network. Further, each SIM card may be associated with a different phone number. It can be inconvenient to have multiple active phone numbers because a caller may not know which number to dial to reach a user. Similarly, the user may be unsure which number to share with potential callers because the user may not know which cellular network will be preferred at a particular time or location. In certain embodiments, the wireless device and/or the user may be assigned a single phone number, or a shadow number, that can be used to identify the wireless device 1602. When a caller desires to contact the user of the wireless device 1602, the caller may dial the shadow number. This shadow number may be associated with a dynamic routing service. This dynamic routing service may include a dynamic routing system 1604 (e.g., the Metroswitch Gateway from MetroSwitch Technologies™). When a call is received from the caller (e.g., the target phone) at a cellular network, the cellular network may identify the target number (e.g., the shadow number) as being associated with the dynamic routing service. The call (or information about the call) may be forwarded to the dynamic routing system. The dynamic routing system 1604 may determine that the target number is a shadow for, or is associated with, the numbers assigned to the user of the wireless device 1602. The dynamic routing system may determine the optimal cellular network to route the call based, for example, on the signal strength of the connections of the cellular networks to the wireless device 1602. If it is determined that the cellular network associated with the SIM1 is preferred, the call may be routed over the cellular network (e.g., Carrier B) associated with SIM1. Similarly, if it is determined that the cellular network associated with the SIM2 is preferred, the call may be routed over the cellular network (e.g., Carrier C) associated with SIM2. In either case, the number associated with the selected SIM may be substituted by the dynamic routing system for the shadow number (e.g., the Own Phone Number of FIG. 16) that was used by the caller to initiate the call. Alternatively, or in addition, the call may be routed over a data connection to the wireless device 1602. It should be understood that a similar process can be used for establishing a voice or data connection with either a caller or other network-based service (e.g., streaming data service).

Similarly, when a user of the wireless device 1602 attempts to establish a call, regardless of which cellular network is selected, and which associated SIM card is used, the shadow number may be presented. Thus, caller id and other services may use the shadow number enabling the consistent use of a single number despite varying numbers and cellular networks used for communication. When a user makes a call, or a data connection, the number is identified by the associated carrier as being associated with the dynamic routing service. The number presented to a target recipient may be switched by the associated carrier to the shadow number. Alternatively, the call or data connection may be provided to the dynamic routing system for further processing and routing. The dynamic routing system may then substitute the phone number (e.g., the number associated with SIM1 or SIM2) with the shadow number (e.g., the Own Phone Number of FIG. 16). In some cases, the call may be made over a data connection. If the data connection is determined to be below a particular call quality, or if a signal strength associated with the call is below a threshold, a voice call may be initiated using one of SIMs (e.g., SIM1 or SIM2).

In some embodiments, the dialer, user interface, or software controller of the wireless device 1602 may be modified to output a shadow number assigned to a user or wireless device 1602 upon a user initiating a call using the wireless device 1602. Thus, when a user dials a number associated with another user (e.g., places a call to a target phone), the packet data may include the shadow number. This call, or packet data, may be forwarded or transmitted to a gateway or dynamic routing system 1604.

The dynamic routing system 1604 may determine a carrier to process the call based on one or more carrier characteristics, such as those described in U.S. Pat. No. 9,124,957, incorporated by reference above. For example, the call may be routed based on signal quality, cost, priority, payment terms, quality of service level, location of target caller, and the like. The dynamic routing system 1604 may forward the call to the selected carrier to complete the call connection. For example, the dynamic routing system 1604 may forward the call to one or Carrier B or Carrier C. These carriers may be associated with a different entity than the dynamic routing system 1604. Alternatively, or in addition, the dynamic routing system 1604 may cause the call connection to be completed using a call network associated with the same entity as the dynamic routing system 1604. When the call information is forwarded to a carrier to complete the call connection, the dynamic routing system 1604 may continue to present the shadow number. It should be understood that this shadow number may not be assigned or owned by any of the carriers, but may instead be a number owned or assigned by an entity that controls the dynamic routing system 1604. In some such cases, the dynamic routing system 1604 may substitute a number associated with the selected carrier for the shadow number such that the carrier is not aware that a shadow number is being used. In some such cases, the call may continue to be routed through a network of the dynamic routing system 1604 as an intermediary. In other cases, the shadow number may continue to be used and upon the call connection being established, the call may continue directly between the wireless device 1602 and the selected carrier without further interaction with the dynamic routing system 1604.

When attempting to initiate a call, the wireless device 1602 may initially determine, using for example a call controller or call control software executed by a hardware processor, whether to establish the call over a data network (e.g., a VoIP call). In some cases, the wireless device 1602 may determine whether to make a call over a data network, a voice network, or using one of a plurality of networks supported by the wireless device 1602 associated with one of a plurality of SIMs of the wireless device 1602 by measuring signal strength of each of the connection options. The signal strength may be measured using any of the previously described embodiments herein. For example, a diversity antenna may be used to measure a signal strength for a network. The signal strength of each network may be measured by rotating between active networks, measuring the signal strength, and selecting the network with the best signal strength. Alternatively, one network may be active while the signal strength of an alternative network is measured. The wireless device 1602 may switch active networks if determining the alternative network has a higher signal strength.

The wireless device 1602 may present the shadow number as the originating number of the call. If the wireless device 1602 determines that the quality of the call over the data network is below a threshold quality, the wireless device 1602 may instead attempt to connect the call by dialing a number associated with a SIM of the wireless device 1602. This SIM may be one of one or more SIMs supported by the wireless device 1602 (e.g., SIM1 or SIM2). The call connection may be a voice connection or a data connection over a cellular network (e.g., a 4G or 5G connection).

The call may output a number associated with the SIM (e.g., 603-222-0001) instead of the shadow number (e.g., 805-000-0001) that is output when attempting to establish the data connection. For example, the voice packets may include the number associated with the SIM as the originating number. The call may be connected with the dynamic routing system 1604. In some cases, the voice packets are directed or transmitted to the dynamic routing system 1604. The dynamic routing system 1604 may determine that the number included in the voice packets is associated with the SIM, and that the SIM is associated with the same account as the shadow number. The dynamic routing system 1604 may substitute the number associated with the SIM with the shadow number such that the shadow number is presented to a selected carrier (e.g., a carrier selected based on the calling number, or one or more of the previously described routing factors) and/or the target phone of the user being called. Thus, although the originating user, or the wireless device 1602 associated with the originating user may be associated with multiple numbers and/or may communicate over multiple carriers associated with different numbers, a single number may be presented.

Figure 17:
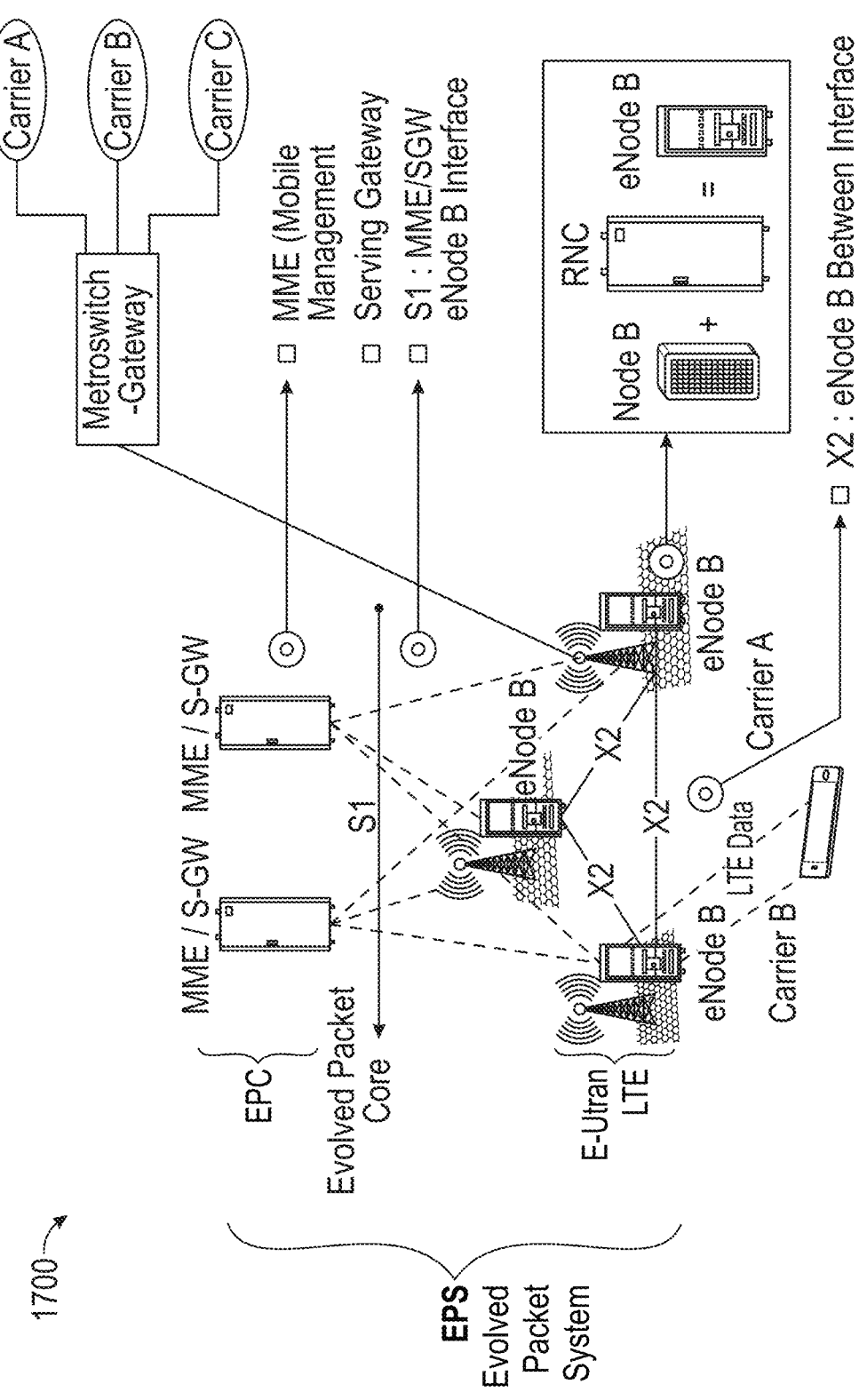
FIG. 17 illustrates an example communication environment with a dynamic routing system for communicating

FIG. 17 illustrates an example communication environment 1700 with a dynamic routing system for communicating using a dual-SIM dual-data active wireless device in accordance with certain embodiments of the present disclosure. As illustrated, when a base station of a network (e.g., an LTE network) receives a call from a dual active data supporting wireless device that supports multiple cellular networks, the base station, or supporting systems of the carrier, may determine that the caller is associated with a dynamic routing service. This determination may be based on the phone number of the caller or other information that may be embedded into data packets from the wireless device. The base station, or supporting systems, may cause the call, or information thereof, to be transferred to the dynamic routing system (e.g., the Metroswitch Gateway). The dynamic routing system can then determine the preferred number or carrier for the wireless device to communicate. The dynamic routing system may then cause the wireless device to communicate with the preferred carrier (e.g., based on signal quality or cost) by either maintaining an existing connection with the initial carrier, or causing the wireless device to switch active SIMs and to communicate with an alternative carrier or cellular network. In some cases, the wireless device may maintain the connection to the initial carrier's cellular network and initiate a connection to the second carrier's cellular network.

FIG. 20 illustrates an example user interface 2000 of a wireless device 1602 that may support a shadow number. As illustrated, the user interface 2000 may be accessed from a settings screen by, for example, activating a special dialing feature via a user interface feature 2002 (e.g., a link, button, or slider UI feature).

The user interface 2000 may include a password interface to prevent unauthorized or accidental modification of the shadow number, or of numbers associated with the shadow number. Further, the password interface may be used to provide access control for activating or deactivating use of the shadow number. In some cases, the password interface may be optional or omitted. For example, in some cases, usage of the shadow number feature may be controlled by a carrier or on the carrier side, or via a separate network interface (e.g., a webpage) available to the user. As another example, the usage of the shadow number may not be an access control (e.g., password) protected feature.

The user interface 2000 may further include one or more UI elements that present one or more phone numbers associated with the shadow number. These phone numbers may be numbers may include numbers associated with one or more SIMs of the wireless device 1602. In some cases, the numbers may also include an identity of the shadow number. For example, the first listed number may be the shadow number, and the second and third listed numbers may numbers associated with SIM1 and SIM2, respectively. In some cases, the user interface 2000 enables a user to select the number that is the shadow number, and/or a number that is presented when establishing a call regardless of the actual number or network used to make the call. Thus, in some cases, the shadow number may be a number associated with one of the carriers supported by the wireless device 1602. For example, the shadow number may also be the number associated with Carrier B or SIM2. Alternatively, the shadow number may not be associated with any of the carriers or SIM cards, and may serve as a substitute for all of the numbers supported by the wireless device 1602. In either cases, as previously described, the dynamic routing system 1604 may control or direct routing of the call over a network associated with a number associated with one of the SIMs while presenting the shadow number as a substitute for the number at the carrier and/or at the originating and/or target wireless device or phone.

Second Additional Example Implementations

FIG. 18 illustrates a second example device-level implementation of a dual-SIM dual-data active wireless device 1800 in accordance with certain embodiments of the present disclosure. The wireless device 1800 includes a secondary communication path that interfaces with a secondary processor (e.g., the MSM8909 from Qualcomm®). In the wireless device 1800, each processor can support up to two SIM cards. Thus, the wireless device 1800 can support up to four cellular networks. Further, the secondary processor can communicate with the primary or main processor (e.g., the SDM660) via a USB interface, or other communication interface, such as I2S, UART, general purpose input-output (GPIO) interfaces. Each communication path within the wireless device 1800 may have its own RF front-end-module (FEM) and main antenna. Accordingly, each communication path may separately transmit and receive data and/or voice packets. Thus, at least two SIMs may be active simultaneously. Further, each processor can separately process data for transmission and/or received data. The secondary processor may transmit and/or receive data using the lower RF FEM and antenna in FIG. 18, and the primary processor may transmit and/or receive data using the upper RF FEM and antenna in FIG. 18.

FIG. 19 illustrates a second example device-level implementation of a dual-SIM dual-data active wireless device 1900 in accordance with certain embodiments of the present disclosure. The wireless device 1900 connects the diversity antenna to a RF FEM, which is turn communicates with the transceiver. Thus, in certain embodiments, the wireless device 1900 can receive data packets from the diversity antenna enabling the wireless device 1900 to receive data from two cellular networks associated with two SIM cards.

Example Centralized Network Selection Process

As described with respect to FIG. 2, and elsewhere herein, a dynamic routing system (such as the dynamic routing system 108, the dynamic routing system 1408, or the dynamic routing system 1604) can determine a communications network for a wireless device (e.g., a smartphone, drone, automated vehicle, or other device capable of wireless communication) to maintain a data and/or voice connection based at least in part on a determined signal strength or other network characteristic for each of a set of communication networks. As part of the process 200, the dynamic routing system may provide the wireless device (e.g., the wireless device 1000, 1100, 1200) with an identity of a selected communication network. The wireless device may then communicate over the selected communication network. In some cases, the dynamic routing system may provide the wireless device with an ordered list of communication networks, the wireless device can use the ordered list to route data and/or voice communications based on a priority. For example, a data connection may be routed via the communication network with better quality of service or signal strength and a voice connection (which typically requires less bandwidth) may be routed over the communication network with lower signal strength. In other cases, the connection priority may be reversed such that the voice call (or voice over IP call) is routed over the communication network with higher signal strength.

FIG. 21 illustrates a flow diagram for one embodiment of a centralized network selection process 2100 in accordance with the teachings of the present disclosure. The process 2100 can be performed by any system that can support one or more communication connections (data or voice including, but not limited to, voice over IP) to a plurality of communication networks and that can receive a selection or ranking of communication networks from a routing system, such as the dynamic routing systems 108, 1408, 1604. For example, one or more operations of the process 2100 can be performed by a wireless device 1000, 1100, 1200, 1300, or components thereof (such as processor 806, 1204, RF subsystem 812, or modem 1202, 1302, etc.). As previously described, the wireless device may be a smartphone. Alternatively, or in addition, the wireless device may be any other electronic device that can communicate over a wireless network, such as a drone (e.g., a delivery drone or a camera drone), automated vehicle (e.g., self-driving car), medical device, etc. Although a number of different systems may perform some or all of the process 2100, to simplify discussion, the process 2100 will be described with respect to particular systems.

The process 2100 begins at block 2102 when, for example, the wireless device 1300 connects to a dynamic routing system (e.g., dynamic routing system 108, 1408, 1604) via a communication network. Although any dynamic routing system or communications gateway can be used with respect to the process 2100, to simplify discussion, the process 2100 will be described with respect to the dynamic routing system 1604.

In some cases, the wireless device 1300 may connect directly to the dynamic routing system 1604. However, generally the wireless device 1300 connects or communicates with the dynamic routing system 1604 via a communication network, such as a cellular network, that is supported by the wireless device 1300. The communication network may be one of a plurality of communication networks supported by the wireless device 1300. Each of the communication networks may be different cellular networks that use different frequency bands, use different cellular technology (e.g., 3G, 4G, 4G LTE, 5G, TDMA, CDMA, GSM, etc.), are owned or maintained by different communication providers (e.g., AT&T®, T-Mobile®, Verizon®, etc.). Alternatively, or in addition, at least some of the communication networks may be non-cellular networks. For example, the communication networks may include Wi-Fi® networks, satellite networks, or any other type of communication network.

The wireless device 1300, and/or an operator of the wireless device 1300, may or may not be aware that the wireless device 1300 is communicating with the dynamic routing system 1604. For example, a user may interact with a user interface (e.g., a dialer, a web-browser, or other application) of the wireless device 1300 to initiate a phone call, to access a website, or to access some other service over a network, and the wireless device 1300 (in conjunction with the dynamic routing system 1604) may automatically perform the process 2100 without the user being aware that the process 2100 is being performed.

In some cases, the block 2102 may include connecting to the dynamic routing system 1604 via a plurality of supported communication networks. For example, during operation, the wireless device 1300 may attempt to initiate or maintain connections with some or all of supported communication networks. Each connection may be routed to or through the dynamic routing system 1604. Alternatively, or in addition, the user may initiate multiple connections by, for example, making multiple requests or performing multiple interactions with the wireless device 1300 at least partially in parallel. For example, the user may initiate, or cause to be performed, a file download, a video stream, a phone call, a navigation process, or any number of other supported operations by the wireless device 1300 at least partially in parallel. At least some of the operations may be performed via different network connections over the same communication network or over different communication networks. In cases where the operations are performed over different communication networks, the block 2102 may include connecting to the dynamic routing system 1604 via one or more of the communication networks. In some cases, the wireless device 1300 communications with the dynamic routing system 1604 via the communication network that is currently identified as the primary network. The primary network may be the network last designated as the primary network, the network with the best signal strength, a network designated by a user as the primary or preferred communication network, the network designated as the primary network in a particular geographic area, or based on any other criteria for identifying the primary network. Alternatively, the wireless device 1300 communicates with the dynamic routing system 1604 via a communication network that is currently not identified as the primary network and/or is not being used to perform one or more operations.

In some cases, the wireless device 1300 provides the dynamic routing system 1604 with an identity of supported communication networks that are supported by the wireless device 1300. Further, the wireless device 1300 may provide additional information relating to communication via the supported communication networks, such as preferred networks. In other cases, the dynamic routing system 1604 is capable of determining the supported communication networks based on an identifier associated with the wireless device 1300, such as an IP address, an account name, a MAC address, and the like.

At block 2104, the wireless device 1300 determines a signal strength for a connection to each of a set of communication networks. The set of communication networks may or may not include the communication network used at the block 2102 to connect to the dynamic routing system. Further, the set of communication networks may or may not include all the communication networks to which the wireless device 1300 is capable of connecting. The wireless device 1300 may determine the signal strength for a connection to a communication network using a diversity antenna (e.g., the diversity antenna 814, 1116, etc.). Further, this signal strength may be determined by an RF subsystem (e.g., the RF subsystem 812) and/or a processor (e.g., the processor 806) of the wireless device 1300. In some embodiments, the block 2104 may include measuring additional and/or alternative connection characteristics, such as round trip packet time, bit error rate, packet loss, packet delay, signal to noise ratio, etc.

In some embodiments, the dynamic routing system 1604 determines the signal strength for one or more connections via one or more communication networks to the wireless device 1300. In some such cases, the block 2104 may be optional or omitted.

In some cases, the signal strength is a real-time or near real-time determination of signal strength for a connection between the wireless device 1300 and a communication network. In other cases, the signal strength determined for each communication connection may be a predicted or estimated signal strength that is determined for the wireless device 1300 connecting to each of the communication networks. The prediction or estimate of signal strength may be determined based on historical data that includes prior connections between the wireless device 1300 and the communication networks at particular geographic locations, with particular base stations or other communication hardware, and/or at particular times of the day or week. Further, the prediction or estimate of signal strength may be determined from data collected or aggregated from other wireless devices that are currently or have previously connected to the communication network at a particular time and/or geographic location. For example, it may be determined that based on a set of wireless devices currently connecting to a first communication network and a set of wireless devices (which may or may not be overlapping) currently connecting to a second communication network, that the predicted signal strength for the wireless device 1300 will be higher with the first communication network. In such cases, the dynamic routing system 1604 may instruct the wireless device 1300 to connect to, or to use a connection with, the first communication network when the wireless device 1300 is within proximity of (e.g., within range of a particular base station) where the set of wireless devices were located when connecting to the first communication network.

At block 2106, the wireless device 1300 provides the signal strength measurements to the dynamic routing system 1604. The signal strength measurements for each communication network may be provided upon connection to the communication network, upon switching base stations, periodically, intermittently, upon request by the dynamic routing system 1604, upon signal quality dropping below a threshold, upon signal quality changing by more than a threshold amount, or in response to any other trigger.

At block 2108, the wireless device 1300 determines its location and/or the trajectory of the wireless device 1300. Alternatively, or in addition, the dynamic routing system 1604 may determine the location and/or the trajectory of the wireless device 1300. In some cases, the wireless device 1300 determines its location, which it may send to the dynamic routing system 1604, and the dynamic routing system 1604 may determine the trajectory of the wireless device 1300. The location and/or trajectory of the wireless device 1300 may be determined based at least in part on an identity of one or more base stations communicating with the wireless device 1300, a location determined by a satellite-based geolocation system (e.g., Global Positioning System (GPS)), travel history of the wireless device 1300, Wi-Fi® connection(s) established by the wireless device 1300, or any other type of location data. Further, multiple location sources may be used to determine a location and/or trajectory of the wireless device 1300. In some cases, a trajectory of the wireless device 1300 may be determined based on a command or task assigned to the wireless device 1300. For example, if the wireless device 1300 is, or is included as part of, a drone delivery device, the trajectory of the wireless device 1300 may be determined based on assigned deliveries. As another example, the trajectory of the wireless device 1300 may be determined based at least in part on an address supplied to the wireless device 1300 or traffic patterns obtained along one or more potential routes of the wireless device 1300.

At block 2110, the wireless device 1300 receives a selection of a communication connection from the dynamic routing system 1604. Receiving the selection of the communication connection may include receiving a selection of a data network with which to communicate. Alternatively, or in addition, receiving the selection of the communication connection may include receiving an identification of a base station, a router, a communication gateway, or any other communication hardware or system with which a device may communicate to establish, initiate, or maintain a network connection, cellular or otherwise. The selected communication connection can be an existing connection, or one of a set of existing connections to use with respect to an operation (e.g., a call or other operation that utilizes a communication connection). Alternatively, or in addition, the selected communication connection may be a potential connection that has not yet been established. This communication connection may be selected based on, for example, historical connection data or an anticipated trajectory of the wireless device 1300. In some cases, the selected communication connection is a ranking of available communication connections. In some such cases, the wireless device 1300 (or processor 806 thereof) may prioritize connections to different communication networks identified in the ranking of available communication connections. The wireless device 1300 may select the highest ranked communication connection, or may allocate different communication connections to different tasks based, for example, on the task priority or characteristics of the task. For example, tasks or operations that require a more stable or higher bandwidth connection (e.g., HD streaming) may be performed with a different communication connection that can operate with lower bandwidth (e.g., a voice call).

The dynamic routing system 1604 may select, or rank, communication connections (or communication networks) based at least in part on signal strength for each of the communication connections, a comparison of signal strengths for a set of communication connections, location of the wireless device 1300, a trajectory of the wireless device 1300, and/or a predicted trajectory or location of the wireless device 1300. The dynamic routing system 1604 may compare the signal strength of connections to different data networks to determine the communication connection or the data network to select or rank. In some cases, the dynamic routing system 1604 may determine a communication connection (or communication network) or a ranking of communication connections (or communication networks) using a network selection process. For example, the dynamic routing system 1604 may use the process 200 to select a communication network.

The process 2100 may be performed each time the wireless device 1300 attempts to perform a new operation (e.g., a new voice call or a new communication connection to an external service). Further, the process 2100 may be performed repeatedly, periodically, or intermittently. In some cases, the process 2100 may be performed each time the wireless device 1300 moves into or out of a range of a network connection, a networking device, or a base station. Further, the process 2100 may be repeated each time there is a threshold change in signal quality or signal strength of an active or existing communication connection.

Example Satellite Communications Environment

As has been described herein, features of the present disclosure enable a wireless device to maintain an optimal communication connection. As the wireless device moves or the quality of a communication connection changes, the wireless device may switch communication networks. Further, the wireless device may maintain multiple communication connections to multiple communication networks enabling prioritization of different operations among different communication networks. In other words, the wireless device can be a dual data dual active device that has multiple active data connections that are, at least some of the time, simultaneously communicating with multiple communication networks.

Further, as previously described, the wireless device is not limited to a smartphone, but can include any type of device that may communicate via a communication network, whether a cellular network, a satellite-based network, wireless network, a hybrid of two or more types of networks, or any other type of network. For example, the wireless device can be a self-driving vehicle (car or otherwise), a delivery drone or other type of drone, laptop, tablet, etc. As is clear from the above examples, in some cases the wireless device may be self-moving or may move in response to a command, and in other cases, a user may carry the wireless device.

In some cases, it is desirable to maintain a network connection, or a network connection of an above threshold signal quality or signal strength during a trip by the wireless device or a system that includes the wireless device. For example, a delivery drone may use a network connection to help navigate, to communicate status information, or to provider delivery updates. Thus, it may be desirable to ensure that the delivery drone maintains a communication connection or network connection during operation. As another example, a user may desire to always have a network connection during a trip. For example, the user may be expecting an important call or may have a health condition and desire to always have a network connection for emergencies.

Certain embodiments of the present disclosure can route a path for the wireless device to ensure a network connection throughout a trip or during operation. The path may be used to control movement of the wireless device, or may be a recommended path presented to a user. The user may then instruct the wireless device to follow a particular path, or the user may elect to follow a particular path to maintain network connection. In some cases, the path can be determined in advance based on historical data (e.g., signal strength of prior connections by the wireless device or by other devices). Alternatively, or in addition, the path may be determined substantially in real time based on signal strengths measured by the wireless device or other wireless devices travelling along potential paths of the wireless device (or user or system carrying the wireless device).

FIG. 22 illustrates an embodiment of a satellite communications environment 2200 in accordance with the teachings of the present disclosure. In one example use cases with respect to the satellite communications environment 2200, a drone 2202 (e.g., a package delivery drone) is scheduled to travel (e.g., to deliver a package) to a target location 2204 (e.g., a house or office). As illustrated by the dashed lines 2206A, 2206B, 2206C, 2206D, 2206E, the drone 2202 may travel multiple different paths or combinations of possible paths to reach the target location 2204. These paths may be travel lanes approved by a government agency, paths that are unobstructed by obstacles, roads for vehicular traffic, or any other type of path where a wireless device may travel.

As previously explained, in some cases it is desirable that the wireless device, the drone 2202 in this particular non-limiting example use-case, maintains a network connection, or a network connection of a particular quality. As a number of the embodiments are applicable to other wireless devices, the term drone 2202 and wireless device 2202 are used interchangeably herein. Further, as with previously described wireless devices herein, the drone or wireless device 2202 may be a dual data dual active device that is capable of communicating over multiple distinct communication networks simultaneously or at least partially in parallel. In some cases, the drone 2202 may communicate with a satellite 2208, either directly or via a connection to an intermediary system. Due to power requirements, in most cases the drone 2202 will only download data from the satellite 2208. Data to be uploaded to the satellite 2208 may be transmitted to a base station or cell tower, which may transmit the data to the satellite 2208. Although a single satellite 2208 is depicted, it should be understood that the satellite 2208 may be one of a set of satellites, or may represent a set of satellites, that can determine a position of a drone 2202, or other wireless device, using triangulation.

The satellite 2208 may provide the drone 2202 with a selected path to travel to the target location 2204. In some cases, the satellite 2208 may include a dynamic routing system 1408 that determines a communication network based on network characteristics (e.g., signal strength) for the drone 2202 to use, and a path to travel to the target location to maintain an optimal connection to the communication network. Alternatively, or in addition, the dynamic routing system 1408 may be a separate system which can provide a communication network selection (or ranking) and/or a travel path to the satellite 2208. The satellite 2208 may provide the network and/or path selection to the drone 2202.

The travel path may be selected based on the signal strength along the path as determined based on historical data and/or other wireless devices currently along the path that are connecting to a communication network. Further, identity of the path may include identify of a communication network along the path that provides the best signal strength. In some cases, wireless devices, such as the drone 2202, may provide signal strength information to a dynamic routing system (e.g., the dynamic routing system 1406). Based on the provided signal strength information, the dynamic routing system 1408 may determine a communication network that provides the highest signal strength or best signal quality at a particular location along the different paths represented by the dashed lines 2206A, 2206B, 2206C, 2206D, 2206E. The dynamic routing system 1406 may use any of the processes disclosed herein (e.g., the process 200, 2100) to determine a communication network with the highest signal strength. In some cases, the satellite 2208 may direct the travel of the wireless device 2202 based on measured signal strengths along different paths to the target location 2204. The satellite 2208 may direct the travel of the drone 2202 (or other wireless device) in real time and/or in advance of travel by the drone 2202. In some cases, buildings, trees, mountains, and other obstacles may interference with connections to the base stations 2210, or other networking systems. In some such cases, the satellite 2208 may direct the drone 2202 along a path that may not be the shortest path, but which may have more consistent network coverage or better average signal strength.

In some cases, the drone 2202 may receive instructions regarding travel direction from the satellite 2208 and may transmit signal strength or other communication quality information to the dynamic routing system 1408 via a terrestrial communication system, such as a cellular communication network or a Wi-Fi® network. The network may include cellphone towers and/or other mechanisms for maintaining a network, such as balloons (e.g., Loon by Google®), or other stratospheric systems.

Example Route Mapping Process

FIG. 23 illustrates a flow diagram for an example embodiment of a route mapping process in accordance with the teachings of the present disclosure. The process 2300 can be performed by any system that can provide mapping or navigation information to a wireless device to control the navigation of the wireless device or to permit a user to navigate based on the predicted or anticipated signal strength of a communication connection for the wireless device along the route. For example, one or more operations of the process 2300 can be performed by a wireless device 1000, 1100, 1200, 1300, 2202 or components thereof (such as processor 806, 1204, RF subsystem 812, or modem 1202, 1302, etc.), a satellite 2208, and/or a dynamic routing system 1408, among other systems. As previously described, the wireless device may be a smartphone. Alternatively, or in addition, the wireless device may be any other electronic device that can communicate over a wireless network, such as a drone (e.g., a delivery drone, firefighting drone, or a camera drone), automated vehicle (e.g., self-driving car), medical device, etc. Although a number of different systems may perform some or all of the process 2300, to simplify discussion, the process 2300 will be described with respect to particular systems.

The process 2300 begins at block 2302 when, for example, the satellite 2208 determines a current location of a wireless mobile device 2202. The mobile wireless device 2202 may be any type of mobile wireless device, such as a delivery drone, a firefighting drone, or a camera drone. As explained above, the wireless device is not limited in type and can include any type of wireless device. Further, the wireless device is not limited to a self-mobile device (e.g., a drone), but can include a wireless device that may be carried by a device or user (e.g., a smartphone). Moreover, as previously described, the satellite 2208 may be one of a set or network of satellites.

The current location of the wireless device may be determined based on one or more signals (e.g., radio frequency, microwave, or other electromagnetic signals) received from one or more base stations or cells. For example, one or more base stations may communicate with the wireless mobile device 2202. Based on the communication with the wireless mobile device 2202, a base station may determine a coarse location of the mobile device 2202, which may be provided to the satellite 2208. Using the coarse location of the mobile device 2202, the satellite 2208 may locate the mobile device 2202 and determine a more fine-grained location. In other cases, the satellite 2208 may directly determine the location of the mobile device 2202 without the use of base stations or cells.

The current location may be provided by the wireless mobile device 2202 to a base station. The base station may provide the location received from the wireless mobile device 2202 to the satellite 2208.

Further, the current location may be a location where the mobile device 2202 begins a task or operation (e.g., leaves a warehouse to make a delivery). In other cases, the current location may be a waypoint on a trip. For example, the current location may be a midpoint in a trip or a prior stop. In some cases, the current location can be any point along a path of the mobile device 2202.

At block 2304, the satellite 2208 determines a target location of the wireless mobile device 2202. The satellite 2208 may determine the target location based on a command or information provided by the wireless mobile device 2202 to a base station or cell tower, which may provide or forward the target location information to the satellite 2208. For example, the satellite 2208 may receive an itinerary or schedule of locations to which the wireless mobile device 2202 is scheduled to travel. Alternatively, or in addition, the satellite 2208 may predict the target location of the wireless mobile device 2202 based, for example, on historical data (e.g., past travel of or with the mobile device 2202) and/or a trajectory of the wireless mobile device 2202 based on detected existing travel of the mobile device 2202. In some cases, the target location may be determined by the dynamic routing system 1408, or a server in communication with a communication network and/or the Internet.

At block 2306, the satellite 2208 identifies a set of eligible routes between the current location of the wireless mobile device 2202 and the target location of the wireless mobile device. Generally, the set of eligible routes include a plurality of possible or eligible routes between the current location (or in some cases an identified starting location, which may differ from a current location) of the wireless mobile device 2202 and the target location. However, in some cases, the set of eligible routes may include a single route. For example, it may be determined that there is only a single viable path between two locations.

The set of eligible routes may vary based on the type of wireless mobile device 2202. For example, the set of eligible routes may be limited to routes formed from a road network for wheeled mobile devices 2202 (e.g., an automated car) or mobile devices carried by a user (e.g., smartphone or laptop). In some cases, the set of eligible routes may include walking paths for mobile devices carried by the user, which may be based on whether a user specifies walking mode or driving mode, or on a determination based on speed of movement or location of the mobile device 2202 whether the user is walking to a target location. In some cases, the set of eligible routes may include overland routes or routes over obstacles of a particular height or type. For example, if the mobile device 2202 is capable of flight (e.g., certain types of drones), the set of eligible routes may include at least portions of the route that are not traversable by foot or on the ground. In some cases, the set of eligible routes may be determined as a series of traversable waypoints. These traversable waypoints may be based on road networks, cell towers, identified or predicted target locations, or any other type of waypoint that may be used to project or determine a traversable route for the mobile device 2202, or a user or system carrying the mobile device 2202. Further, the traversable waypoints may serve as a series of breadcrumbs for directing travel along a route.

In some cases, the set of eligible routes may depend on laws in the jurisdictions, environmental factors or obstacles, trespassing laws, ownership of buildings or property, or any other factor that may affect the route for the mobile device 2202. For example, a flying drone may be restricted from traversing private property, or may be required to be a certain height above a building.

In some embodiments, some or all of the operations associated with the block 2306 may be performed by the dynamic routing system 1408. Further, some or all of the operations may be performed by a server in communication with the dynamic routing system 1408 and/or the satellite 2208. For example, the dynamic routing system 1408 may determine the set of eligible routes.

At block 2308, the satellite 2208 accesses historical signal strength data associated with each route from the set of eligible routes. The historical signal strength data may be associated with or correspond to a signal strength of connections between wireless devices and one or more communication networks (e.g., data and/or voice networks) with which the wireless devices may communicate. The historical signal strength data may include a measure of signal strength (e.g., wireless signal strength) along a route, an average signal strength along the route, a peak or minimum signal strength along the route, signal strength at a series of measurement points along the route, or any other type of signal strength or connection quality data. Further, for each route, there may be multiple historical signal strengths associated with different communication networks available along the route. For example, if there are three providers of cellular service along a route, there may be three sets of historical signal strength data for the route. In some cases, the previous example may produce more than three sets of historical signal strength data for the route because, for example, there may be different combinations of cellular service corresponding to wireless devices switching networks as the wireless devices travel along the route.

The historical signal strength data may be obtained from prior traversal of the route by the mobile device 2202 and/or by one or more other mobile devices of the same type or different type. Further, historical signal strength data may be obtained from devices that traverse a portion of the route or are within a threshold distance of a base station, cell, or other node along the route that connects wireless devices to a communication network. Moreover, historical signal strength data may include signal strength or connection quality for connections between mobile devices and non-cellular communication networks. For example, the historical signal strength data may include connections to Wi-Fi® networks, satellite networks, or any other type of network that a mobile device can connect along one or more of the routes from the set of eligible routes.

In some embodiments, some or all of the operations associated with the block 2308 may be performed by the dynamic routing system 1408. Further, some or all of the operations may be performed by a server in communication with the dynamic routing system 1408 and/or the satellite 2208. For example, the dynamic routing system 1408 may access historical data from a repository of network connection data. In some embodiments, the block 2308 may be optional or omitted. For example, the process 2300 may determine routes based on currently detected signal strength data.

At block 2310, the satellite 2208 determines signal strength along each route from the set of eligible routes. The signal strength may be determined from the historical data accessed at the block 2308. Alternatively, or in addition, the signal strength may be determined from connections between wireless devices and communication or networking systems currently occurring along the route. Determining the signal strength may include determining a set of signal strengths are a series of nodes or waypoints throughout the route. Alternatively, or in addition, determining the signal strength may include determining a minimum or average signal strength along the route. Determining the signal strength along each route may include determining signal strength values for multiple different available communication networks along the route. The available communication networks may include a subset of communication networks that are supported by the wireless mobile device 2202.

In some embodiments, some or all of the operations associated with the block 2308 may be performed by the dynamic routing system 1408. Further, some or all of the operations may be performed by a server in communication with the dynamic routing system 1408 and/or the satellite 2208.

At block 2312, the satellite 2208 selects a route based on the signal strength along each of the eligible routes. In some cases, selecting the route may include selecting the route with the highest signal strength, the highest average signal strength, a signal strength that satisfies a minimum threshold along the entire route, the most stable connections, the shortest route, or any other route or path selection algorithm based on signal strength or signal quality. Further, in some cases, selecting the route may include selecting a particular communication network, or set of communication networks to communicate with along the route. In cases where there is a tie, or a difference between routes and/or networks is less than a threshold, other routing and/or network selection factors may be used to break the tie. For example, network stability, price, route length, a combination of the foregoing, or other factors may be used to break a tie between routes or communication networks.

In some embodiments, one or more mapping or graphing algorithms may be used to select the route. For example, a graph (or graph data structure) may be constructed with nodes or vertices corresponding to cell towers (or other waypoints) along potential routes between the current location of the wireless device 2202 and the target location. Each node or vertex may represent or correspond to a single base station. Alternatively, a node may represent multiple base stations. For instance, in some cases, a cell tower may be shared among different entities that own or manage communication networks. In some such cases, the cell tower may include multiple base stations with each base station associated with a different communication network of the same entity or a different entity. In cases where a location or a cell tower has multiple base stations (or other networking hardware), the node may represent one or more base stations at a particular location or on a particular cell tower. Further, the nodes may be heterogeneous. For example, some nodes may represent base stations, or may have weighted signal strengths based on nearby base stations, and other nodes may represent other networking hardware, such as routers or other wide area network communication hardware.

In some cases, the nodes may represent a point in the route that is closest to a particular cell tower or communication network hardware, but which may not be the actual location of the cell tower or communication network hardware. In other cases, the nodes may be independent of base stations or communication network hardware, but may instead be selected based on geographic traversal between two points, such as for navigational maps. For example, the nodes may represent intersections in a road network, or other travelling path that may be traversed by foot, wheels, or in the air. The construction of the nodes may depend on the type of wireless device. For example, a wheeled drone or a device carried by a user may use intersections of streets or walking paths as nodes with edges representing travel between the intersections. However, for a flying drone, the nodes may include alternative or additional waypoints, such as tress or buildings.

Regardless of what the nodes and edges represent, the graphs may include weights that facilitate the selection of a route based at least in part on the ability to communicate or the quality of communication with one or more communication networks. Each edge between nodes may have one or more weights corresponding to signal strengths for one or more communication networks supported by the cell towers. A modified shortest path algorithm may then be used to determine a route that provides the best signal strength throughout the route. The satellite 2208 or the dynamic routing system 1408 may solve the weighted graph algorithm or route selection algorithm to determine a route that provides the best signal strength, or optimizes for one or more communication network metrics. For example, a version of Dijkstra's algorithm may be used to select a route.

In some cases, a score may be assigned to each edge. The score may be based on a signal strength for a communication network that is accessible by a cell tower associated with the node. Further, in some cases, the score may be based on one or more additional factors, such as network characteristics (e.g., bandwidth, cost, stability, etc.), length of the route segment, vehicle traffic, etc. In some cases, a route that provides the best signal strength may have a lower score than a route that providers less average signal strength, but is significantly shorter. In other words, in some cases, it may be preferable to have a shorter physical route of travel despite a lesser communication connection. However, in other cases, the extended travel time to maintain a minimal network connection may be preferable. For example, it may be desirable that a delivery drone maintain a threshold network connection to facilitate operation.

In some cases, selecting the route may include one or more of the processes disclosed herein for selecting a communication network, such as the process 200 and/or 2100. In some embodiments, some or all of the operations associated with the block 2308 may be performed by the dynamic routing system 1408. Further, some or all of the operations may be performed by a server in communication with the dynamic routing system 1408 and/or the satellite 2208.

At block 2314, the satellite 2208 provides the selected route to the wireless mobile device 2202. The route may be provided in its entirety in one transmission (or series of data packets associated with a single transmission operation). Alternatively, or in addition, the route may be provided in segments with further segments being determined and provided as the wireless mobile device 2202 travels. Advantageously, by providing the route in segments, the route may be modified during travel based on changes to the target destination and/or changes in detected signal strengths of the communication network along segments of the route.

In some embodiments, signal strength between wireless devices and a base station, or other network communication hardware may change over time. For example, a base station may break or a change in the number of connections with wireless devices may occur. In some such cases, portion of the process 2300 may be repeated to determine an updated route for the wireless mobile device 2202. For example, the block 2310 may be repeated to obtain new signal strength values along segments of eligible routes. The eligible routes may be different than a prior performance of the process 2300 because, for example, the wireless device 2202 may have changed positions (e.g., traveled some of the previously selected route). The satellite 2208 may determine an updated set of eligible routes and may select a route using the updated signal strength data. The updated or new selected route may be provided to the wireless device 2202 enabling a change in route to maintain a particular quality of network connection.

As described above, a satellite 2208 or a dynamic routing system 1408 may compare signal strengths for connections by a wireless device 2202 to two or more different networks or networking elements (e.g., routers or base stations, etc.) to determine a network to use for communication of voice or data, and/or for the determination of a route to travel. Alternatively, or in addition, the wireless device 2202 may compare the signal strength data to determine the network to use for communication of voice or data, and/or for the determination of the route to travel. Further, in some cases, instead of or in addition to comparing signal strength data, other factors may be compared to determine a network to select. For example, quality of service, up-time, cost, bandwidth availability, upload and/or download speed, or any other factors or network characteristics can be compared to select a network to communicate over or a route to traverse.

Example Route Determination Process

FIG. 24 illustrates a flow diagram for an example one embodiment of a route determination process 2400 in accordance with the teachings of the present disclosure. The process 2400 can be performed by any system that can provide location data and/or network signal strength data to a dynamic routing system to determine a travel route to travel between locations while maintaining a minimum or threshold level of service (e.g., a minimum signal strength) with one or more communication networks. For example, one or more operations of the process 2400 can be performed by a wireless device 1000, 1100, 1200, 1300, 2202 or components thereof (such as processor 806, 1204, RF subsystem 812, or modem 1202, 1302, etc.), a satellite 2208, and/or a dynamic routing system 1408, among other systems. As previously described, the wireless device may be a smartphone. Alternatively, or in addition, the wireless device may be any other electronic device that can communicate over a wireless network, such as a drone (e.g., a delivery drone, firefighting drone, or a camera drone), automated vehicle (e.g., self-driving car), medical device, etc. Although a number of different systems may perform some or all of the process 2400, to simplify discussion, the process 2400 will be described with respect to particular systems.

The process 2400 begins at block 2402 when, for example, the wireless device 2202 determines its current location. The wireless device 2202 may include any type of mobile or moveable device that is either self-moving, moved in response to a command by a user, or can be carried by a user. For example, as previously described, the wireless device 2202 may be a smartphone, a drone, a medical device, a self-driving car, etc.

The wireless device 2202 may determine its location using one or more signals received from a satellite 2208 (or a plurality of satellites). The satellite 2208 may be part of a geolocation satellite system, such as GPS, used to identify a location of supported devices that include a geolocation receiver, such as a GPS receiver. In some such cases, the wireless device 2202 may determine its location based on a received geolocation signal from a geolocation satellite (e.g., the satellite 2208.

Alternatively, or in addition, the wireless device 2202 may determine its location based on communication with one or more base stations, the dynamic routing system 1408, or other networking hardware accessible by the wireless device 2202. In some cases, the location determined at the block 2402 may be based on user input or a command received from a computing device (e.g., a trip scheduler or a logistics computer for scheduling deliveries, etc.). For example, a user or a computing device may provide the wireless device 2202 with a location (which may or may not be a current location) that represents a starting location or a waypoint for performance of the process 2400. For instance, a computing system may provide the wireless device 2202 with a series of locations representing starting locations for one or more trips (e.g., locations to obtain items for delivery, or locations that may represent delivery locations that in turn may serve as starting locations for a next scheduled delivery). In some cases, a user may provide an address or location to the wireless device 2202 to serve as the current location or a starting location, which may or may not be a current location.

At block 2404, the wireless device 2202 determines a target location. The target location may be determined based on user input, interaction by a user with a user interface element of the wireless device 2202 or another device in communication with the wireless device 2202, or receipt of a command (e.g., via an antenna of the wireless device 2202) from a computing device (e.g., a delivery scheduling computing system configured to determine delivery schedules for delivery drones). For example, the target location(s) may be one or more delivery locations for packages from a delivery drone equipped with the wireless device 2202. As another example, the target location may be a location to which a user is scheduled to travel or to which the user is predicted to travel based, for example, on past travel history. In some cases, the target location may be determined based on a trajectory of travel by the wireless device 2202, or a user or device that is carrying the wireless device 2202.

At block 2406, the wireless device 2202 determines a signal strength (e.g., wireless signal strength) for each of one or more communication networks that are accessible by the wireless device 2202. The wireless device 2202 may use any of the embodiments disclosed herein to determine the signal strength for a communication network accessible by the wireless device 2202. For example, the wireless device 2202 may determine the signal strength of a connection to a communication network based at least in part on a signal received at a diversity antenna (e.g., a diversity antenna 814 or 1116) of the wireless device 2202. The communication network may be any type of data or voice network with which the wireless device 2202 may be configured to communicate.

At block 2408, the wireless device 2202 provides the current location, the target location, and the one or more signal strength measurements determined at the block 2406 for the one or more communication networks that are accessible by the wireless device 2202 to a dynamic routing system 1408. Alternatively, or in addition, the location information (current and/or target location) and signal strength information may be provided to a base station or other networking hardware. The base station, or other network hardware, may provide the location information and signal strength information to the dynamic routing system 1408. In some cases, the location information and/or signal strength information is provided to the satellite 2208. The information may be provided to the satellite by the base station, or other networking hardware with sufficient signal strength to upload to a satellite, or by the dynamic routing system 1408. In some cases, the dynamic routing system 1408 is part of the satellite or of a satellite communication network. In some cases, the current and/or target location information is determined by the satellite 2208 or other communication hardware. In some such cases, the wireless device 2202 may provide the signal strength measurements as part of the block 2408, but the location information may be provided by another system or omitted.

At block 2410, the wireless device 2202 receives an identification of a route between the current location and the target location from the dynamic routing system 1408. The route may be determined using any process for determining a route between two points accounting for the signal strength of one or more communication networks. In some cases, the route may be determined using the process 2300.

The dynamic routing system 1408 may include or may have access to an electronic storage system that can store received signal strength data from the wireless device 2202 and/or from other wireless devices. This stored signal strength data may be used to facilitate determining a route with an accessible communication network that satisfies particular conditions or criteria (e.g., minimum or average signal strength). Further, the electronic storage system may store navigation data or mapping data that facilitates selecting a route. Moreover, the navigation data may differ for different types of wireless devices. For instance, different navigation data may be available for a drone that can fly compared to a drone that cannot fly, or for a user who might walk and/or drive while carrying the wireless device.

The identification of the route may include directions for traversing the route and/or one or more waypoints between the current location and the target location. Further, the identification of the route may include an identification of a communication network with which the wireless device 2202 should communicate along the route. In some cases, the identification of the communication network includes an identification of a communication network for segments or portions of the route. In some cases, different communication networks may be identified for different segments or portions of the route. This may occur because at different portions of the route the communication network that provides the best connection or the best signal strength may differ. In some cases, the wireless device 2202 may automatically connect to the communication network identified for the portion of the route when the wireless device 2202 is along the portion of the route or within a particular distance of the portion of the route. In other cases, the identified communication network may be output to a user and the user may determine whether to connect to the identified communication network.

The route identified at the block 2410 may include a route between the current location and the target location that enables the wireless device 2202 to maintain a connection to the communication network with a minimum signal strength. Further, the identification of the communication networks with which to connect along the route may include communication networks with which the wireless device 2202 is able maintain a connection with a minimum signal strength.

In some cases, the identification of the route may depend on characteristics of the wireless device. For example, a different route may be selected or determined for a wireless device included in a flying drone versus a wireless device included in a street-bound vehicle or a vehicle that can use walking paths.

In some cases, the wireless device 2202 may automatically travel the selected route without input from a user. In other cases, the user may initiate the start of travel, but the wireless device 2202 may automatically follow the selected route without further input from the users. In yet other cases, the selected route may be presented to a user on a display, and the user may choose to follow the route, request a new route, or ignore the selected route. In cases where the user requests a new route, the user may modify weightings used to determine the route (e.g., weights used within graph). The user may directly modify the weights applied to the graph data structure. Alternatively, the user may identify a reason for selecting the new route, and the dynamic routing system 1408 may automatically modify the weights used in the graph based on the identified reason (e.g., request to avoid tolls or freeways, or a desire for a more scenic route, etc.).

In some implementations, the process 2400 is performed once for a particular trip or wireless device and the wireless device may travel along the identified route and/or connect to the identified communication network. However, in other cases, the process 2400 or certain operations of the process 2400, may be performed multiple time, periodically, continuously, in response to a request, a detected change in location that is not part of the identified route, or for any other reason. For example, the wireless device 2202 may continue to provide signal strength data to the dynamic routing system 1408 as the wireless device 2202 travels the selected route. Based on the updated signal strength data, the dynamic routing system 1408 may modify the selected route to maintain the desired threshold signal strength as the wireless device 2202 travels between the current location (or updated current location as the wireless device 2202 may have moved in this example) and the target location. In some cases, the dynamic routing system 1408 may modify the route based on signal strength data obtained from other wireless devices, changes in travel itinerary for the wireless device 2202, a change in traffic data along the route, or for any other criteria that may cause a change in route.

Although the processes 2300 and 2400 are described as identifying routes and communication networks based on signal strength, it should be understood that alternative or additional communication characteristics or factors may be used to identify a route and/or communication network. For example, the determination of route and/or communication network may be based on connection stability, bandwidth, cost, jitter, or quality of service, among other factors. Further, the selection of route and/or communication network may be based at least in part on non-communication network factors. For example, distance, length of time, traffic, car accidents, speed of travel, geopolitical borders, trespassing restrictions, no-fly zones, and other factors may affect the selection of routes and communication networks for the wireless device 2202. For instance, although a particular route may provide for maintaining an optimal communication connection with a particular communication network, if the route crosses private property, or adds more than a particular amount of time to a route, the route may not be selected. In some cases, each characteristic used to identify a route may be weighted. For instance, trespassing restrictions and no-fly zones may be weighted more so than speed of travel or maximum signal strength. Thus, routes that provide maximum signal strength that violate trespassing restrictions may be omitted. As a non-binary example, traffic may be weighted higher than signal strength, and thus, a route with a high degree of traffic may be less likely to be selected than a route with a low degree of traffic. However, a route with a higher degree of traffic may not automatically be omitted if the signal strength along the route is significantly higher than other routes.

As previously indicated, at least certain operations of the process 2400 may be performed by other systems. For example, the operations associated with the blocks 2402 and 2404 may be determined by a satellite 2208 and/or a dynamic routing system 1408. In some cases, the satellite 2208 may be part of a network of geolocation satellites (e.g., global positioning system (GPS) satellites) that can determine a location of the wireless device 2202. Further, the dynamic routing system 1408 may be part of or may communicate with a base station that can determine the current location of the wireless device 2202 based on the base station's communicate with the wireless device 2202.

Example Embedded SIM Communication Environment

In certain embodiments, a wireless device may support the use of a digital SIM or an eSIM that can provide or store identification information to enable a device to connect to a carrier network without the use of a physical SIM. Many such wireless devices are configured to communicate with a single carrier network. However, a carrier network may not provide consistent service throughout a service area. Moreover, even within a particular location, quality of service may vary due, for example, to weather, number of active connections, type of connection, position of the wireless device, etc. In some cases, a carrier network of a communications carrier may provide improved performance, or a better QoS, than a carrier network of another communications carrier. However, wireless devices are generally configured to communicate with only a single carrier network.

The systems and methods described herein support communication with multiple carrier networks. Further, embodiments disclosed herein enable a wireless device to switch carrier networks without losing a communication connection and/or without interrupting a user's access or use of the wireless device. In other words, in certain embodiments, a user may continue to access a remote system or maintain a call while the wireless device changes carrier networks. In some examples, the wireless device may include multiple eSIMs. In some such cases, one eSIM is designated the primary carrier and a second eSIM is designated the standby carrier. The wireless device, in this case, can compare network characteristics associated with each of a set of carrier networks to identify a carrier network that satisfies a set of network metrics or that is superior among the set of carrier networks. In some cases, the wireless device may determine that it is already connected to a preferred carrier network (e.g., a carrier network that has the highest signal strength). In cases where this preferred carrier is the active carrier, no further action may be taken. However, in cases where the preferred carrier is identified as the standby carrier, the wireless device may switch its active connection to the standby carrier. Advantageously, because the wireless device maintains a connection to the standby carrier while communicating with the primary carrier, the wireless device may switch active carriers without a loss of service and/or without interrupting a user's use of the wireless device.

FIG. 25 illustrates an example communication environment 2500 for communicating using an embedded SIM wireless device 2502. The wireless device 2502 may attempt to communicate with another device via one or more networks, for example, using network 2512, 2514, and/or any combination of networks between network 2512 and network 2514. Although only two networks 2512, 2514 are depicted, it should be understood that the present disclosure is not limited as such and that the communication environment 2500 may include more or fewer cellular networks and more or fewer target systems.

The wireless device 2502 may be substituted with any of the embodiments of the wireless devices described herein. For example, the wireless device 2502 may be substituted with the wireless device 1000, 1100, 1200, 1300, or 2702. The wireless device 2502, and any of the previously described wireless devices, may include any type of device that can communicate over a cellular network. For example, the wireless device 2502 may be or may include a smartphone, a tablet, a laptop, a wearable device (e.g., a smartwatch or smart glasses), a drone (e.g., a delivery drone, a mapping drone, a camera drone, a firefighting drone, etc.), an unmanned aerial vehicle, a delivery device, an automated vehicle, a medical device, or any other device that may include a SIM card and/or may communicate with a cellular network. In some cases, the wireless device 2502, or any of the previously described wireless devices (e.g., wireless devices 1000, 1100, 1200, 1300, or 2702) can use authentication methods other than SIM cards to communicate with a cellular network. As illustrated, the wireless device 2502 includes a processor 2504 and memory 2506. The processor 2504 being able to execute computer-executable instructions stored in the memory 2506. Further, the wireless device 2502 may be capable of communicating with any type of communications network that uses electromagnetic communication. For example, the wireless device 2502 may support cellular communication, Wi-Fi® communication, satellite communication, Bluetooth®, or any other type of wireless communication.

Using embodiments of the embedded SIM wireless devices disclosed herein, it is possible to communicate over multiple cellular networks, which may be maintained by different entities or providers, and which may implement different technologies or use different frequency bandwidths. A different entity may own or operate each of the cellular networks 2512, 2514. For example, the cellular network 2512 may be Verizon's network and the cellular network 2514 may be T-Mobile's network. Further, each of the cellular networks 2512, 2514 may be configured to operate with different frequency bands, different communication standards or protocols, or using different types of hardware. Thus, it will often be the case that a prior art wireless device configured to communicate with cellular network 2512 will be unable to communicate with cellular network 2514, or vice-versa. However, the wireless device 2502, and other wireless devices described herein, may communicate with either or both cellular networks 2512, 2514. Further, the cellular networks 2512, 2514 may include one or more of the embodiments previously described with respect to the communication networks 106. In some cases, the cellular networks 2512, 2514 may be data networks configured to transmit data packets. These data packets may include any type of data. Further the data packets may include or encapsulate voice data. In some cases, the cellular networks 2512, 2514 may transmit both data packets and voice packets. The cellular networks 2512, 2514 may be configured to use different communication technology, protocols, or frequency bands. For example, the cellular networks 2512, 2514 may be 2G, 3G, 4G, 4G LTE, 5G, and/or 6G cellular networks that can communicate with the wireless device 1300 using various corresponding frequency bands or encodings.

As stated above, the wireless device 2502 may communicate with a target system (such as a wireless device or host server, as disclosed herein) via one, or in some cases both, of the cellular networks 2512, 2514 using at least one carrier. The wireless device 2502 may determine whether to communicate with the target system based on one or more network characteristics of the various carrier choices for the cellular networks 2512, 2514. For example, the wireless device 2502 may determine the signal strength to communicate with the target system of a connection for each of various carriers and select one of the carriers with which to establish a connection with the networks 2512, 2514.

To enable communication with the various carriers, the wireless device 2502 may include the SIMS 2508, 2510 each including a register or record of carrier profiles. In some examples, the wireless device 2502 may include a digital structure to manage and organize the various carrier profiles. For example, the digital structure may include a status of a carrier choice, a carrier identifier, and network characteristics of the each of the carriers. The network characteristics may include any type of characteristic of the network that may be measured or otherwise determined. For example, the network characteristics can include signal type, signal strength, whether the network connection supports voice, data, or both, whether the determined network characteristics are real time or live, or historical, or any other type of network characteristic. The signal strength can include a measure of signal strength between the wireless device 2502 and a communication network. This measurement may be performed by the wireless device 2502 or a gateway or other network device maintained by the communication network (e.g., cellular network 2512). It should be understood that signal strength may fluctuate over time due to many factors, such as location, load, weather, etc. Thus, in some cases, the signal strength network characteristic can be normalized or assigned a value based on a qualitative measurement or a range of values of the signal strength. For example, the signal strength can be normalized between a value of 0 to 4 with 4 being the highest signal strength (e.g., above-80 dBm) and 0 being the lowest signal strength (e.g., below-120 dBm). It should be understood that other signal strength characterizations or classifications as possible.

In some cases, there are more network characteristics available for each of the carriers. For example, the network characteristics may include signal strength, signal type, data availability, bandwidth, historical signal strength data, quality of service, packet drop rate, network security, and network reliability. In this way, the information of the digital structure may allow the wireless device 2502 to change from an active carrier profile to another carrier profile stored in the register of the SIMS (may also be known as an eSIM programming process). Additionally, the register may include information, such as network credentials, configuration settings, activation states, security elements, among other carrier information relevant to the register as disclosed herein. In some cases, the wireless device 2502 may maintain multiple SIMs enabling communication over both the cellular networks 2512, 2514 at the same time, or substantially the same time, across one or more carrier. For example, the wireless device 2502 may communicate with a first target system and a second target system using a primary carrier for the cellular network 2512 and 2514.

In some cases, the wireless device 2502 may perform a service to establish communication with one or more networks. In some examples, the wireless device 2502 may communicate with communication hardware as disclosed herein (for example, gateway, router, base station, dynamic routing system, etc.), which may additionally (or in substitution) provide a service to connect the wireless device 2502 with one or more networks. In some cases, the service provided by the wireless device 2502 (and/or communication hardware) may be aware of and/or monitoring the service status of a plurality of networks (for example, the networks 2512, 2514) for any given location/situation. The service provided by the wireless device 2502 (and/or communication hardware) may provide a hierarchical organization of carriers with which the wireless device 2502 may communicate. For example, the wireless device 2502 may communicate using a primary carrier and a standby carrier. The SIMS of the wireless device 2502 (for example, SIMs 2508, 2510) may provide an ability for the wireless device 2502 to communicate over a particular carrier, for example, an active carrier choice of the primary (or standby) carrier. In some cases, the wireless device 2502 and/or the communication hardware may perform comparisons between the various carriers, but as for illustrative purposes, the disclosure herein describes the process from the perspective of the wireless device 2502. In some examples, the register stored by the wireless device 2502 may indicate available carrier choices as depicted in the network table 2516, as recreated below in Table 1.

TABLE 1

| Primary Carrier SIM 1 | | | Standby Carrier SIM 2 | | |
|---|---|---|---|---|---|
| Active Carrier Choice | A | 4G, 4, Y, L* | Active Carrier Choice | M | 4G, 2, Y, L |
| Available Carrier Choice | B | n/a, 0, N, H | Available Carrier Choice | N | 4G, 4, Y, H |
| Available Carrier Choice | C | 3G, 4, Y, H | Available Carrier Choice | O | 5G, 1, N, H |

Where Table 1 includes a primary carrier and a standby carrier, each with three columns. The first column identifies a status of a carrier choice, the second column specifies a carrier identifier, and the third column provides network characteristics of the carrier. The network characteristics may include signal type, signal strength (from 0 to 4), data connected (Y/N), live or historical. In some cases, there are more network characteristics available for each of the carriers. For example, the network characteristics may include signal strength, signal type, data availability, bandwidth, historical signal strength data, quality of service, packet drop rate, network security, and network reliability.

In some examples, the wireless device 2502 may compare the network characteristics of the carriers and select which of the carriers is an active carrier choice. The active carrier choice may be a default carrier used to transmit data. In this way, the wireless device 2502 may avoid restrictions of using SIM cards having a single active carrier choice with no or limited ability to store information about any other available carrier choices. The wireless device 2502 may utilize eSIMs (for example, SIMs 2508, 2510) that have multiple carrier choices programmed. In this way, the wireless device 2502 may use the individual historical and live metrics on each eSIM and determine whether to change the active carrier choice for the primary and standby carriers. For example, according to Table 1, the wireless device 2502 may compare carrier choices A, B, C against each other and carrier choices M, N, O against each other. The following Table 2 and Table 3 illustrate such comparisons.

TABLE 2

| Comparison within SIM 1 SIM 1 | | |
|---|---|---|
| Active Carrier Choice | A | 4G, 4, Y, L |
| Available Carrier Choice | B | n/a, 0, N, H |
| Available Carrier Choice | C | 3G, 4, Y, H |

In this non-limiting example case, carrier choice B has no signal or a signal strength below a minimum threshold, thus the wireless device 2502 may determine to not select carrier choice B [n/a, 0, N, H]. The wireless device 2502 may compare carrier choice A to carrier choice C. Based on the comparison, carrier choice A may be selected over carrier choice C as the 4G communication network type of carrier A may be given priority over the 3G communication network type of carrier C. As carrier choice A is the current active carrier identified on SIM 1 2508 utilized by the wireless device 2502, no action is taken.

TABLE 3

| Comparison within SIM 2 SIM 2 | | |
|---|---|---|
| Active Carrier Choice | M | 4G, 2, Y, L |
| Available Carrier Choice | N | 4G, 4, Y, H |
| Available Carrier Choice | O | 5G, 1, N, H |

The wireless device 2502 may compare the standby carrier choices associated with SIM 2. Based on the comparison, the wireless device 2502 determine to not select carrier choice O due to carrier O not having data transmission capabilities [5G, 1, N, H]. The wireless device 2502 may compare carrier choice M against carrier choice N. Based on the comparison, it may be determined that the signal strength (e.g., '4') of carrier choice N is higher than the signal strength (e.g., '2') of carrier choice M. Accordingly, the wireless device 2502 may initiate an eSIM programming process to change the active carrier choice to carrier choice N. The eSIM programming process may include any process to modify the data stored in the eSIM. For example, the eSIM programming process may include updating data stored in the memory associated with the eSIM. Updating the data of the eSIM may include the wireless device 2502 updating the network table 2516. For example, the network table 2516 may be updated as illustrated in Table 4.

TABLE 4

| Primary Carrier SIM 1 | | | Standby Carrier SIM 2 | | |
|---|---|---|---|---|---|
| Active Carrier Choice | A | 4G, 4, Y, L | Available Carrier Choice | M | 4G, 2, Y, H |
| Available Carrier Choice | B | n/a, 0, N, H | Active Carrier Choice | N | 4G, 4, Y, L |
| Available Carrier Choice | C | 3G, 4, Y, H | Available Carrier Choice | O | 5G, 1, N, H |

Over time, such as when the wireless device 2502 changes positions or one or more network characteristics changes, the determination of a particular carrier or cellular network to perform a particular task, or over which to maintain or establish a connection with a target system, may change. In some examples, the wireless device 2502 may move from a first location to a second location. If the active selected carrier changes, the wireless device 2502 may establish a new connection to one or more networks maintained by the selected carrier, or may use an existing connection of the selected carrier to perform a task. This task may be a new task or a task-in-progress (e.g., an existing call, data stream, or download, etc.). To switch networks while performing a task, or task-in-progress, associated, for example, with the target system from one carrier (e.g., carrier choice A) to another carrier (e.g., carrier choice B), the wireless device 2502 may establish a new connection with the new carrier (e.g., carrier choice B). For example, suppose that a wireless device 2502 is streaming video data over a first network maintained by a first carrier. Further, suppose that the wireless device 2502 determines that a second network maintained by a second carrier has higher QoS (e.g., less dropped packets), the wireless device 2502 may establish a connection with the second network and after establishing the connection, may switch from streaming the video data over the first network to streaming the video data over the second network The connection with the original carrier may then be dropped, or may be maintained, but may no longer be used to perform the task associated with the target system. The determination of whether to switch carriers to perform a task at a particular point in time may be determined, for example, based on the current signal strength of connections with the cellular networks 2512, 2514, bandwidth available, connection stability, or any other characteristic of the connections to the cellular networks 2512, 2514. Further, in some implementations, the wireless device 2502 may change the carriers used to perform a task when a change in connection characteristics exceeds a threshold or when the connection characteristics associated with a particular cellular network exceeds another cellular network by more than a threshold amount or percentage. Advantageously, in certain implementations, by requiring a threshold change or difference between cellular network characteristics, bouncing between cellular networks or cellular network connections may be reduced or prevented. In some cases, the network table 2516 may be updated as illustrated in Table 5 to reflect changes in network characteristics over time as, for example, the wireless device moves or is moved.

TABLE 5

| Primary Carrier SIM 1 | | | Standby Carrier SIM 2 | | |
|---|---|---|---|---|---|
| Active Carrier Choice | A | 4G, 1, Y, L | Available Carrier Choice | M | 4G, 3, Y, L |
| Available Carrier Choice | B | 3G, 1, N, H | Active Carrier Choice | N | 4G, 4, Y, L |
| Available Carrier Choice | C | 4G, 2, Y, H | Available Carrier Choice | O | 5G, 3, N, H |

As the user of the wireless device 2502 moves (e.g., drives down the road), the network characteristics associated with each of the carrier networks may change. As the network characteristics change, the wireless device may modify its network selection. For example, the wireless device 2502 may switch from the network of carrier A to the network of carrier C. This update in the carrier designations based on the updated network characteristics is reflected in Table 6 below.

TABLE 6

| Comparison within SIM 1 SIM 1 | | |
|---|---|---|
| Active Carrier Choice | A | 4G, 1, Y, L |
| Available Carrier Choice | B | 3G, 1, N, H |
| Available Carrier Choice | C | 4G, 2, Y, H |

For the primary carrier, the wireless device 2502, in this case, may determine not to select carrier choice B due to carrier choices A and C having a signal type (4G) given priority over the signal type of carrier choice B (3G). The wireless device 2502 may compare network characteristics of carrier choice A to network characteristics of carrier choice C. Based on the comparison, it may be determined that the signal strength (e.g., '2') of carrier choice C is higher than the signal strength (e.g., '1') of carrier choice A. The wireless device 2502 may then initiate an eSIM programming process, as described herein, to update the active carrier to carrier choice C.

TABLE 7

| Comparison within SIM 2 SIM 2 | | |
|---|---|---|
| Available Carrier Choice | M | 4G, 3, Y, H |
| Active Carrier Choice | N | 4G, 4, Y, L |
| Available Carrier Choice | O | 5G, 3, N, H |

For the standby carrier, the wireless device 2502 may compare carrier choice M to carrier choice N and carrier choice O. In this example, the wireless device 2502 may determine the signal type (5G) of carrier choice O is given priority over the 4G communication network type of carriers M and N. Based on the determination, the wireless device 2502 may initiate an eSIM programming process, as described herein, to update the active carrier of the standby connection to carrier choice O. Updating the data of the eSIM may include updating the network table 2516 as reflected in Table 8.

TABLE 8

| Primary Carrier SIM 1 | | | Standby Carrier SIM 2 | | |
|---|---|---|---|---|---|
| Available Carrier Choice | A | 4G, 1, Y, H | Available Carrier Choice | M | 4G, 3, Y, H |
| Available Carrier Choice | B | 3G, 1, N, H | Available Carrier Choice | N | 4G, 4, Y, H |
| Active Carrier Choice | C | 4G, 2, Y, L | Active Carrier Choice | O | 5G, 3, N, L |

In some examples, as the network characteristics change for the various carriers, the wireless device 2502 may compare network characteristics of carrier choice C to network characteristics of carrier choice O. The wireless device 2502 may compare the network characteristics of the primary carrier and the standby carrier. The wireless device 2512 may determine the signal type (5G) of carrier choice O may be given priority over the 3G and 4G communication network types of the remaining carrier choices. Based on the determination, the wireless device 2502 may select carrier choice O as the active carrier choice and update the standby carrier as the primary carrier. The wireless device 2502 may initiate an eSIM programming process, as described herein, to update the primary carrier to SIM 2. The transition between cellular carriers may be performed without service being interrupted. Accordingly, updating the data of the eSIM may include wireless device 2502 updating the network table 2516 as reflected in Table 9.

TABLE 9

| | | Standby Carrier SIM 1 | | | | Primary Carrier SIM 2 | |
|---|---|---|---|---|---|---|---|
| Available Carrier Choice | A | 4G, 1, Y, H | | Available Carrier Choice | M | 4G, 3, Y, H | |
| Available Carrier Choice | B | 3G, 1, N, H | | Available Carrier Choice | N | 4G, 4, Y, H | |
| Active Carrier Choice | C | 4G, 2 , Y, L | | Active Carrier Choice | O | 5G, 3, N, L | |

As previously stated, the wireless device 2502 may determine one or more carriers with which to communicate over the cellular networks 2512, 2514. In other cases, communication hardware may determine the carrier (or carriers) the wireless device 2502 should use to communicate with the target system. The communication hardware may select the carrier based at least in part on the comparison processes as described herein. Alternatively, or in addition, the communication hardware may select the carrier based on other connection characteristics or service level agreements. For example, the communication hardware may select carriers for the cellular networks 2512, 2514 based at least in part on one or more of available bandwidth, stability of connection between the wireless device and each cellular networks, priority of traffic or data packets, type of data packet (e.g., voice data packets, media data packets, email, and the like), destination or source of the data sent or received, bandwidth costs associated with the connection, monetary costs associated with the connection, user preferences (e.g., a user may prefer a particular network due, for example, to costs, balancing of vendor usage, brand loyalty, or idiosyncrasies, and the like).

In some examples, the wireless device 2502 may receive the preferable or selected carrier choice with which to communicate with the target system. In some cases, the wireless device 2502 may make the SIM (e.g., SIMs 2508 and/or 2510) associated with the primary or standby carrier active for performing a desired task (e.g., communicating with the target system). In some cases, additional SIMs may remain active at the wireless device 2502 to communicate using a cellular network (e.g., 2512, 2514) of the carrier to perform another task (e.g., communication with the target system). In some embodiments, the cellular networks (e.g., 2512, 2514) may be ranked, for example, based on signal strength, bandwidth, stability, and the like, or based on a combination of characteristics. The wireless device 2502 may select a higher ranked cellular network (and corresponding carrier choice) to perform a task with higher priority and selection of a corresponding carrier. For example, a phone call may be considered higher priority than other tasks, such as media download. In this example, if the signal strength associated with cellular network 2512 exceeds the signal strength associated with cellular network 2514, the phone call may be processed using the cellular network 2512 and the media download, or other task, may be performed using the same network, or may be performed using the cellular network 2514. The determination of whether to divide tasks among carriers or to use the same carrier may depend on the specific task and/or the difference in characteristics between the cellular networks.

Alternatively, or in addition, the higher ranked cellular network (and corresponding carrier) may be used to perform a task that requires greater bandwidth or stability, but may or may not be a higher priority task. For example, a voice call usually requires less bandwidth than many other tasks, such as downloading a HD movie. Thus, for example, although the cellular network 2512 may provide a better connection or be associated with higher signal strength, the voice call may be assigned to the cellular network 2514 and the media download to the cellular network 2512. In some cases, whether or not a task is assigned to a particular cellular network may further depend on whether the connection or signal strength is sufficient to provide a minimal quality of service for the task. For example, continuing the previous example, although the voice call may require less bandwidth than the media download task, if the connection to the cellular network 2514 is not strong enough to maintain a clear voice call, the voice call may be allocated, with or without the media download task, to the cellular network 2512.

In certain embodiments, the wireless device 2502 may determine whether a data packet belongs to a particular task for transmission over a particular carrier based on the source or application of the data packet. For example, data packets related to a voice call may be identified based on the source of the data packet being from a dialer application and/or based on the dialer application applying a label or tag to the data packet that identifies the data packet as being for a call (e.g., a voice over data or voice over LTE packet).

Each of the previously described embodiments, or aspects, may be combined or implemented separately. For example, the wireless device 2502 may implement aspects of the wireless device 1000, 1100, 1200, 1300, 2702, or components thereof (such as processor 806, 1204, RF subsystem 812, or modem 1202, 1302, etc.) enabling the signal paths associated with the processor 806 to support two SIMs and two corresponding cellular networks while the signal paths associated with the modem 1202 or 1302 may simultaneously support one or two SIMs and the one or two corresponding cellular networks. Accordingly, the wireless device 2502 may support dual active dual data communication across at least two cellular networks.

Example eSIM Network Selection Process

FIG. 26 illustrates a flow diagram for an example one embodiment of an eSIM network selection process 2600 in accordance with the teachings of the present disclosure. For example, one or more operations of the process 2600 can be performed by a wireless device 1000, 1100, 1200, 1300, 2502, 2702, or components thereof (such as processor 806, 1204, RF subsystem 812, or modem 1202, 1302, etc.), a satellite 2208, and/or a dynamic routing system 1408, among other systems. Although a number of different systems may perform some or all of the process 2600, to simplify discussion, the process 2600 will be described with respect to particular systems.

The process begins at block 2602 when, for example, the wireless device 2502 maintains a first communication connection with a first wide area network associated with a first eSIM. The wireless device 2502 may include any type of mobile or moveable device that is either self-moving, moved in response to a command by a user, or carried by a user. For example, as previously described, the wireless device 2502 may be a smartphone, a drone, a medical device, a self-driving car, etc.

In some examples, the first communication connection with the first wide area network may be a connection between the wireless device 2502 and an active carrier choice of a primary carrier as disclosed herein (for example, as disclosed in FIG. 25). In some cases, the wireless device 2502 maintains the first communication connection at a first point in time and at a first location. The wireless device 2502 may maintain the first communication connection by continuing to transmit data packets using the first wide area network. In some cases, the wireless device 2502 may maintain the first communication connection by waiting to switch connection from the wide area network to another wide area network.

In some cases, network metadata may be associated with the first wide area network and the first eSIM. The network metadata may include at least one of: a measurement of signal strength of a communication connection, a signal type of a signal used to communicate over the communication connection (for example, a signal that satisfies the 4G LTE communication standard, the 5G communication standard, the 6G communication standard, etc.), an availability of data service over the communication connection, a bandwidth associated with the communication connection, whether the measured signal strength is current or historical, a quality of service associated with the communication connection, a packet drop rate associated with the communication connection, a network security metric associated with the wide area network, a network reliability metric associated with the wide area network, and/or any such parameter corresponding with network assessment. In some cases, the network metadata may be stored in the wireless device 2502 and/or at a remotely accessible device.

At block 2604, the wireless device 2502 accesses network metadata associated with a second wide area network and a second eSIM. In some examples, the wireless device 2502 may access the network metadata associated with the second wide area network and the second eSIM at the first point in time and at the first location. The wireless device 2502 may access the network metadata associated with the second wide area network and the second eSIM by retrieving the network metadata. The wireless device 2502 may access the network metadata associated with the second wide area network and the second eSIM by retrieving the network metadata from at least one SIM (for example, an eSIM). In some cases, the wireless device 2502 may access the network metadata associated with the second wide area network and the second eSIM by retrieving the network metadata from a remote device. For example, the wireless device 2502 may communicate with communication hardware as described herein to obtain the network metadata.

At block 2606, the wireless device 2502 accesses network metadata associated with a third wide area network and a second eSIM. In some examples, the wireless device 2502 may access the network metadata associated with the third wide area network and the second eSIM at the first point in time and at the first location. The wireless device 2502 may access the network metadata associated with the third wide area network and the second eSIM by retrieving the network metadata locally. For example, the wireless device 2502 may access the network metadata by retrieving the network metadata from at least one SIM (for example, an eSIM). In some cases, the wireless device 2502 may access the network metadata associated with the third wide area network and the second eSIM by retrieving the network metadata from a remote device. For example, the wireless device 2502 may communicate with communication hardware as described herein to obtain the network metadata.

At block 2608, the wireless device 2502 selects the second wide area network based at least in part on a comparison between the second network metadata and the third network metadata. In some examples, the comparison between the second network metadata and the third network metadata may be based at least in part on signal strength, signal type, availability of data service, or historical signal strength information. In some examples, the wireless device 2502 may receive, from a gateway or the memory, a second signal strength corresponding to the second communication connection with the second wide area network. The wireless device 2502 may receive, from the gateway or the memory, a third signal strength corresponding to a third communication connection with the third wide area network. In this way, the wireless device 2502 may compare the second signal strength corresponding to the second communication connection and the third signal strength corresponding to the third communication connection. In other embodiments, the gateway may compare the signal strength between network connections. In some such embodiments, the gateway may instruct the wireless device 2502 as to which carrier networks with which to maintain a connection and/or to set as the standby carrier. The wireless device 2502 may then update the eSIMs 2508, 2510 accordingly.

In some examples, as a result of the comparison, the wireless device 2502 may select the second wide area network as the primary carrier. For example, the wireless device 2502 may determine a comparison result between the second network metadata and the first network metadata. The wireless device 2502 may then designate the second wide area network as the primary carrier based at least in part on the comparison result. The wireless device 2502 may designate the first wide area network as the standby carrier based at least in part on the comparison result. The comparison result may indicate that a second signal strength corresponding to the second communication connection with the second wide area network is greater than a first signal strength corresponding to the first communication connection with the first wide area network. In some cases, the first comparison result indicates that a second bandwidth corresponding to the second communication connection with the second wide area network is greater than a first bandwidth corresponding to the first communication connection with the first wide area network. In this way, the wireless device 2502 may update a register according to the comparison results.

At block 2610, the wireless device 2502 establishes a second communication connection with the second wide area network. The wireless device 2502 may, in some examples, maintain the second communication connection with the second wide area network at a second point in time (which may be different than the first point in time). In some examples, the wireless device 2502 may maintain the second communication connection with the second wide area network without establishing a call over the second wide area network and without transmitting a user data packet over the second wide area network until at least such time when the second wide area network is designated the primary carrier and/or until at least such time when an application or a network location associated with the second wide area network is accessed.

In some examples, the wireless device 2502 may end the first communication connection with the first wide area network based at least in part on the comparisons between the network metadata. For example, the wireless device 2502 may disconnect from the first wide area network in response to the comparison of network metadata. In this way, the wireless device 2502 may no longer transmit or receive data packets across the first wide area network. In some cases, ending the first communication connection with the first wide area network occurs after the wireless device 2502 establishes the second communication connection with the second wide area network.

Example Virtual SIM Communication Environment

FIG. 27 illustrates an example communication environment 2700 for communicating using a virtual SIM wireless device 2702. The wireless device 2702 may attempt to communicate with another device via one or more networks. Although only two networks 2710, 2712 are depicted, it should be understood that the present disclosure is not limited as such and that the communication environment 2700 may include more or fewer cellular networks and more or fewer target systems. For example, using network 2710, network 2712, and/or any combination of networks between network 2710 and network 2712.

The wireless device 2702 may be substituted with any of the embodiments of the wireless devices described herein. For example, the wireless device 2702 may be substituted with the wireless device 1000, 1100, 1200, 1300, or 2502. The wireless device 2702, and any of the previously described wireless devices, may include any type of device that can communicate over a cellular network. For example, the wireless device 2702 may be or may include a smartphone, a tablet, a laptop, a wearable device (e.g., a smartwatch or smart glasses), a drone (e.g., a delivery drone, a mapping drone, a camera drone, a firefighting drone, etc.), an unmanned aerial vehicle, a delivery device, an automated vehicle, a medical device, or any other device that may include a virtual SIM and/or may communicate with a cellular network. In some cases, the wireless device 2702, or any of the previously described wireless devices (e.g., wireless devices 1000, 1100, 1200, 1300, or 2502) can use authentication methods other than virtual SIM to communicate with a cellular network. As illustrated, the wireless device 2702 includes a processor 2704 and memory 2706. The processor 2704 being able to execute computer-executable instructions stored in the memory 2706. Further, the wireless device 2702 may be capable of communicating with any type of communications network that uses electromagnetic communication. For example, the wireless device 2702 may support cellular communication, Wi-Fi® communication, satellite communication, Bluetooth®, or any other type of wireless communication.

Using embodiments of the virtual SIM wireless devices disclosed herein, it is possible to communicate over multiple cellular networks, which may be maintained by different entities or providers, and which may implement different technologies or use different frequency bandwidths. In this way, the wireless device 2702 may operate the memory 2706 to store the vSIM 2708, and not include multiple (or any) physical SIM cards for establishing connection to one or more networks.

As previously described, a SIM card may be a physical card that is removable and may store various data that facilitates communication with a communications carrier network (e.g., a cellular network). For example, the SIM card may store a unique identifier, often referred to as an International Mobile Subscriber Identity (IMSI), which allows the mobile network to recognize and authenticate a user or wireless device. Further, the SIM card may include network authentication information that enables the wireless device to connect to a particular carrier network thereby enabling the user to make phone calls, sends texts, and/or use data services. The SIM card may also enable security features (e.g., encryption) and provide storage of certain data (e.g., contacts, text messages, network-specific information, etc.).

An eSIM, or embedded SIM, may be an embedded version of the SIM card that provides some or all of the features described with respect to the SIM or a physical SIM card. While a SIM card may be a removable physical device, the eSIM is typically not removable and may be embedded directly into the hardware of the wireless device. For example, the eSIM may be a chip that is soldered onto the motherboard of the wireless device. Although not removable, the eSIM may also be physical. In some cases, the eSIM may be remotely programmed or activated enabling the wireless device to change supported carrier networks without physically swapping the SIM card. In some cases, as described herein, the eSIM may support multiple profiles that enable the wireless device to communicate with different carrier networks based on factors described herein (e.g., signal strength, QoS, payment terms, etc.).

A vSIM, or virtual SIM, may be a digital version of a SIM card that provides some or all of the features described with respect to the SIM, or eSIM. Unlike the SIM or eSIM, the vSIM may not include a physical chip. Instead, the vSIM may store or manage the information stored in a SIM card or eSIM in the memory of the wireless device. Further, the information may be stored at a remote location, which may provide the information to the designated portion of the memory of the wireless device. Thus, the information may include the same type of information stored at the SIM or eSIM. Further, the information may include profiles associated with different carrier networks enabling the wireless device to communicate with different carrier networks. For example, when the wireless device or mobile device retrieves or receives network identifier information from a remote source (e.g., a gateway or configuration server), the mobile device can establish a connection with a communications network operated by a carrier. Further, the mobile device can store the received data in a designated area of memory, which may serve as the vSIM, alone or in conjunction with the storage at the remote system. As described, vSIMs may be stored in memory of a wireless device. The storage of the vSIM in memory of the wireless device is illustrated in FIG. 27. Implementing the vSIM 2708 in memory 2706 may provide for a decreased form factor due, for example, to the omission of the eSIM or the tray and supporting hardware for communicating with a SIM card. Additionally, the use of the vSIM 2708 enables support for adjustable profiles, which may provide increased flexibility in modifying support for different carrier networks for the wireless device 2702.

In some examples, a different entity (for example, via various cellular carriers) may own or operate each of the cellular networks 2710, 2712. For example, the cellular network 2710 may be Verizon's network and the cellular network 2712 may be T-Mobile's network. Further, each of the cellular networks 2710, 2712 may be configured to operate with different frequency bands, different communication standards or protocols, or using different types of hardware. Thus, it will often be the case that a prior art wireless device configured to communicate with cellular network 2710 will be unable to communicate with cellular network 2712, or vice-versa. However, the wireless device 2702, and other wireless devices described herein, may communicate with either or both cellular networks 2710, 2712. Further, the cellular networks 2710, 2712 may include one or more of the embodiments previously described with respect to the communication networks 106. In some cases, the cellular networks 2710, 2712 may be data networks configured to transmit data packets. These data packets may include any type of data. Further the data packets may include or encapsulate voice data. In some cases, the cellular networks 2710, 2712 may transmit both data packets and voice packets. The cellular networks 2710, 2712 may be configured to use different communication technology, protocols, or frequency bands. For example, the cellular networks 2710, 2712 may be 2G, 3G, 4G, 4G LTE, 5G, and/or 6G cellular networks that can communicate with the wireless device 1300 using various corresponding frequency bands or encodings.

As stated herein, the wireless device 2702 may communicate with a target system (such as a wireless device or host server, as disclosed herein) via one, or in some cases both, of the cellular networks 2710, 2712 using at least one carrier. The wireless device 2702 may determine whether to communicate with the target system based on one or more network characteristics of the various carrier choices for the cellular networks 2710, 2712. For example, the wireless device 2702 may determine the signal strength to communicate with the target system of a connection for each of various carriers and select one of the carriers with which to establish a connection with the networks 2710, 2712.

To enable communication with the various carriers, the wireless device 2702 may include the vSIM 2708, which may store a register or record of carrier profiles, as disclosed herein. In some cases, the wireless device 2702 may maintain multiple vSIM profiles enabling communication over the cellular networks 2512, 2514 at the same time, or substantially the same time, across one or more carrier (primary or standby carriers). For example, the wireless device 2502 may communicate with a first target system and a second target system using a primary carrier for the cellular network 2512 and 2514.

In some cases, the wireless device 2702 may perform a service to establish communication with one or more networks, as disclosed herein. The vSIM 2708 may provide an ability for the wireless device 2702 to communicate over a particular carrier, for example, an active carrier choice of the primary (or standby) carrier. In some examples, the register stored by the wireless device 2702 may indicate available carrier choices as depicted in the network table 2714, as recreated in the Tables herein (for example, as disclosed in FIG. 25). The network table 2714 may include the same information regarding the network characteristics, but will describe vSIM profile 1 and vSIM profile 2, rather than SIM 1 and SIM 2, respectively.

The wireless device 2702 may adjust carrier priorities as disclosed herein. Adjusting the data of the vSIM may include the wireless device 2702 updating the network table (such as network table 2714).

The wireless device 2702 may compare network characteristics of the various carriers of each of the vSIM profiles and determine which of the carriers is to be the active carrier choice. In some cases, the wireless device 2702 may compare network characteristics of various carriers while maintaining data activities. The wireless device 2702 may maintain the data activities by partitioning data packets to achieve a desired throughput when comparing the various carriers. Partitioning the data packets may provide a threshold throughput to ensure network connectivity maintains a quality of service (QoS) level. In some examples, the wireless device 2702 may maintain the data activities when the wireless device 2702 is connected to non-cellular network (such as Wi-Fi®). When the wireless device 2702 is connected to the non-cellular network, comparing (and eventually changing) carriers is achievable if the wireless device 2702 determines dropping connection from the carrier and reconnecting to the carrier maintains a quality of service to maintain a user session. For example, the wireless device 2702 may determine the time to compare one or more carrier profiles may impact the quality of service for the user session. In this way, the wireless device 2702 may compare some of the various carriers during a time duration when the wireless device 2702 determines the time duration does not impact the quality of service for the user session.

In some examples, the wireless device 2702 may include a SIM card. When the wireless device 2702 includes a SIM card, the wireless device 2702 may establish a connection to a network of a first carrier according to the SIM card. The wireless device 2702 may determine a second carrier identified by a vSIM may provide increased service quality greater than the first carrier. In this way, the wireless device 2702 may initiate a change in carriers to establish a connection to the second carrier. The wireless device 2702 may determine data use of the wireless device 2702, for example, whether the wireless device 2702 is receiving data from the first carrier. If the wireless device 2702 is receiving data from the first carrier, the wireless device 2702 may identify a position (such as time, data packet identifier, etc.) in a data stream of the data being received to switch to the second carrier. For example, the wireless device 2702 may instruct the first carrier to cease transmitting the data at a particular position in the data stream and instruct the second carrier to begin transmitting the data at (or before) the particular position in the data stream.

In some examples, the wireless device 2702 may communicate with communication hardware to establish a connection with a network. Based on the communication, the wireless device 2702 may receive a selected carrier choice with which to communicate. In some cases, the wireless device 2702 may make the vSIM profile associated with the primary or standby carrier active for performing a desired task (e.g., communicating with the target system). In some cases, additional SIMs may remain active at the wireless device 2702 to communicate using a cellular network (e.g., 2710, 2712) of the carrier to perform another task (e.g., communication with the target system). In some embodiments, the cellular networks (e.g., 2710, 2712) may be ranked, for example, based on signal strength, bandwidth, stability, and the like, or based on a combination of characteristics, as disclosed herein (for example, as disclosed in FIG. 25 with respect to networks 2512, 2514).

Each of the previously described embodiments, or aspects, may be combined or implemented separately. For example, the wireless device 2702 may implement aspects of the wireless device 1000, 1100, 1200, 1300, 2502, or components thereof (such as processor 806, 1204, RF subsystem 812, or modem 1202, 1302, etc.) enabling the signal paths associated with the processor 806 to support two SIMs and two corresponding cellular networks while the signal paths associated with the modem 1202 or 1302 may simultaneously support one or two SIMs and the one or two corresponding cellular networks. Accordingly, the wireless device 2702 may support dual active dual data communication across at least two cellular networks.

Example vSIM Network Selection Process

FIG. 28 illustrates a flow diagram for an example one embodiment of a vSIM network selection process 2800 in accordance with the teachings of the present disclosure. For example, one or more operations of the process 2800 can be performed by a wireless device 1000, 1100, 1200, 1300, 2502, 2702, or components thereof (such as processor 806, 1204, RF subsystem 812, or modem 1202, 1302, etc.), a satellite 2208, and/or a dynamic routing system 1408, among other systems. Although a number of different systems may perform some or all of the process 2800, to simplify discussion, the process 2800 will be described with respect to particular systems.

The process begins at block 2802 when, for example, the wireless device 2702 maintains a first communication connection with a first wide area network as a network session without using an eSIM. The wireless device 2702 may include any type of mobile or moveable device that is either self-moving, moved in response to a command by a user, or carried by a user. For example, as previously described, the wireless device 2702 may be a smartphone, a drone, a medical device, a self-driving car, etc.

In some examples, the first communication connection with the first wide area network may be a connection between the wireless device 2702 and an active carrier choice of a primary carrier as disclosed herein (for example, as disclosed in FIG. 27). In some cases, the wireless device 2702 maintains the first communication connection at a first point in time and at a first location. For example, the first location corresponding with a location of the wireless device 2702. The wireless device 2702 may maintain the first communication connection by continuing to transmit data packets using the first wide area network. In some cases, the wireless device 2702 may maintain the first communication connection by not switching the wide area network to another wide area network.

The wireless device 2702 may maintain the first communication connection established with the first wide area network of the plurality of wide area networks based on first carrier profile information associated with the first wide area network and stored by the vSIM. The first carrier profile information may include an identifier of an active carrier choice with which the wireless device 2702 may communicate using the first wide area network.

In some cases, network metadata may be associated with the first wide area network. The network metadata may include at least one of: a measurement of signal strength of a communication connection, a signal type of a signal used to communicate over the communication connection (for example, a signal that satisfies the 4G LTE communication standard, the 5G communication standard, the 6G communication standard, etc.), an availability of data service over the communication connection, a bandwidth associated with the communication connection, whether the measured signal strength is current or, a quality of service associated with the communication connection, a packet drop rate associated with the communication connection, a network security metric associated with the wide area network, a network reliability metric associated with the wide area network, and/or any such parameter corresponding with network assessment. In some cases, the network metadata may be stored in the wireless device 2702 and/or at a remotely accessible device.

At block 2804, the wireless device 2702 accesses network metadata associated with a second wide area network. In some examples, the wireless device 2702 may access the network metadata associated with the second wide area network at the first point in time and at the first location. The wireless device 2702 may access the network metadata associated with the second wide area network by retrieving the network metadata. The wireless device 2702 may access the network metadata associated with the second wide area network by retrieving the network metadata from a vSIM or, in some cases, at least one SIM card as disclosed herein. The wireless device 2702 may access the network metadata associated with the second wide area network by retrieving the network metadata from a remote device. For example, the wireless device 2702 may communicate with communication hardware as described herein to obtain the network metadata.

At block 2806, the wireless device 2702 accesses network metadata associated with a third wide area network. In some examples, the wireless device 2702 may access the network metadata associated with the third wide area network at the first point in time and at the first location. The wireless device 2702 may access the network metadata associated with the third wide area network by retrieving the network metadata locally. For example, the wireless device 2702 may access the network metadata by retrieving the network metadata from a vSIM or, in some cases, at least one SIM card as disclosed herein. The wireless device 2702 may access the network metadata associated with the third wide area network by retrieving the network metadata from a remote device. For example, the wireless device 2702 may communicate with communication hardware as described herein to obtain the network metadata.

At block 2808, the wireless device 2702 selects the second wide area network based at least in part on a comparison between the second network metadata and the third network metadata. In some examples, the wireless device 2702 may compare the second network metadata to the third network metadata as described herein (for example, as described in FIG. 25 and/or FIG. 27). In response to determining that a metric of the second network metadata exceeds a corresponding metric of the third network metadata, the wireless device 2702 may designate the second wide area network as an active carrier choice for the standby carrier in the vSIM and designate the third wide area network as an available carrier choice for the standby carrier in the vSIM. The metric may correspond to the network characteristic for each of the various carriers for the primary carrier and the standby carrier. For example, the metric may include any of the information included in the network metadata as disclosed herein, or other factors relevant for comparing network metadata.

In some examples, the comparison between the second network metadata and the third network metadata (and, in some cases, the metric) may be based at least in part on signal strength, signal type, bandwidth, availability of data service, or historical signal strength information. In some examples, the wireless device 2702 may receive, from communication hardware or memory, a second signal strength corresponding to the second communication connection with the second wide area network. The wireless device 2702 may receive, from the communication hardware or the memory, a third signal strength corresponding to a third communication connection with the third wide area network. In this way, the comparison compares the second signal strength corresponding to the second communication connection and the third signal strength corresponding to the third communication connection.

In some examples, as a result of another comparison, the wireless device 2702 may select the second wide area network as the primary carrier. For example, the wireless device 2702 may determine another comparison result between the second network metadata and the first network metadata. The wireless device 2702 may then designate the second wide area network as the primary carrier based at least in part on the comparison result. The wireless device 2702 may designate the first wide area network as the standby carrier based at least in part on the comparison result. In this way, the comparison result indicates that a second signal strength corresponding to the second communication connection with the second wide area network is greater than a first signal strength corresponding to the first communication connection with the first wide area network. In some cases, the first comparison result indicates that a second bandwidth corresponding to the second communication connection with the second wide area network is greater than a first bandwidth corresponding to the first communication connection with the first wide area network. In this way, the wireless device 2502 may update a register according to the comparison results.

At block 2810, the wireless device 2702 establishes a second communication connection with the second wide area network. In some examples, the wireless device 2702 may establish the second communication connection during a time when the network session is not actively communicating packets. For example, the wireless device 2702 may determine the network session is not actively communicating packets by monitoring a throughput value from the network session. When the throughput value is below a predetermined threshold, the wireless device 2702 may determine the network session is not actively communicating packets. The wireless device 2702 may then establish the second communication connection with the second wide area network during the time when the vSIM is inactive (for example, when the wireless device 2702 is not interacting with the register of available carriers). In response to establishing the second communication connection with the second wide area network, the wireless device 2702 may obtain data from the second wide area network. The wireless device 2702 may then cease the first communication connection with the first wide area network. In this way, the wireless device 2702 may designate the second wide area network as the primary carrier.

In some examples, the wireless device 2702 may establish the second communication connection during a time when the network session is actively communicating packets. For example, the wireless device 2702 may determine the network session is actively communicating packets by monitoring the throughput value from the network session. When the throughput value is above a predetermined threshold, the wireless device 2702 may determine the network session is actively communicating packets. The wireless device 2702 may then establish the second communication connection with the second wide area network during the time when the vSIM is in active use. The wireless device 2702 may determine the wireless device is able to cease communicating with the first wide area network and connect to the second wide area network while maintaining a data transfer session. For example, the wireless device 2702 may monitor a quality of service (or other network characteristic) value for each the first wide area network and the second wide area network. When the quality of service value for both the first wide area network and the second wide area network is above a predetermined quality threshold, the wireless device may determine maintaining the data transfer session is achievable. In response to establishing the second communication connection with the second wide area network, the wireless device 2702 may obtain data from the second wide area network during the data transfer session. The wireless device 2702 may then cease the first communication connection with the first wide area network. In this way, the wireless device 2702 may designate the second wide area network as the primary carrier.

The wireless device 2702 may, in some examples, maintain the second communication connection with the second wide area network at a second point in time (which may be different than the first point in time). In some examples, the wireless device 2702 may maintain the second communication connection with the second wide area network without establishing a call over the second wide area network and without transmitting a user data packet over the second wide area network until at least such time when the second wide area network is designated the primary carrier or until at least such time when an application or a network location associated with the second wide area network is accessed.

At block 2812, the wireless device 2702 transitions the network session from the first wide area network to the second wide area network. The transition may occur without interrupting data activities of the network session (for example, by requesting a next data packet from the second wide area network). The transition may occur using the wireless device 2702, a remote device, and/or other communication hardware as disclosed herein. In some examples, the wireless device 2702 may transition the network session from the first communication connection over the first wide area network to the second communication connection over the second wide area network in response to determining at a second time period that the metric of the second network metadata exceeds a corresponding metric of the first network metadata. For example, the wireless device 2702 may monitor a quality of service (or other network characteristic) value for each the first wide area network and the second wide area network and cease the communication with the first communication connection when the quality of service of the second network metadata is greater than the corresponding metric for the first network metadata.

In some examples, the wireless device 2702 may end the first communication connection with the first wide area network based at least in part on a comparison between the network metadata. For example, the wireless device 2702 may no longer transmit or receive data packets across the first wide area network. In some cases, ending the first communication connection occurs after the wireless device 2702 establishes the second communication connection with the second wide area network.

Additional Embodiments

Certain aspects of the present disclosure relate to a wireless device configured to maintain communication channels over multiple data networks with each data network configured using a different communication technology or set of frequency bands. The wireless device may include: a first primary antenna configured to transmit signals of a first transmit band and receive signals of a first receive band, and to transmit signals of a second transmit band and received signals of a second transmit band; a first diversity antenna configured to receive the signals of the first receive band, and receive the signals of the second receive band; a first radio frequency subsystem in electrical communication with the first primary antenna and the first diversity antenna, the first radio frequency subsystem configured to decode the signals of the first receive band and to decode the signals of the second receive band; a second radio frequency subsystem in electrical communication with the first diversity antenna, the second radio frequency subsystem configured to decode the signals of the first receive band and to decode the signals of the second receive band;

and a hardware processor in electrical communication with a first subscriber identity module, a second subscriber identity module, the first radio frequency subsystem, and the second radio frequency subsystem, wherein the first subscriber identity module is associated with a first wireless network that supports the first transmit band and the first receive band, and the second subscriber identity module is associated with a second wireless network that supports the second transmit band and the second receive band, and wherein the hardware processor is configured to control whether the first subscriber identity module or the second subscriber module uses the first radio frequency subsystem to communicate at a particular time period.

The wireless device of the preceding paragraph can include any combination or sub-combination of the following features: where the wireless device further includes a first modem connected between the first radio frequency subsystem and the hardware processor, the first modem configured to transmit a packet using the first primary antenna to the first wireless network or the second wireless network; where the first modem is configured to determine whether the packet is a voice packet or a data packet; where the wireless device further includes: a first modem connected between the first radio subsystem and the hardware processor, the first modem configured to transmit a packet using the first primary antenna to one of the first wireless network or the second wireless network; and a second modem connected to the hardware processor, the second modem configured to transmit the packet using a second primary antenna; where the second modem is integrated with a second hardware processor configured to manage communication with a third wireless network; where the hardware processor serves as a primary device and the second hardware processor serves as a secondary device in a primary/secondary communication model; where the second modem is connected to the hardware processor via an auxiliary port of the hardware processor; where the wireless device further includes a communication hub configured to connect the second modem to the hardware processor; where the communication hub connects between an external data transfer or charging port of the wireless device and a data transfer or charging port of the hardware processor; where the second radio frequency subsystem is configured to receive the signals of the first receive band or the signals of the second receive band, and wherein the second radio frequency subsystem does not transmit signals; where the wireless device further includes a tuner in electrical communication with the first radio frequency subsystem, the first tuner configured to determine whether a received signal is a signal of a first channel access method or a signal of a second channel access method; where the first channel access method comprises one of code-division multiple access, wideband code-division multiple access, or time-division multiple access, and the second channel access method comprises one of code-division multiple access, wideband code-division multiple access, or time-division multiple access; where the hardware processor is further configured to determine a first signal strength of a connection with the first wireless network and a second signal strength of a connection with the second wireless network based at least in part on the received signals of the first receive band, and the received signals of the second receive band; where the hardware processor is further configured to determine whether to communicate with the first wireless network or the second wireless network based at least in part on the first signal strength or the second signal strength; and where the first wireless network is implemented using a first communication technology and is associated with a first service provider, and the second wireless network is implemented using a second communication technology and is associated with a second service provider.

Certain additional aspects of the present disclosure relate to a method of communicating over multiple cellular networks. The method may be performed by a hardware processor of a wireless device configured to communicate with a first cellular network over a first frequency band and a second cellular network over a second frequency band. The method may include: receiving, via a first primary antenna of the wireless device, a first signal of the first frequency band from the first cellular network, wherein the first cellular network is associated with a first subscriber identity module of the wireless device and the second cellular network is associated with a second subscriber identity module of the wireless device, and wherein the first subscriber identity module is designated for transmission of data packets; receiving, via a first diversity antenna of the wireless device, a second signal of the second frequency band from the second cellular network; determining a first signal strength associated with the first cellular network based at least in part on the first signal; determining a second signal strength associated with the second cellular network based at least in part on the second signal; determining that the second signal strength exceeds the first signal strength; and transmitting first data packets via the first primary antenna to a target system over the second cellular network by designating the second subscriber identity module as the active subscriber identity module for transmitting the first data packets and designating the first subscriber identity module as not for transmitting the first data packets.

The method of the preceding paragraph can include any combination or sub-combination of the following features: where the first signal and the second signal are received during a first time period; where the method further includes: receiving, at a second time period, a third signal of the first frequency band from the first cellular network; receiving, at the second time period, a fourth signal of the second frequency band from the second cellular network; determining a third signal strength associated with the first cellular network based at least in part on the third signal; determining a fourth signal strength associated with the second cellular network based at least in part on the fourth signal; determining that the third signal strength exceeds the fourth signal strength; and transmitting second data packets via the first primary antenna to the target system over the first cellular network by designating the first subscriber identity module as the active subscriber identity module for transmitting the second data packets and designating the second subscriber identity module as not for transmitting the second data packets; where the first data packets are associated with non-voice data, and where the method further includes: obtaining second data packets from an application; determining that the second data packets comprise voice data associated with a call to a destination wireless device; and transmitting the second data packets over the first cellular network associated with the first subscriber identity module while continuing to transmit data packets associated with non-voice data over the second cellular network; and where the method further includes: receiving via a second primary antenna of the wireless device, a third signal of a third frequency band associated with a third cellular network; determining a third signal strength associated with the third cellular network based at least in part on the third signal; determining that the third signal strength exceeds the second signal strength; transmitting second data packets associated with a first priority over the third cellular network; and transmitting the first data packets over the second cellular network, wherein the first data packets are associated with a second priority that is lower than the first priority.

Yet certain additional aspects of the present disclosure relate to a method for dynamically routing calls on a first network implementing a first network protocol to a second network implementing a second network protocol. The method may include: receiving a call request generated by a user device via a first network of a first communications network provider; determining that the first user device supports a first network protocol and a second network protocol; determining a first measurement of a network characteristic for the first network associated with the first communications network provider, wherein the first network implements the first network protocol; identifying a second network associated with a second communications network provider, wherein the second network implements the second network protocol; determining a second measurement of the network characteristic for the second network associated with the second communications network provider; determining that the second measurement exceeds the first measurement by a threshold amount; and routing the call to the second network associated with the second communications network provider using the second network protocol based at least in part on the determination that the second measurement exceeds the first measurement by the threshold amount.

The method of the preceding paragraph can include any combination or sub-combination of the following features: where the first network protocol is a Global System for Mobile Communications (GSM) protocol and the second network protocol is a Code-Division Multiple Access (CDMA) protocol; where the first network protocol is associated with a first SIM card and the second network protocol is associated with a second SIM card; where routing the call to the second network comprises providing the user device with a command to complete the call using the second network; where the network characteristic, includes at least one of: jitter, latency, packet loss, an answer/seizure ratio, a call clarity rating, a dropped call rate, a network effectiveness ratio, or a post dial delay; where the network characteristic comprises a signal strength, and wherein the first measurement comprises a first signal strength between the user device and the first network, and the second measurement comprises a second signal strength between the user device and the second network; where the network characteristic comprises a signal strength, and wherein the first measurement comprises a first signal strength between a call destination device and the first network, and the second measurement comprises a second signal strength between the call destination device and the second network; where the method further includes identifying a geolocation of the user device; determining that the user device is within a particular coverage area for the second network; and routing the call to the second network based at least in part on the determination that the user device is within the particular coverage area; where the method further includes assessing historical data for the user device; generating a call profile for the user device based at least in part on the historical data, wherein the call profile indicates a probability that calls satisfying one or more criteria are completed using a particular network; and routing the call to the second network based at least in part on the call profile; where the one or more criteria comprises one or more of a location of the user device, a location of a user being called by the user device, a time of day, a particular user being called by the user device, a destination network used by a device of the particular user, or a destination network provider of the destination network; and where determining the first measurement and the second measurement of the network characteristic comprises: transmitting a request to the user device for the network characteristic; and receiving the first measurement of the network characteristic with respect to the first network and the second measurement of the network characteristic with respect to the second network from the user device.

Certain aspects of the present disclosure relate to a wireless device configured to maintain communication channels over multiple data networks with each data network configured using a different communication technology or set of frequency bands. The wireless device may include: a first primary antenna configured to transmit signals of a first transmit band and receive signals of a first receive band, and to transmit signals of a second transmit band and received signals of a second transmit band; a first diversity antenna configured to receive the signals of the first receive band, and receive the signals of the second receive band; a first radio frequency subsystem in electrical communication with the first primary antenna and the first diversity antenna, the first radio frequency subsystem configured to decode the signals of the first receive band and to decode the signals of the second receive band; a second radio frequency subsystem in electrical communication with the first diversity antenna, the second radio frequency subsystem configured to decode the signals of the first receive band and to decode the signals of the second receive band; and a hardware processor in electrical communication with a first subscriber identity module, a second subscriber identity module, the first radio frequency subsystem, and the second radio frequency subsystem, wherein the first subscriber identity module is associated with a first wireless network that supports the first transmit band and the first receive band, and the second subscriber identity module is associated with a second wireless network that supports the second transmit band and the second receive band, and wherein the hardware processor is configured to control whether the first subscriber identity module or the second subscriber module uses the first radio frequency subsystem to communicate at a particular time period.

The wireless device of the preceding paragraph can include any combination or sub-combination of the following features: where the wireless device further includes a first modem connected between the first radio frequency subsystem and the hardware processor, the first modem configured to transmit a packet using the first primary antenna to the first wireless network or the second wireless network; where the first modem is configured to determine whether the packet is a voice packet or a data packet; where the wireless device further includes: a first modem connected between the first radio subsystem and the hardware processor, the first modem configured to transmit a packet using the first primary antenna to one of the first wireless network or the second wireless network; and a second modem connected to the hardware processor, the second modem configured to transmit the packet using a second primary antenna; where the second modem is integrated with a second hardware processor configured to manage communication with a third wireless network; where the hardware processor serves as a primary device and the second hardware processor serves as a secondary device in a primary/secondary communication model; where the second modem is connected to the hardware processor via an auxiliary port of the hardware processor; where the wireless device further includes a communication hub configured to connect the second modem to the hardware processor; where the communication hub connects between an external data transfer or charging port of the wireless device and a data transfer or charging port of the hardware processor; where the second radio frequency subsystem is configured to receive the signals of the first receive band or the signals of the second receive band, and wherein the second radio frequency subsystem does not transmit signals; where the wireless device further includes a tuner in electrical communication with the first radio frequency subsystem, the first tuner configured to determine whether a received signal is a signal of a first channel access method or a signal of a second channel access method; where the first channel access method comprises one of code-division multiple access, wideband code-division multiple access, or time-division multiple access, and the second channel access method comprises one of code-division multiple access, wideband code-division multiple access, or time-division multiple access; where the hardware processor is further configured to determine a first signal strength of a connection with the first wireless network and a second signal strength of a connection with the second wireless network based at least in part on the received signals of the first receive band, and the received signals of the second receive band; where the hardware processor is further configured to determine whether to communicate with the first wireless network or the second wireless network based at least in part on the first signal strength or the second signal strength; and where the first wireless network is implemented using a first communication technology and is associated with a first service provider, and the second wireless network is implemented using a second communication technology and is associated with a second service provider.

Certain aspects of the present disclosure relate to a wireless device configured to maintain communication channels over multiple data networks with each data network configured using a different communication technology or set of frequency bands. The wireless device may include: a first primary antenna configured to transmit signals of a first transmit band and receive signals of a first receive band, and to transmit signals of a second transmit band and received signals of a second transmit band; a first diversity antenna configured to receive the signals of the first receive band, and receive the signals of the second receive band; a first radio frequency subsystem in electrical communication with the first primary antenna and the first diversity antenna, the first radio frequency subsystem configured to decode the signals of the first receive band and to decode the signals of the second receive band; a second radio frequency subsystem in electrical communication with the first diversity antenna, the second radio frequency subsystem configured to decode the signals of the first receive band and to decode the signals of the second receive band; and a hardware processor in electrical communication with a first subscriber identity module, a second subscriber identity module, the first radio frequency subsystem, and the second radio frequency subsystem, wherein the first subscriber identity module is associated with a first wireless network that supports the first transmit band and the first receive band, and the second subscriber identity module is associated with a second wireless network that supports the second transmit band and the second receive band, wherein the hardware processor is configured to control whether the first subscriber identity module or the second subscriber module uses the first radio frequency subsystem to communicate at a particular time period, and wherein the hardware processor causes output of a shadow number when establishing a call over the first wireless network using the first subscriber identity module or when establishing the call over the second wireless network using the second subscriber identity module, and wherein the shadow number substitutes at least for a first number associated with the first subscriber identity module and for a second number associated with the second subscriber identity module.

The wireless device of the preceding paragraph can include any combination or sub-combination of the following features: where the wireless device further includes a first modem connected between the first radio frequency subsystem and the hardware processor, the first modem configured to transmit a packet using the first primary antenna to the first wireless network or the second wireless network; where the first modem is configured to determine whether the packet is a voice packet or a data packet; where the wireless device further includes: a first modem connected between the first radio subsystem and the hardware processor, the first modem configured to transmit a packet using the first primary antenna to one of the first wireless network or the second wireless network; and a second modem connected to the hardware processor, the second modem configured to transmit the packet using a second primary antenna; where the second modem is integrated with a second hardware processor configured to manage communication with a third wireless network; where the hardware processor serves as a primary device and the second hardware processor serves as a secondary device in a primary/secondary communication model; where the second modem is connected to the hardware processor via an auxiliary port of the hardware processor; where the wireless device further includes a communication hub configured to connect the second modem to the hardware processor; where the communication hub connects between an external data transfer or charging port of the wireless device and a data transfer or charging port of the hardware processor; where the second radio frequency subsystem is configured to receive the signals of the first receive band or the signals of the second receive band, and wherein the second radio frequency subsystem does not transmit signals; where the wireless device further includes a tuner in electrical communication with the first radio frequency subsystem, the first tuner configured to determine whether a received signal is a signal of a first channel access method or a signal of a second channel access method; where the first channel access method comprises one of code-division multiple access, wideband code-division multiple access, or time-division multiple access, and the second channel access method comprises one of code-division multiple access, wideband code-division multiple access, or time-division multiple access; where the hardware processor is further configured to determine a first signal strength of a connection with the first wireless network and a second signal strength of a connection with the second wireless network based at least in part on the received signals of the first receive band, and the received signals of the second receive band; where the hardware processor is further configured to determine whether to communicate with the first wireless network or the second wireless network based at least in part on the first signal strength or the second signal strength; and where the first wireless network is implemented using a first communication technology and is associated with a first service provider, and the second wireless network is implemented using a second communication technology and is associated with a second service provider.

Certain aspects of the present disclosure relate to a method of communicating over multiple cellular networks. The method may be performed by a hardware processor of a wireless device configured to communicate with a first cellular network over a first frequency band and a second cellular network over a second frequency band. The method may include: receiving, via a first primary antenna of the wireless device, a first signal of the first frequency band from the first cellular network, wherein the first cellular network is associated with a first subscriber identity module of the wireless device and the second cellular network is associated with a second subscriber identity module of the wireless device, and wherein the first subscriber identity module is designated for transmission of data packets; receiving, via a first diversity antenna of the wireless device, a second signal of the second frequency band from the second cellular network; determining a first signal strength associated with the first cellular network based at least in part on the first signal; determining a second signal strength associated with the second cellular network based at least in part on the second signal; determining that the second signal strength exceeds the first signal strength; and transmitting first data packets via the first primary antenna to a target system over the second cellular network by designating the second subscriber identity module as the active subscriber identity module for transmitting the first data packets and designating the first subscriber identity module as not for transmitting the first data packets, wherein the first data packets identify the origin of the first data packets as being associated with a shadow number that substitutes at least for a first number associated with the first subscriber identity module and for a second number associated with the second subscriber identity module.

The method of the preceding paragraph can include any combination or sub-combination of the following features: where the first signal and the second signal are received during a first time period; where the method further includes: receiving, at a second time period, a third signal of the first frequency band from the first cellular network; receiving, at the second time period, a fourth signal of the second frequency band from the second cellular network; determining a third signal strength associated with the first cellular network based at least in part on the third signal; determining a fourth signal strength associated with the second cellular network based at least in part on the fourth signal; determining that the third signal strength exceeds the fourth signal strength; and transmitting second data packets via the first primary antenna to the target system over the first cellular network by designating the first subscriber identity module as the active subscriber identity module for transmitting the second data packets and designating the second subscriber identity module as not for transmitting the second data packets; where the first data packets are associated with non-voice data, and wherein the method further comprises: obtaining second data packets from an application; determining that the second data packets comprise voice data associated with a call to a destination wireless device; and transmitting the second data packets over the first cellular network associated with the first subscriber identity module while continuing to transmit data packets associated with non-voice data over the second cellular network; and where the method further includes receiving via a second primary antenna of the wireless device, a third signal of a third frequency band associated with a third cellular network; determining a third signal strength associated with the third cellular network based at least in part on the third signal; determining that the third signal strength exceeds the second signal strength; transmitting second data packets associated with a first priority over the third cellular network; and transmitting the first data packets over the second cellular network, wherein the first data packets are associated with a second priority that is lower than the first priority.

Certain aspects of the present disclosure relate to a dynamic routing system. The dynamic routing system may include a memory configured to store computer-executable instructions and a hardware processor in communication with the memory and configured to execute the specific computer-executable instructions to at least: receive a packet associated with a call from a wireless device associated with an origin caller; identify an origin number associated with the call from the packet; determine that the origin number is associated with a shadow number of the origin caller; determine a plurality of phone numbers associated with the shadow number; identify a plurality of call carriers, wherein each call carrier of the plurality of call carriers is associated with a different number of the plurality of phone numbers; select a call carrier from the plurality of call carriers based at least in part on one or more routing parameters; and route the packet over a network of the selected call carrier while maintaining the shadow number at the origin number for display at a device associated with a destination target of the packet. The dynamic routing system can be a gateway configured to route calls between carrier networks and/or between an origin and destination caller.

The dynamic routing system of the preceding paragraph can include any combination or sub-combination of the following features: where the packet is one of a data packet or a voice packet; where the device is further configured to execute the specific computer-executable instructions to at least: determine a destination number for the packet, the destination number associated with the destination target of the packet; determine that the destination number is associated with a second shadow number, wherein the shadow number is associated with the origin caller and the second shadow number is associated with a target user associated with the destination target; substitute the destination number with the second shadow number; and route the packet over the network of the selected call carrier using the second shadow number in place of the destination number.

Other Implementation Details

A number of embodiments have been described herein. It should be understood that where described embodiments are not mutually exclusive, each of the embodiments described herein can be combined with one or more of the other embodiments described herein. Any structure, material, function, method, or step illustrated or described in connection with any embodiment in the specification can be used instead of or in combination with any other structure, material, function, method, or step illustrated or described in connection with any other embodiment in the specification. Furthermore, no features, steps, structures, or methods disclosed in the specification are essential or indispensable.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as application-specific electronic hardware, computer software executed by computer hardware, or a combination of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the dynamic routing system 108 can be implemented by one or more computer systems or by a computer system including one or more processors. Moreover, the described functionality can be implemented in varying ways for each particular application of the systems described herein, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A wireless device configured to communicate with at least one wide area network from a plurality of wide area networks, wherein the at least one wide area network is selected based at least in part on network metadata, the wireless device comprising:

a memory including at least a first eSIM and a second eSIM, wherein the memory stores specific computer-executable instructions; and a hardware processor in communication with the memory and configured to execute the specific computer-executable instructions to at least:

maintain, at a first point in time and at a first location, a first communication connection with a first wide area network of the plurality of wide area networks, wherein first network metadata is associated with the first wide area network and the first eSIM, and wherein the first wide area network is designated a primary carrier;

access, at the first point in time and at the first location, second network metadata associated with a second wide area network of the plurality of wide area networks and the second eSIM;

access, at the first point in time and at the first location, third network metadata associated with a third wide area network of the plurality of wide area networks and the second eSIM;

select, at the first point in time and at the first location, the second wide area network based at least in part on a comparison between the second network metadata of the second wide area network and the third network metadata of the third wide area network;

modify a configuration of the second eSIM to identify the second wide area network as an active standby carrier;

establish a second communication connection with the second wide area network, wherein the second wide area network is designated a standby carrier; and maintain the first communication connection as the primary carrier and the second communication connection as the standby carrier until at least a second point in time.

2. The wireless device of claim 1, wherein the memory is configured to store the first network metadata, the second network metadata, and the third network metadata.

3. The wireless device of claim 1, wherein the first network metadata, the second network metadata, and the third network metadata is stored on a remote device accessible by the wireless device.

4. The wireless device of claim 1, wherein the hardware processor is further configured to execute the specific computer-executable instructions to at least:

determine a first comparison result between the second network metadata and the first network metadata;

designate the second wide area network as the primary carrier based at least in part on the first comparison result; and designate the first wide area network as the standby carrier based at least in part on the first comparison result.

5. The wireless device of claim 4, wherein the first comparison result indicates that a second signal strength corresponding to the second communication connection with the second wide area network is greater than a first signal strength corresponding to the first communication connection with the first wide area network.

6. The wireless device of claim 4, wherein the first comparison result indicates that a second bandwidth corresponding to the second communication connection with the second wide area network is greater than a first bandwidth corresponding to the first communication connection with the first wide area network.

7. The wireless device of claim 4, wherein the hardware processor is further configured to execute the specific computer-executable instructions to at least:

maintain, at the second point in time, the second communication connection with the second wide area network;

access, at the second point in time, fourth network metadata stored at the first eSIM and associated with a fourth wide area network of the plurality of wide area networks;

access, at the second point in time, the first network metadata stored at the first eSIM and associated with the first wide area network of the plurality of wide area networks;

select the fourth wide area network based at least in part on a comparison between the first network metadata and the fourth network metadata; and establish a third communication connection with the fourth wide area network, wherein the fourth wide area network is designated the standby carrier.

8. The wireless device of claim 7, wherein the hardware processor is further configured to execute the specific computer-executable instructions to at least end the first communication connection with the first wide area network based at least in part on the comparison between the first network metadata and the fourth network metadata.

9. The wireless device of claim 7, wherein the second point in time occurs when the wireless device is at a second location.

10. The wireless device of claim 7, wherein the hardware processor is further configured to execute the specific computer-executable instructions to at least:

determine a second comparison result between the fourth network metadata and the second network metadata;

designate the fourth wide area network as the primary carrier based at least in part on the second comparison result; and designate the second wide area network as the standby carrier based at least in part on the second comparison result.

11. The wireless device of claim 1, wherein, when the first wide area network is designated the primary carrier, the hardware processor is further configured to execute the specific computer-executable instructions to at least establish a call over the first wide area network or transmit a user data packet over the first wide area network.

12. The wireless device of claim 1, wherein, when the second wide area network is designated the standby carrier, the hardware processor is further configured to execute the specific computer-executable instructions to at least maintain the second communication connection with the second wide area network without establishing a call over the second wide area network and without transmitting a user data packet over the second wide area network until at least such time when the second wide area network is designated the primary carrier.

13. The wireless device of claim 1, wherein, when the second wide area network is designated the standby carrier, the hardware processor is further configured to execute the specific computer-executable instructions to at least maintain the second communication connection with the second wide area network without establishing a call over the second wide area network and without transmitting a user data packet over the second wide area network until at least such time when an application or a network location associated with the second wide area network is accessed.

14. The wireless device of claim 1, wherein the network metadata comprises at least one of:

a signal strength of a communication connection with a wide area network of the plurality of wide area networks;

a signal type of a signal used to communicate over the communication connection;

an availability of data service over the communication connection;

a bandwidth associated with the communication connection;

historical signal strength data associated with the wide area network;

a quality of service associated with the communication connection;

a packet drop rate associated with the communication connection;

a network security metric associated with the wide area network; or a network reliability metric associated with the wide area network.

15. The wireless device of claim 1, wherein the hardware processor is further configured to execute the specific computer-executable instructions to at least perform the comparison between the second network metadata and the third network metadata based at least in part on signal strength, signal type, availability of data service, or historical signal strength information.

16. The wireless device of claim 1, wherein the hardware processor is further configured to execute the specific computer-executable instructions to at least:

determine a second signal strength corresponding to the second communication connection with the second wide area network; and determine a third signal strength corresponding to a third communication connection with the third wide area network, wherein the comparison compares the second signal strength corresponding to the second communication connection and the third signal strength corresponding to the third communication connection.

17. The wireless device of claim 1, wherein the hardware processor is further configured to execute the specific computer-executable instructions to at least:

receive, from a gateway or the memory, a second signal strength corresponding to the second communication connection with the second wide area network; and receive, from the gateway or the memory, a third signal strength corresponding to a third communication connection with the third wide area network, wherein the comparison compares the second signal strength corresponding to the second communication connection and the third signal strength corresponding to the third communication connection.

18. The wireless device of claim 1, wherein the hardware processor is further configured to execute the specific computer-executable instructions to at least receive the comparison between the second network metadata and the third network metadata from a gateway or the memory.

19. The wireless device of claim 1, wherein the first wide area network is a cellular network.

20. The wireless device of claim 1, wherein the first wide area network is implemented using a first communication technology and is associated with a first service provider, and the second wide area network is implemented using a second communication technology and is associated with a second service provider.

21. The wireless device of claim 1, further comprising a primary antenna and a diversity antenna, wherein the hardware processor is further configured to execute the specific computer-executable instructions to at least:

transmit and receive signals, through the primary antenna, of the first communication connection with the first wide area network; and receive signals, through the diversity antenna, of the second communication connection with the second wide area network.

22. The wireless device of claim 21, wherein the hardware processor is further configured to execute the specific computer-executable instructions to at least:

determine a signal strength associated with the second communication connection with the second wide area network based at least in part on a signal received via the diversity antenna; and update the second network metadata based on the signal strength associated with the second communication connection with the second wide area network.

23. The wireless device of claim 1, wherein the first point in time comprises a first time period.

\* \* \* \* \*